(12) United States Patent
Coulson

(10) Patent No.: US 7,627,067 B2
(45) Date of Patent: Dec. 1, 2009

(54) MAXIMUM LIKELIHOOD SYNCHRONIZATION FOR A COMMUNICATIONS SYSTEM USING A PILOT SYMBOL

(75) Inventor: Alan James Coulson, Lower Hutt (NZ)

(73) Assignee: Industrial Research Limited, Auckland (NZ)

( * ) Notice: Subject to any disclaimer, the term of this patent is extended or adjusted under 35 U.S.C. 154(b) by 1137 days.

(21) Appl. No.: 10/470,825

(22) PCT Filed: Feb. 1, 2002

(86) PCT No.: PCT/NZ02/00010

§ 371 (c)(1),
(2), (4) Date: Jul. 30, 2003

(87) PCT Pub. No.: WO02/062030

PCT Pub. Date: Aug. 8, 2002

(65) Prior Publication Data

US 2004/0081205 A1    Apr. 29, 2004

(30) Foreign Application Priority Data

Feb. 1, 2001    (NZ)    ..................................... 509688

(51) Int. Cl.
*H04L 7/04* (2006.01)
(52) U.S. Cl. .................. 375/362; 375/326; 375/316; 375/260
(58) Field of Classification Search .................. 375/362, 375/326, 316, 260
See application file for complete search history.

(56) References Cited

U.S. PATENT DOCUMENTS

| | | | |
|---|---|---|---|
| 5,282,222 A | | 1/1994 | Fattouche et al. |
| 5,313,169 A | | 5/1994 | Fouche et al. |
| 5,555,268 A | | 9/1996 | Fattouche et al. |
| 5,809,009 A | * | 9/1998 | Matsuoka et al. ........... 370/206 |
| 5,818,845 A | | 10/1998 | Moura et al. |

(Continued)

FOREIGN PATENT DOCUMENTS

AU    B-51806/93    6/1994

(Continued)

OTHER PUBLICATIONS

M. Alard et al., "Principles of modulation and channel coding for digital broadcasting for mobile receivers," EBU Review—Technical, Aug. 1987.

(Continued)

*Primary Examiner*—Ted M Wang
(74) *Attorney, Agent, or Firm*—Dann, Dorfman, Herrell and Skillman, P.C.

(57) ABSTRACT

A method and apparatus for detecting and synchronizing packets of data with a repeated sequence as a pilot symbol received by a communications system are provided. The method and apparatus include receiving data, detecting a packet within the received data, producing an estimate of the time-varying frequency offset of the received data, estimating the start of the packet of the received data, estimating the time-varying phase offset of the received data and estimating the time-varying time offset of the received data. Methods for assessing each one of the time-varying frequency offset, the time-varying phase offset, the time-varying time offset and the start of packet are also provided.

65 Claims, 25 Drawing Sheets

U.S. PATENT DOCUMENTS

| | | | |
|---|---|---|---|
| 6,058,101 | A | 5/2000 | Huang et al. |
| 6,192,068 | B1 | 2/2001 | Fattouche et al. |
| 6,654,432 | B1 * | 11/2003 | O'Shea et al. ............. 375/354 |
| 7,489,731 | B2 | 2/2009 | Coulson et al. |
| 2003/0156534 | A1 * | 8/2003 | Coulson et al. ............. 370/210 |

FOREIGN PATENT DOCUMENTS

| | | |
|---|---|---|
| CA | 1308450 | 10/1992 |
| CA | 2064975 | 7/1999 |
| CA | 2170803 | 9/1999 |
| EP | 0757451 | 2/1997 |
| EP | 1028564 | 8/2000 |
| GB | 2319935 | 6/1998 |
| GB | 2346520 | 8/2000 |
| WO | 8504999 | 11/1985 |
| WO | 9629791 | 9/1996 |
| WO | 9829980 | 7/1998 |
| WO | WO 98/32268 | 7/1998 |
| WO | WO 99/65180 | 12/1999 |
| WO | 0030312 | 5/2000 |
| WO | WO 00/44120 | 7/2000 |
| WO | WO 00/65710 | 11/2000 |
| WO | WO 00/65792 | 11/2000 |

OTHER PUBLICATIONS

L.J. Cimini, Jr. et al., "Orthogonal Frequency Division Multiplexing for Wireless Channels," IEEE Globecom 1998.

E.F. Casas et al., "OFDM for Data Communication Over Mobile Radio FM Channels—Part I: Analysis and Experimental Results," IEEE 1991.

L.J. Cimini, Jr., "Analysis and Simulation fo a Digital Mobile Channel Using Orthogonal Frequency Division Multiplexing," IEEE 1985.

* cited by examiner

Example Timing Offset MMSE Estimation

MAXIMUM LIKELIHOOD SYNCHRONIZATION FOR A COMMUNICATIONS SYSTEM USING A PILOT SYMBOL

FIELD OF INVENTION

The invention relates to a method and system for maximum likelihood synchronisation for a communication system using a repeated sequence with ideal or nearly ideal correlation properties and with constant envelope in both the time and frequency domains as a pilot symbol. The invention also relates to methods for maximum likelihood estimation of channel parameters such as the time, frequency and phase offsets as well as the start of packet.

BACKGROUND

Future wireless local area networks (WLANs) will use orthogonal frequency division multiplexing (OFDM) as the modulation method. OFDM is well suited to the requirements of localised, broadband communications and has been shown to operate at raw data rates of up to 54 Mbit/s in demonstration conditions.

To provide error free communication it is necessary for any communications receiver to estimate channel and system induced distortions. A number of methods of estimating these parameters in OFDM systems have previously been proposed (see for example L. J. Cimini, Y Li, "Orthogonal frequency division multiplexing for wireless channels", Tutorial Presentation, Proc IEEE Globecom '98, November 1998 and T. Keller, L. Hanzo, "Adaptive multicarrier modulation: a convenient framework for time-frequency processing in wireless communications", Proc IEEE, vol 88, no 5, May 2000, pp 611-640). Methods have been proposed based on pilot symbols and based on null symbols (see for example P. H. Moose, "A technique for orthogonal frequency division multiplexing frequency offset correction", IEEE Trans. Commun., vol 42, October 1994, pp 2908-2914, J. Aldis, M. P. Altrhoff, R. van Nee "Physical layer architecture and performance in the WAND user trial system", Proc. ACTS Mobile Summit '96, November 1996, pp 196-203, G. Santella, "A frequency and symbol synchronization system for OFDM signals: architecture and simulation results", IEEE Trans. Vehic. Technol., vol 49, no 1, January 2000, pp 254-275). Assuming that initial synchronisation has been achieved, methods to track these parameters from OFDM data have also been proposed (see for example H. Steendam, M. Moeneclaey, "Analysis and optimisation of the performance of OFDM on frequency-selective time-selective fading channels", IEEE Trans. Commun., vol 47, no 12, December 1999, pp 1811-1819). Alternative tracking and/or adaptive channel estimation methods have been proposed which are based on embedded pilot tones (see for example Y. Li, L. J. Cimini Jr., N. R. Sollenberger, "Robust channel estimation for OFDM systems with rapid dispersive fading channels", IEEE Trans. Commun., vol 46, April 1998, pp 902-915).

In a communications system the wide-sense stationary uncorrelated scatterers (WSS-US) model of the low pass-equivalent multipath fading channel may be represented by the time-varying impulse response $$c(\tau; t) = \sum_{m=1}^{M(t)} a_m(t) e^{-j\phi_m(t)} \delta[\tau - \tau_m(t)] \quad 1$$

which is a function of time-delay $\tau$ and time t; where $a_m(t)$ is the amplitude, $\phi_m(t)=2\pi f_c \tau_m(t)$ is the phase of carrier frequency $f_c$, and $\tau_m(t)$ is the time-delay of the mth of M bins or echoes measured at time t. For a narrowband signal, that is one for which the signal bandwidth B is less than the channel coherence bandwidth $(\Delta f)_C$, the "flat" fading multipath channel reduces to $$c(t) \doteq c(0; t) \quad 2$$
$$= a(t) e^{-j\phi(t)} \delta[\tau - \tau_0(t)]$$

where a(t) is the amplitude, $\phi(t)$ is the phase and $\tau_0(t)$ is the excess delay imposed by the multiplicative channel. Note that all the above quantities are time-varying. In a WLAN the channel may be narrowband or may be a frequency-selective multipath fading channel. In frequency-selective multipath channels the simplification of equation (2) does not apply.

In addition to the channel-induced distortions, frequency differences in the transmitter and receiver RF local oscillators and sample clocks due to component tolerances introduce, respectively, frequency and timing errors. Thus, for a narrowband channel, the received sampled signal may be expressed as $$r^\delta(nT) = \sum_{n=0}^{N-1} s(t) a(t) e^{-j[2\pi v(t)t + \theta(t)]} \delta[t - nT - \tau_s(t)] \quad 3$$

where v(t) is the frequency-, $\theta(t)$ is the phase- and $\tau_S(t)$ is the time-offset induced by the combination of channel and system distortions, n is the index of N samples of received signal s(t) at sample period T and the superscript $\delta$ denotes a sampled signal. The time-varying frequency offset v(t) is a composite of Doppler shift and RF local oscillator offset, the time-varying phase offset $\theta(t)$ is the instantaneous snapshot of these composite frequency errors expressed as a time-varying phase difference between the transmitted and received baseband signals, the time-varying time-offset $\tau_S(t)$ is a composite of the excess delay and sample clock phase offset, and n=0 represents the start-of-packet sample. Each of these parameters requires estimation by the receiver and, since all but n are time-varying quantities, each estimate must be updated through the reception process. These distortions occur for all narrowband channels regardless fo the modulation scheme used to transmit data through the channel.

A number of methods for estimating these parameters in ODFM systems have been proposed. The proposed methods include methods based on pilot symbols and methods based on null symbols. Assuming that initial synchronisation has been achieved methods for tracking the parameters have also been proposed.

SUMMARY OF INVENTION

It is the object of the present invention to provide methods for estimating the frequency, phase and time offsets and the start of packet of data received through a communications channel where the methods do not rely on null symbols or pilot tones in the data or to at least provide the public with a useful choice.

In broad terms in one aspect the invention comprises a method for detecting and synchronising packets of data with a repeated sequence as a pilot symbol received by a communications system including the steps of receiving data, detecting a packet within the received data, producing an estimate of the time-varying frequency offset of the received data, estimating the start of the packet of the received data, estimating the time-varying phase offset of the received data and estimating the time-varying time offset of the received data.

Preferably the method for detecting and synchronising packets further includes the step of estimating the time-varying frequency offset of the received data again after the packet start has been estimated.

Preferably the method for detecting and synchronising packets further includes the step of applying a correction to the received data based on the estimated frequency offset of the received data before the step of estimating the start of packet.

Preferably the method for detecting and synchronising packets further includes the step of applying corrections based on the frequency and phase offsets to the received data before the step of estimating the time varying time offset.

In broad terms in a further aspect the invention comprises a method for determining the frequency offset of data including a pilot symbol including a repeated sequence including the steps of:
receiving the data at a receiver as a series of data samples,
producing an autocorrelation of a first vector of the received data,
producing a cross correlation between the first vector of the received data and a second vector of the received data,
determining a timing metric representing the approximate start of a data packet for the current data sample as a function of the autocorrelation, the cross correlation and a threshold value,
assessing whether the timing metric is positives,
if the timing metric is not positive returning to the step of producing an autocorrelation of a first vector of the received data, and
if or when the timing metric is or becomes positive estimating the frequency offset from the phase of the cross correlation.

Preferably the method of determining the frequency offset further includes the steps of:
determining the phase of the cross correlation of the first vector and the second vector once the start of a data packet has been detected, and
estimating the frequency offset from the phase of the cross correlation.

Preferably the pilot symbol includes at least two sequences with constant envelope in both the frequency and time domains.

Preferably the length of the vectors used to determine the autocorrelation and the cross correlation of the received data are the length of a constant envelope sequence in the pilot symbol.

In one embodiment the step of determining the timing metric includes determining the result of:

$$|P_l| - T_{C1}\sqrt{R_l R_{l+L}}$$

where $P_l$ represents the cross correlation of the received data,
$T_{C1}$ represents the threshold value,
$R_l$ represents the autocorrelation of the received data beginning at sample l, and
$R_{l+L}$ represents the autocorrelation of the received data beginning at sample l+L.

In a further embodiment the step of determining the timing metric includes determining the result of:

$$|P_l| - T_{C1} \max(R_l, R_{l+L})$$

where $P_l$ represents the cross correlation of the received data,
$T_{C1}$ represents the threshold value,
max represents taking the maximum value of those in the brackets,
$R_l$ represents the autocorrelation of the received data beginning at sample l, and
$R_{l+L}$ represents the autocorrelation of the received data beginning at sample l+L.

In a further embodiment the step of determining the timing metric includes determining the result of:

$$|P_l| - T_{C1} R_l$$

where $P_l$ represents the cross correlation of the received data,
$T_{C1}$ represents the threshold value, and
$R_l$ represents the autocorrelation of the received data beginning at sample l.

In a further embodiment the step of determining the timing metric includes determining the result of:

$$|P_l| - T_{C1} R_{l+L}$$

where $P_l$ represents the cross correlation of the received data,
$T_{C1}$ represents the threshold value, and
$R_{l+L}$ represents the autocorrelation of the received data beginning at sample l+L.

In a still further embodiment the step of determining the timing metric includes determining the result of:

$$P_l^2 - T_{C1}^2 R_l^2$$

where $P_l$ represents the cross correlation of the received data,
$T_{C1}$ represents the threshold value, and
$R_l$ represents the autocorrelation of the received data beginning at sample l.

Preferably the step of determining the frequency offset includes determining the result of:

$$\frac{1}{2\pi LT} \arctan\left(\frac{\text{Im}\{P_l\}}{\text{Re}\{P_l\}}\right)$$

where $P_l$ represents the cross correlation of the received data,
L represent the length of a constant envelope sequence in the pilot symbol, and
T represents the period of a sample.

In broad terms in a further aspect the invention comprises a method of determining the start of a packet of data including a pilot symbol including a repeated sequence including the steps of:
receiving the data at a receiver as a series of data samples,
applying a correction based on an estimate of a frequency offset of the received data to a first vector of the received data to form a matched filter,
producing an autocorrelation of the first vector of the received data,
applying the matched filter to the received data to produce an output, determining a timing metric for the current sample of data as a function of the output of the matched filter, the autocorrelation of the first vector of the received data, the magnitude of the constant envelope of a sequence of the pilot symbol and a first threshold value, assessing whether the first timing metric is positive, if the first timing metric is not positive returning to the step of producing an autocorrelation at the first vector of the received data, and when the first timing metric becomes positive estimating the start of packet from the current data sample.

Preferably the pilot symbol includes at least two sequences with constant envelope in both the frequency and time domains.

Preferably the length of the matched filter is equal to the length of a sequence within the pilot symbol.

Preferably the length of the vector used to produce the autocorrelation is equal to the length of a sequence within the pilot symbol.

Preferably the vector of data used to produce the autocorrelation and the vector of data used to produce the output of the matched filter are the same.

Preferably the method of determining the start of a packet of data further includes the step of ensuring that a second timing metric is positive before estimating the start of the data packet.

Ideally the second timing metric is a function of a second threshold value, the autocorrelation of the received data and a cross correlation between the first vector of data and a second vector of the received data.

In one embodiment the step of determining the first timing metric includes the step of determining the result of:

$$|Q_l + Q_{l+1}| - T_{C2}\sqrt{LS}\sqrt{R_l}$$

where $Q_l$ represents the output of the matched filter for a vector of the received data starting at sample l, $Q_{l+1}$ represents the output of the matched filter for a vector of the received data starting at sample l+1, $T_{C2}$ represents the threshold value, L represents the length of a constant envelope sequence in the pilot symbol, S represents the per-sample magnitude of a constant envelope sequence in the pilot symbol, and $R_l$ represents the autocorrelation of the first vector of the received data In another embodiment the step of determining the first timing metric includes the step of determining the result of:

$$|Q_l + Q_{l+1}|^2 - T_{C2}^2 LS^2 R_l$$

where $Q_l$ represents the output of the matched filter for a vector of the received data starting at sample l, $Q_{l+1}$ represents the output of the matched filter for a vector of the received data starting at sample l+1, $T_{C2}$ represents the threshold value, L represents the length of a constant envelope sequence in the pilot symbol, S represents the per-sample magnitude of a constant envelope sequence in the pilot symbol, and $R_l$ represents the autocorrelation of the first vector of the received data.

Preferably the step of determining the start of packet includes the step of determining the result of:

$$l+2L-1|_{l=0}$$

where l represents the range of samples of the received data for which both the first and second timing metrics are positive.

In broad terms in a further aspect the invention comprises a method for estimating the phase offset of data including a pilot symbol including a repeated sequence including the steps of:

receiving the data at a receiver as a series of data samples, applying a correction based on an estimate of a frequency offset of the data to a vector of received data to form a matched filter, applying the matched filter to the received data, determining the correlation peak of the matched filter, and estimating the phase offset from the phase of the correlation peak.

Preferably the pilot symbol includes at least two sequences with constant envelope in both the frequency and time domains.

Preferably the length of the data vector used to form the matched filter is equal to the length of a sequence in the pilot symbol.

Preferably the step of determining the phase offset includes the step of determining the result of:

$$\arctan\left(\frac{\mathrm{Im}\{Q_0\}}{\mathrm{Re}\{Q_0\}}\right)$$

where arctan denotes the arctangent function,

Im denotes the imagery part of the number in brackets,

Re denotes the real part of the number in brackets, and $Q_0$ represents the matched filter correlation peak.

In broad terms in a further aspect the invention comprises a method of determining the timing offset of data including a pilot symbol including a repeated sequence including the steps of:

receiving the data at a receiver as a series of data samples, determining the start of a second sequence within the pilot symbol of the received data to an accuracy of half a data sample, taking a discrete Fourier transform of a vector of the received data, forming a vector product of the output of the discrete Fourier transform and the data sample of the second sequence, and estimating the timing offset from the vector product.

Preferably the pilot symbol includes at least two sequences with constant envelope in both the frequency and time domains.

Preferably the method of determining the timing offset further includes the step of applying a frequency offset correction to the received data before the step of taking the discrete Fourier transform of the data.

Preferably the method of determining the timing offset further includes the step of applying a phase offset correction to the received data before the step of taking the discrete Fourier transform of the data.

Preferably the discrete Fourier transform is an L-point discrete Fourier transform where L represents the length of one constant envelope sequence in the pilot symbol.

Preferably the step of determining the start of a second constant envelope sequence in the pilot symbol includes the steps of:

producing an autocorrelation of a first vector of the received data, applying a correction based on an estimate of a frequency offset of the received data to the first vector of the received data to form a matched filter, applying the matched filter to the received data to produce an output, determining a timing metric for the current sample of data as a function of the output of the matched filter, the autocorrelation of the first vector of the received data, the magnitude of the constant envelope of a sequence of the pilot symbol and a first threshold value, assessing when the first timing metric becomes positive, and estimating the start of packet from the current data sample.

Preferably the step of estimating the timing offset from the vector product includes the step of determining the result of:

$$\frac{LT}{2\pi} \frac{k^T\beta - \frac{1}{L}k^T oo^T\beta}{k^T k - \frac{1}{L}(k^T o)^2}$$

where L represents the length of a constant envelope sequence in the pilot symbol, T represents the period of a sample, k represents a vector containing numbers 0 to L−1, β represents the argument of the vector product, and o represents an L-length vector of ones.

In broad terms in a further aspect the invention comprises a receiver for detecting and synchronising packets received by a communications system including a front end arranged to receive data, a packet detect estimator arranged to detect a packet within the received data, a frequency offset estimator arranged to produce an estimate of the time-varying frequency offset of the received data, a start of packet estimator arranged to estimate the start of the packet of the received data, a phase offset estimator arranged to estimate the time-varying phase offset of the received data and a time offset estimator arranged to estimate the time-varying time offset of the received data.

Preferably the frequency offset estimation means of the receiver is further arranged to estimate the time-varying frequency offset of the received data again after the packet start has been estimated.

Preferably the receiver further includes correction means arranged to apply a correction based on the estimated frequency offset to the received data before the start of packet estimation means estimates the start of packet.

Preferably the time offset estimation means of the receiver is further arranged to apply corrections based on the frequency and phase offsets to the received data before estimating the time varying time offset.

In broad terms in a further aspect the invention comprises frequency offset estimator arranged to determine the frequency offset of the received data including a pilot symbol including a repeated sequence including:

first correlation means arranged to produce an autocorrelation of a first vector of the received data, second correlation means arranged to produce a cross correlation between the first vector of the received data and a second vector of the received data, and computation means arranged to determine a timing metric as a function of the autocorrelation, the cross correlation and a threshold value, assess when the timing metric becomes positive, and when the timing metric becomes positive estimate the frequency offset from the phase of the cross correlation.

Preferably the calculation means of the frequency offset estimator is further arranged to:

determine the phase of the cross correlation of the first vector and the second vector once the start of a data packet has been detected, and estimate the frequency offset from the phase of the cross correlation.

Preferably the pilot symbol includes at least two sequences with constant envelope in both the frequency and time domains.

Preferably the length of the vectors used to determine the autocorrelation and the cross correlation of the received data are the same length as a sequence in the pilot symbol.

In one embodiment the computation means of the frequency offset estimator is arranged to assess the timing metric as:

$$|P_l| - T_{C1}\sqrt{R_l R_{l+L}}$$

where $P_l$ represents the cross correlation of the received data, $T_{C1}$ represents the threshold value, $R_l$ represents the autocorrelation of the received data beginning at sample l, and $R_{l+L}$ represents the autocorrelation of the received data beginning at sample l+L.

In a further embodiment the computation means of the frequency offset estimator is arranged to assess the timing metric as:

$$|P_l| - T_{C1}\max(R_l R_{l+L})$$

where $P_l$ represents the cross correlation of the received data, $T_{C1}$ represents the threshold value, max represents taking the maximum value of those in the brackets, $R_l$ represents the autocorrelation of the received data beginning at sample l, and R+L represents the autocorrelation of the received data beginning at sample l+L.

In a further embodiment the computation means of the frequency offset estimator is arranged to assess the timing metric as:

$$|P_l| - T_{C1} R_l$$

where $P_l$ represents the cross correlation of the received data, $T_{C1}$ represents the threshold value, and $R_l$ represents the autocorrelation of the received data beginning at sample l.

In a further embodiment the computation means of the frequency offset estimator is arranged to assess the timing metric as:

$$|P_l| - T_{C1} R_{l+L}$$

where $P_l$ represents the cross correlation of the received data, $T_{C1}$ represents the threshold value, and $R_{l+L}$ represents the autocorrelation of the received data beginning at sample l+L.

In a still further embodiment the computation means of the frequency offset estimator is arranged to assess the timing metric as:

$$P_l^2 - T_{C1}^2 R_l^2$$

where $P_l$ represents the cross correlation of the received data, $T_{C1}$ represents the threshold value, and $R_l$ represents the autocorrelation of the received data beginning at sample l.

Preferably the computation means of the frequency offset estimator is further arranged to estimate the frequency offset as:

$$\frac{1}{2\pi LT}\arctan\left(\frac{\text{Im}\{P_l\}}{\text{Re}\{P_l\}}\right)$$

where $P_l$ represents the cross correlation of the received data,
L represent the length of a constant envelope sequence in the pilot symbol, and
T represents the period of a sample.

In broad terms in a further aspect the invention comprises a start of packet estimator arranged to estimate the start of a packet of a series of samples of data including a pilot symbol including a repeated sequence including:
correlator means arranged to produce an autocorrelation of a first vector of the received data,
matched filter forming means arranged to apply a correction based on an estimate of a frequency offset of the received data to the first vector of the received data to form a matched filter,
matched filter means arranged to apply the matched filter to the received data to produce an output, and
computation means arranged to determine a timing metric for the current sample of data as a function of the output of the matched filter, the autocorrelation of the first vector of the received data, the magnitude of the constant envelope of a sequence within the pilot symbol and a first threshold value, assess when the first timing metric becomes positive, and estimate the start of packet from the current data sample.

Preferably the length of the matched filter is equal to the length of a constant envelope sequence within the pilot symbol.

Preferably the length of the vector used to produce the autocorrelation is equal to the length of a constant envelope sequence within the pilot symbol.

Preferably the vector of data used to produce the autocorrelation and the vector of data used to produce the output of the matched filter are the same.

Preferably the computation means of the start of packet estimator is further arranged to ensure that a second timing metric is positive before estimating the start of the data packet.

Ideally the second timing metric is a function of a second threshold value, the autocorrelation of the received data and a cross correlation between the first vector of data and a second vector of the received data.

In one embodiment the computation means of the start of packet estimator is arranged to assess the timing metric as:

$|Q_l+Q_{l+1}|-T_{C2}\sqrt{LS}\sqrt{R_l}$ where $Q_l$ represents the output of the matched filter for a vector of the received data starting at sample l,
$Q_{l+1}$ represents the output of the matched filter for a vector of the received data starting at sample l+1,
$T_{C2}$ represents the threshold value,
L represents the length of a constant envelope sequence in the pilot symbol,
S represents the per-sample magnitude of a constant envelope sequence in the pilot symbol, and
$R_l$ represents the autocorrelation of the first vector of the received data.

In another embodiment the computation means of the start of packet estimator is arranged to assess the timing metric as:

$|Q_l+Q_{l+1}|^2-T_{C2}^2 LS^2 R_l$ where $Q_l$ represents the output of the matched filter for a vector of the received data starting at sample l,
$Q_{l+1}$ represents the output of the matched filter for a vector of the received data starting at sample l+1,
$T_{C2}$ represents the threshold value,
L represents the length of a constant envelope sequence in the pilot symbol,
S represents the per-sample magnitude of a constant envelope sequence in the pilot symbol, and
$R_l$ represents the autocorrelation of the first vector of the received data.

Preferably the computation means of the start of packet estimator is arranged to assess the start of packet as:

$l+2L-1|_{l=0}$ where l represents the range of samples of the received data for which both the first and second timing metrics are positive.

In broad terms in a further aspect the invention comprises a phase offset estimator arranged to estimate the phase offset of data including a pilot symbol including a repeated sequence including:
computation means arranged to apply a correction based on an estimate of a frequency offset of the data to a vector of received data to form a matched filter,
a matched filter arranged to filter to the received data, and
the computation means further arranged to determine the correlation peak of the matched filter, and estimate the phase offset from the phase of the correlation peak.

Preferably the length of the data vector used to form the matched filter is equal to the length of a sequence in the pilot symbol.

Preferably the computation means of the phase offset estimator is further arranged to estimate the phase offset as:

$$\arctan\left(\frac{\text{Im}\{Q_0\}}{\text{Re}\{Q_0\}}\right)$$

where arctan denotes the arctangent function,
Im denotes the imagery part of the number in brackets,
Re denotes the real part of the number in brackets, and
$Q_0$ represents the matched filter correlation peak.

In broad terms in a further aspect the invention comprises a timing offset estimator arranged to estimate the timing offset of a received series of samples of data including a pilot symbol including a repeated sequence including:
computation means arranged to determine the start of a second sequence within the pilot symbol of the received data to an accuracy of half a data sample,
Fourier transform means arranged to perform a discrete Fourier transform on a vector of the received data, and
the computation means further arranged to form a vector product of the output of the discrete Fourier transform and the data sample of the second constant envelope sequence, and estimate the timing offset from the vector product.

Preferably the computation means of the timing offset estimator is further arranged to apply a frequency offset correction to the received data before the Fourier transform means takes the discrete Fourier transform of the data.

Preferably the computation means of the timing offset estimator is further arranged to apply a phase offset correction to the received data before the Fourier transform means takes the discrete Fourier transform of the data.

Preferably the discrete Fourier transform is an L-point discrete Fourier transform where L represents the length of a sequence in the pilot symbol.

Preferably the computation means of the timing offset estimator is further arranged to determine the start of a second sequence in the pilot symbol by:
- producing an autocorrelation of a first vector of the received data,
- applying a correction based on an estimate of a frequency offset of the received data to the first vector of the received data to form a matched filter,
- applying the matched filter to the received data to produce an output,
- determining a timing metric for the current sample of data as a function of the output of the matched filter, the autocorrelation of the first vector of the received data, the magnitude of the constant envelope of a sequence of the pilot symbol and a first threshold value,
- assessing when the first timing metric becomes positive, and
- when the first timing metric becomes positive estimating the start of packet from the current data sample.

Preferably the computation means of the thing offset estimator is further arranged to estimate the timing offset from the vector product by determining the result of:

$$\frac{LT}{2\pi} \frac{k^T\beta - \frac{1}{L}k^Too^T\beta}{k^Tk - \frac{1}{L}(k^To)^2}$$

where L represents the length of a constant envelope sequence in the pilot symbol, T represents the period of a sample, k represents a vector containing numbers 0 to L−1, β represents the argument of the vector product, and o represents an L-length vector of ones.

BRIEF DESCRIPTION OF FIGURES

A preferred form system and method of the invention will be further described with reference to the accompanying figures by way of example only and without intending to be limiting, wherein.

DETAILED DESCRIPTION OF PREFERRED FORMS

The example system described here uses OFDM and a single pilot symbol based on a (repeated) sequence, preferably a maximum length sequence to obtain initial estimates of the start of packet and time varying frequency-, phase- and time-offsets, n, $v(0)$, $\theta(0)$ and $\tau_s(0)$ respectively. Subsequent OFDM data is used to track the time varying frequency-, phase- and time-offsets, $v(nT)$, $\theta(nT)$ and $\tau_s(nT)$. This method requires less overhead than previously reported methods, as it requires only a single pilot symbol and relies on neither null symbols, pilot tones nor cyclic prefixes to obtain or track parameters. Further, since the preferred pilot symbol is a (frequency domain) maximum length sequence which is coherently demodulated, the pilot symbol may be used for channel estimation, and the narrowband channel parameter estimates are maximum likelihood. This system is described below and also described and claimed in the Applicant's PCT application PCT/NZ01/00173.

Figure 1A:
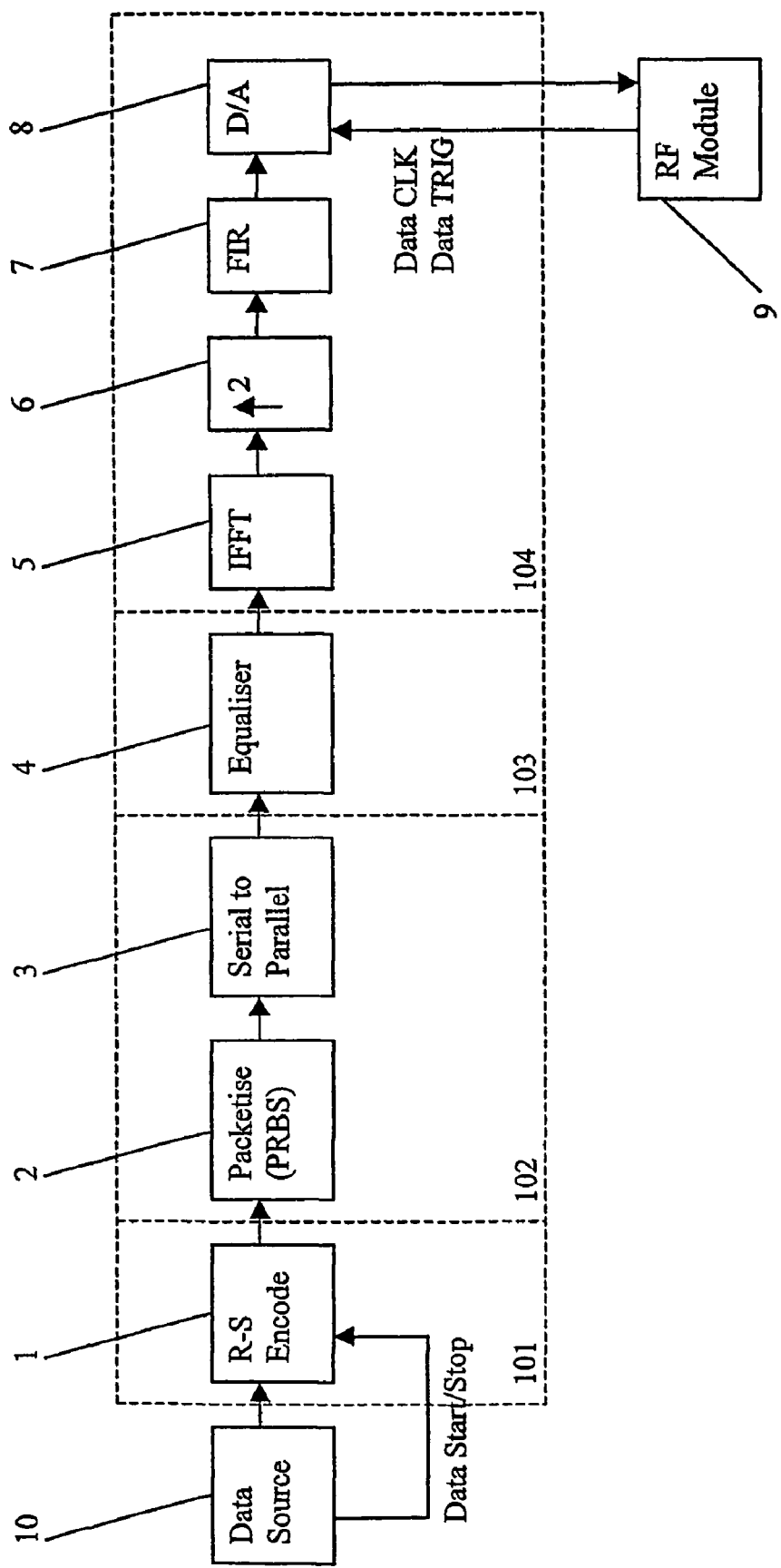
FIG. 1A is a block diagram of a transmitter that may be used to send OFDM data packets.
Figure 1B:
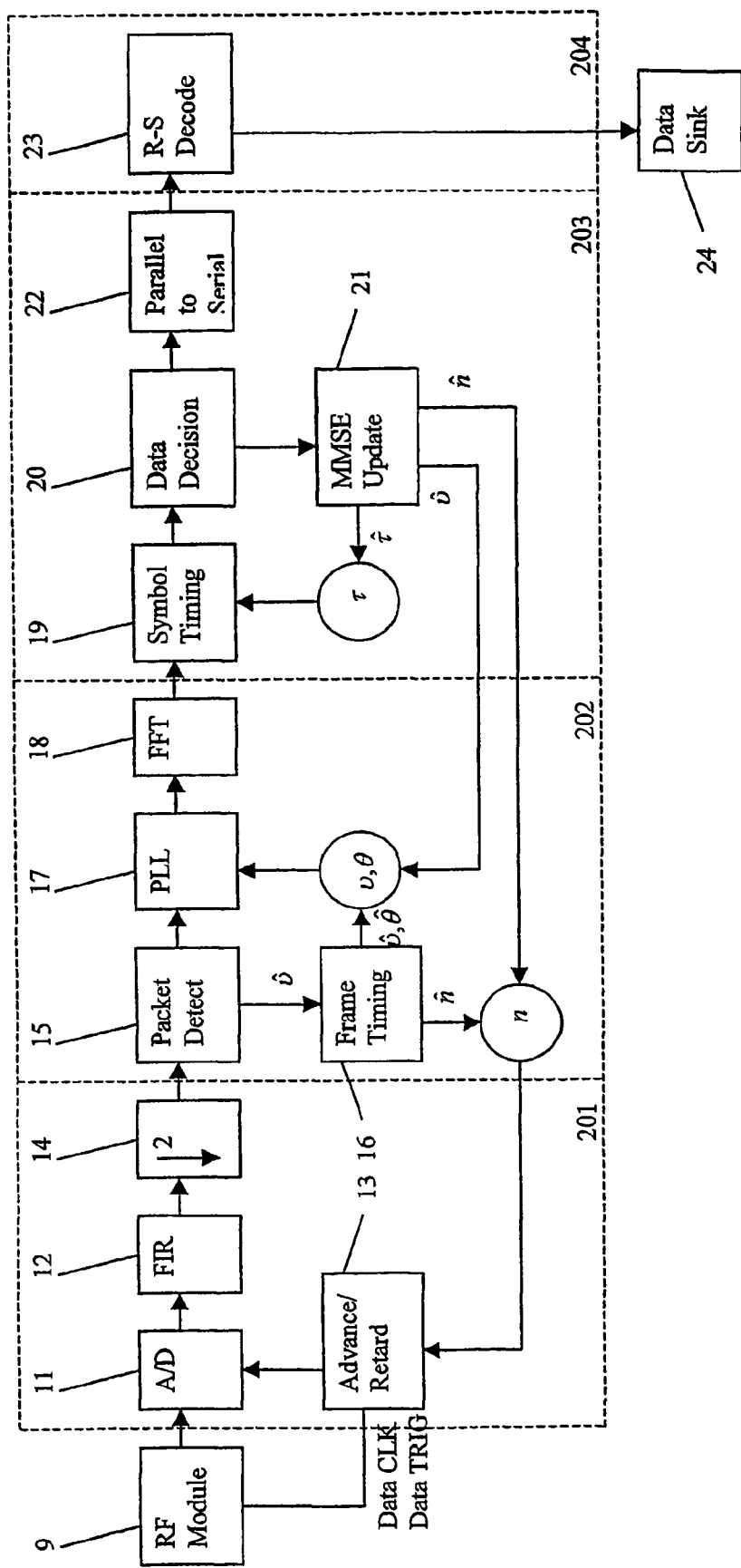
FIG. 1B is a block diagram of a receiver that may be used to receive OFDM data packets.

FIGS. 1A and 1B are block diagrams of a transmitter and receiver that may be used with the channel parameter and start of packet detection algorithms of the invention. An example of parameters that may be used in this system is shown in Table 1. These parameters are by way of example only and should not be seen as limiting. The parameters may be varied without going beyond the scope of the invention. The example system with these parameters was used to generate the results shown in FIGS. 6A, 6B and 6C to demonstrate the invention.

TABLE 1

Key parameters of an example system.

| Parameter | Value |
| --- | --- |
| OFDM Block Size | 128 |
| Number of Sub-Carriers | 100 |
| Modulation | QPSK |
| Coding | Reed-Solomon (15, 11) |
| Sample Rate | 1 MHz |
| RF Carrier | 2.45 GHz |
| Sub-Carrier Spacing | 7.812 kHz |
| −3 dB Bandwidth | 785 kHz |
| Symbol Duration | 128 µs |
| Coded Data Rate QPSK | 1.56 Mbit/s |
| Uncoded Data Rate QPSK | 1.15 Mbit/s |

In the example system both the transmitter and receiver modules were implemented using a number of digital signal processors (DSPs), each running at 40 MIPS. At the symbol sample rate of 1 MHz, this restricted each processor to a maximum of 40 instruction cycles per symbol. The processor boards were connected, as analogue complex baseband, through an interface module to the RF up- and down-converters. As only single channel A/D and D/A conversion was available for the processor boards, the in-phase and quadrature samples were digitally multiplexed into (out of) the A/D (D/A) converter at double the symbol sample rate. Further, the complex baseband was up-sampled (down-sampled) by two into (out of) the A/D (D/A) converter and low-pass filtered digitally to ease the analogue transmitter and receiver filter requirements.

The baseband transmitter, shown in FIG. 1A, can be viewed as consisting of four modules. Module 101 contains encoder 1 such as a Reed-Solomon encoder, module 102 contains a transmit modulator 2 and framer 3, module 103 contains a pre-distortion equaliser 4, and module 104 contains an OFDM inverse fast Fourier transformer (IFFT) 5 plus signal conditioner 6, 7 and D/A converter driver 8.

Each of these modules may be implemented using relatively standard technology. The functions of each block have been grouped into larger modules for convenience only.

Data source 10 provides raw data to encoder 1. The data is ideally binary. If data is provided to the data source in another form then preferably the data source converts the data to binary data. In use the data source will be connected to a piece of electronic equipment (such as a laptop computer or wireless phone) that provides data to the data source. In some cases the data source module may be the electronic equipment itself or a link to the electronic equipment. The data source may also communicate to encoder 1 to begin or cease encoding data using the Data Start/Stop arrow illustrated in FIG. 1A.

Encoder 1 then encodes the data to add error detection and/or correction information to the raw data. In FIG. 1A the encoder is shown as a Reed-Solomon encoder. However the encoder may be any BCH encoder or other suitable encoder. A Reed-Solomon encoder has the advantage of encoding, and thereby protecting from error, blocks of data bits. This provides frequency domain data with good protection from frequency-selective fading, which will tend to induce bit errors in blocks of data bits. The encoder is arranged to segment the data received from data source 10 into segments with a predetermined number of bits. When a cyclic coder (like a Reed-Solomon coder) is used the number of data bits in each segment depends on the actual code used. For each segment the coder performs the code. In the case of a cyclic encoder this includes adding error detection and/or correction information to the end of the code. The coded data segments are then passed to transmit modulator 2.

Transmit modulator 2 arranges the coded data segments into packets and appends a pilot symbol to the start of each packet. Each data packet includes at least one coded data segment. If an encoder is not used then the transmit modulator receives data directly from data source 10 and arranges the data into packets before appending the pilot symbol to the start of each packet. The pilot symbol is a repeated pseudo random binary sequence. The pilot symbol is used in the receiver, firstly, to identify the packet start, secondly, to produce an initial estimate of the time-varying channel parameters described previously and, thirdly, to "sound" the channel to produce an initial estimate of the frequency-selective fading channel for the pre-distortion equaliser 4. Transmit modulator 2 may be further arranged to pad each packet to a predetermined length. In general only the last packet in a data sequence will need padding as all other packets will have been, segmented to the required length by the encoder. Alternatively the encoder may be arranged to pad short sequences to the required length before encoding data. The transmit modulator may also be arranged to take the coded data and transfer it to a modulation scheme such as QPSK or 64 QAM. Other suitable modulation types may also be used.

Framer 3 takes the packets provided by transmit modulator 2 and multiplexes the data from serial data to parallel data. There may be less parallel data paths from framer 3 then there are data bits in a packet. Ideally the number of data bits in each packet is an integer multiple of the number of parallel paths from the framer. The transmit modulator 2 and framer 3 may be implemented using finite state machine architecture.

The data from framer 3 then passes to equaliser 4. It has been shown that the signal bandwidth in a typical indoor propagation environment in some instances is sufficiently narrow to experience frequency flat fading. Equaliser 4 is a pre-distortion equaliser arranged to compensate for non-ideal composite analogue filter amplitude and phase responses in the transmitter and receiver RF sections. Use of pre-distortion equaliser 4 ensures that the composite transmit/receiver filter is linear phase. Alternatively in addition the pre-distortion equaliser may be arranged to equalise the channel. In this case if the receiver and transmitter are coupled together as a transceiver then when data is received the pilot symbol of each data packet is used (among other things) to "sound" the channel. The results of "sounding" the channel are used to produce an initial estimate of the frequency selective fading channel for the pre-distortion equaliser. The channel estimate may be updated with each received packet. Exploiting inherent OFDM processing efficiency, the equaliser implementation is made computationally efficient by operating directly in the frequency domain. Thus, the number of complex multiplies (say 100) per OFDM block required to implement the frequency domain equaliser produces equivalent performance to a time-domain tap equaliser with the same number of taps (100).

Following the pre-distortion equaliser is inverse fast Fourier transform (IFFT) operator 5. The IFFT operator receives parallel data in the frequency domain and transforms it into time domain data. The time domain data then passes to up-sampler 6 that samples that data at greater than the nominal bit rate. The use of the up-sampler reduces the performance requirement for the output stage digital low pass filter 7. Typically data is sampled at twice the nominal bit rate but other rates of over sampling could be used. Together with FIR filter 7 the up-sampler makes up a signal conditioner arranged to reduce the performance requirements for the output stage digital low pass filter and subsequent analogue filter. Ideally the FIR filter 7 is arranged as a low pass filter and is arranged to remove out-of-band noise from the data.

Finally the equalised time domain data is converted from digital data to analogue data in digital to analogue (D/A) converter 8 and modulated onto a carrier wave in a higher frequency band for transmission in RF module 9. The data is then transmitted. Ideally RF block 9 includes a quadrature modulator, frequency up-converter, bandpass filter and power amplifier.

The baseband receiver, shown in FIG. 1B, consists of four modules. Module 201 contains an A/D converter driver 11, 13 and signal conditioner 12, 14, module 202 contains a frame detector 15, 16 and first stage receiver 17, 18, module 203 contains a second stage receiver including symbol timing 19 and decision making 20 means, and module 204 contains a decoder 23.

The data received by RF block 9 which is arranged to shift the data back to baseband. Ideally the RF block of the receiver includes a low noise amplifier, bandpass filter, quadrature demodulator and frequency down-converter. The baseband data is then sampled by analogue to digital (A/D) converter 11. This converts the received data from an analogue signal to a digital signal. Ideally the A/D converter samples the received data at greater than the nominal bit rate. The sampled signal then passes through signal conditioner 12, 14 that compensates for some of the channel and noise induced distortions. A further purpose of the signal conditioner 12 is to digitally low pass filter the baseband signal to remove out-of-band noise. Down-sampler 14 samples the data at the nominal bit rate. The data is then passed to packet detector 15.

The data received by packet detector 15 may be described by the equation $$r^\delta(t) = \sum_n r(t) \exp^{j[2\pi \nu t + \theta]} \delta(t - nT - \tau)$$

where r(t) is the convolution of the message data, channel and the signal conditioner 12, 14, ν is the time-varying frequency error, θ is the time varying phase error and τ is the time-varying time error.

Packet detector 15 and frame timing block 16 search for significant pilot symbol correlations in the received data. The packet detect block also provides the frame timing block 16 with an estimate of the time-varying frequency error. When a pilot symbol is detected the frame detector 15, 16 then makes initial estimates of n, ν(0) and θ(0) and initialises or updates the local oscillator compensation phase locked loop (PLL) 17.

Frame timing module 16 is further arranged to provide a start of packet estimate to timing correction block 13. Along with a start of packet estimate provided by MMSE update block 21, the timing correction block advances or retards sampling by the A/D converter by a fraction of a sample as required. For example if the A/D converter samples the received and down-converted data at twice the nominal bit rate then timing correction block 13 may advance or retard the A/D converter by half a sample. During the remainder of frame reception, module 202 is the first stage of the OFDM receiver, applying the compensation PLL 17 and performing the forward FFT 18 required by OFDM demodulation.

After the start of a packet has been detected by packet detect block 15 the packet is passed through phase locked loop 17. Phase locked loop 17 also receives estimate of the time varying phase error and the time varying frequency error. The phase locked loop uses the time varying phase and frequency error estimates to remove the time varying phase and frequency errors from the data packets.

The corrected data packets then pass through forward fast Fourier transform operator 18 that transforms the data from time domain data to frequency domain data.

Following transformation the frequency domain data passes into the second stage receiver. The second stage receiver commences operation on frame detection. Its functions are, initially, to estimate the time varying sub-sample time offset τ(0) using MMSE block 21 and, throughout the remainder of the frame, to apply symbol timing error correction using symbol timing block 19 and update estimates of the time varying phase error θ(n), and thereby the time varying frequency error ν(n), and the time varying time error τ(n) using minimum mean square error (MMSE) estimation. Note that, since the symbol timing error is bounded by definition, that is −½<τ≦½, when this range is exceeded, an increment or decrement to the current sample number n is required. Incrementing or decrementing the current sample number of a function performed by timing correction block 13. Data decision block 20 follows symbol timing block 19. Data decision block 20 makes hard decisions on each data bit (symbol) prior to error detection and correction.

Data decision block 20 may include a demodulator. Acting together with the decision process, the demodulator converts the data back from a modulation scheme, such as QPSK or 64 QAM, to binary data.

After hard decisions have been made on the data the data streams are converted back from parallel to serial data by demultiplexer 22.

Following demultiplexer 22 is decoder 23. The decoder decodes the coded data and performs error corrections and/or detection up to the limit of the decoder. The decoder is matched to encoder 1 of the transmitter of FIG. 1. For example if the encoder is a Reed-Solomon encoder then the decoder will be a Reed-Solomon decoder. Following decoding of the data the data is then passed to the electronic equipment attached to the receiver as data sink 24.

Figure 2A:
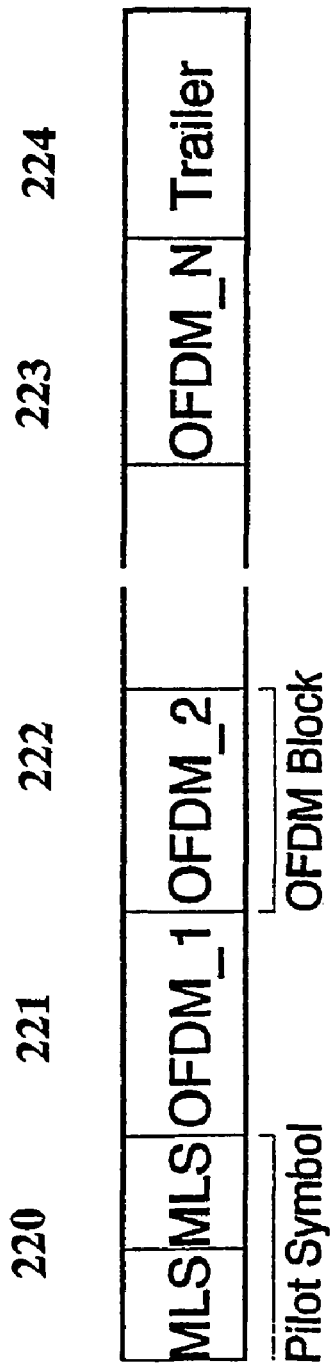
FIG. 2A is a packet for an OFDM system with a frequency flat fading channel.
Figure 2B:
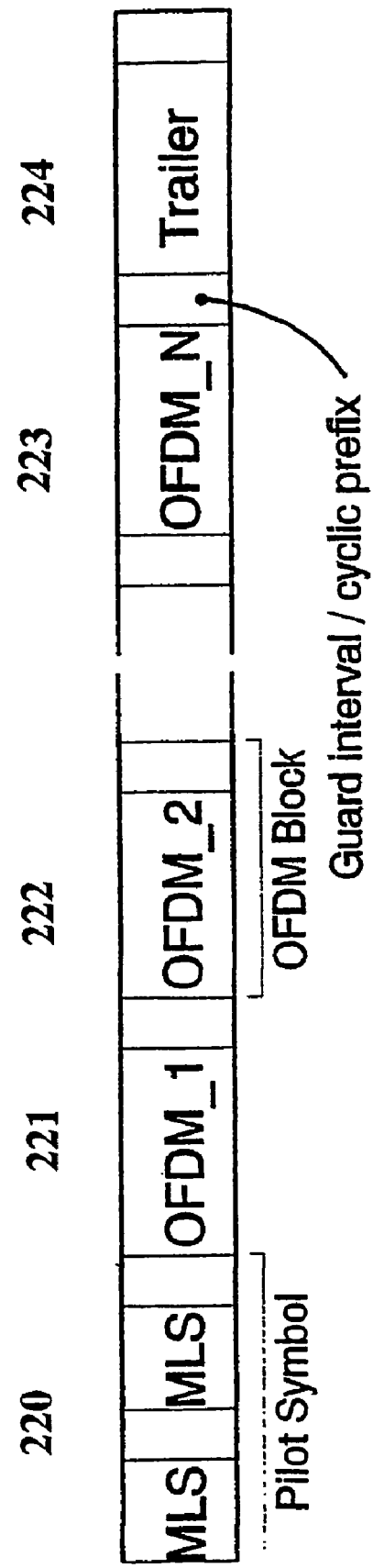
FIG. 2B is a packet for an OFDM system with the time-dispersive channel.

The key to initial acquisition of the required combined channel and system parameters is the pilot symbol depicted in FIG. 2A or FIG. 2B, which is added to the transmitted data by the "Packetise" 2 block shown in FIG. 1A and interpreted by the "Packet Detect" 15 block shown in FIG. 1B. This pilot symbol comprises an L-length complex pseudo random binary sequence (PRBS), of half the length of the OFDM symbol period, which is repeated. The PRBS is synthesised in the frequency domain and occupies a similar bandwidth to OFDM data, noting that, as the PRBS is half the length of an OFDM symbol, each PRBS sub-carrier has twice the bandwidth of an OFDM sub-carrier. Where it is important to be able to distinguish between pilot symbols and true OFDM data, it is possible to use pseudo-MLS complex sequences which exhibit "nearly" ideal correlation properties and are chosen to have a different symbol constellation to the data symbols. The data packet shown in FIG. 2A is ideally for use in frequency flat fading channels. This data packet begins with the repeated pilot symbol 220 which is followed by the OFDM data symbols 221-223. At the end of the sequence of OFDM data symbols is a trailer 224. The trailer serves at the end of the packet. For channels such as time-dispersive (frequency selective) channels a different data packet structure is used. This structure includes a guard interval after each pilot symbol and OFDM symbol as well as after the trailer. The guard symbol may be a cyclic prefix or other suitable form of guard symbol. The guard symbol performs the function of keeping some distance between the pilot and data symbols and thus reducing inter-symbol interference.

The example system uses PRBS codes, as differentiation between pilot symbols and OFDM data was not a consideration: once the start of a packet has been detected, no further correlations are performed. One advantage of using PRBS codes is that all sub-carriers are occupied by the (constant envelope) PRBS, thus maximising the pilot symbol SNR at the receiver. Further, an important property of a maximum length sequence is that it has a constant envelope in both the time- and frequency-domains, thus the SNR of each sample is maximised and constant no matter which domain it is processed in. In principal, any signal which is constant envelope in both the time and frequency domains, can be used in place of the PRBS. Such signals may include chirps for example.

Figure 3A:
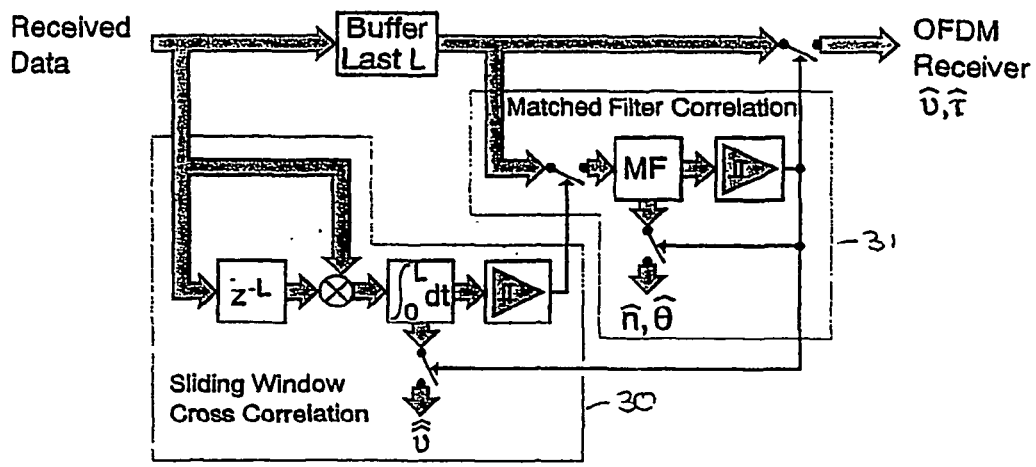
FIG. 3A is a block diagram of a packet detect block for estimating channel parameters.
Figure 4:
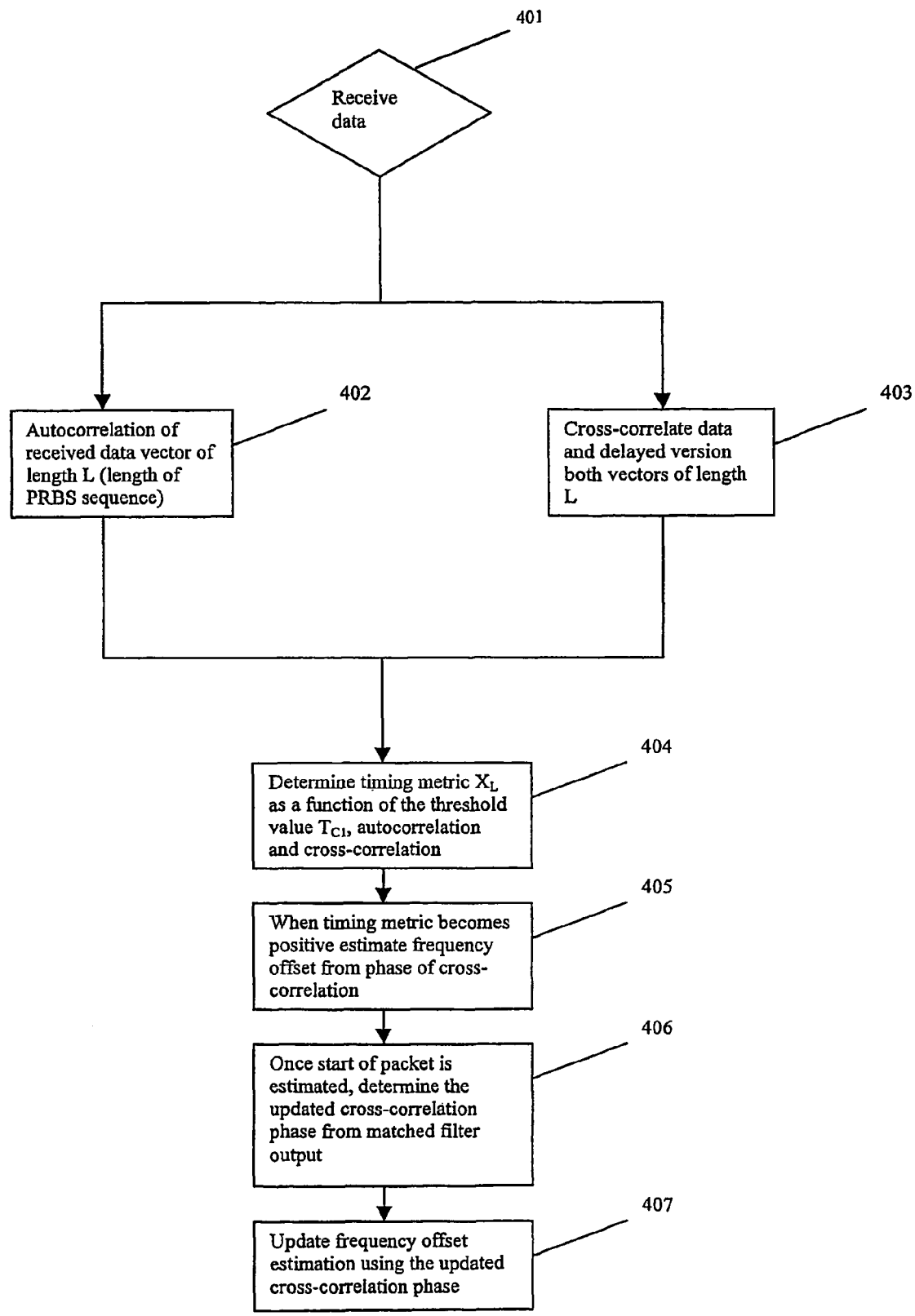
FIG. 4 is an algorithm showing the method used to determine the frequency offset.

FIG. 3A shows the initial synchronisation process as may be used in packet detect block 15 of FIG. 1B. FIG. 4 shows the algorithm used to determine the frequency offset. Once the data has been received it is autocorrelated at block 402 and cross correlated at block 403 with the autocorrelation and cross correlation vectors the same length as one sequence in the pilot symbol. A timing metric shown in block 404 is then determined for the frequency offset estimation. The timing metric is updated at each sample as new cross correlation and autocorrelation values are determined. Once the timing metric becomes positive in block 405 the phase of the cross correlation is used to estimate the frequency offset. This forms the basic frequency offset estimation. At a later stage when the start of packet has been accurately estimated the frequency offset is re-estimated from the current cross correlation phase as shown in blocks 406 and 407. The received signal of a transmitted signal s(t), corrupted by the narrow-band channel described by equation (3), additionally corrupted by additive white Gaussian noise (AWGN) and sampled with period T may be written as $$r^\delta(nT) = \sum_{n=0}^{N-1} \{s(t)a(t)e^{-j[2\pi v(t)t + \theta(t)]} + \eta(t)\}\delta[t - nT - \tau_s(t)] \quad 4$$

where $\eta(t)$ is complex AWGN having variance $\sigma_W^2$. Assuming that channel parameters may be accurately approximated as constant over the duration of one OFDM symbol, the time-variation may be neglected, and the nth output sample from equation (4) can be re-written as $$r_n = as(nT-\tau_s)e^{-j[2\pi v(nT-\tau_s) + \theta]} + \eta(nT) \quad 5$$

where the subscript n assumes T as implicit.

To estimate the time-varying frequency offset the sampled received data is both autocorrelated and cross correlated as shown in autocorrelation block 402 and cross correlation block 403 in FIG. 4. The received data is cross-correlated and autocorrelated in vectors of length L (the length of one sequence in the pilot symbol). For the cross correlation one vector of the received data is delayed in an L-length delay line. The output of the cross correlation may be written as $$P_l \doteq r_l^H r_{l+L} \quad 6$$
$$= a^2 s_l^H s_{l+L} e^{-j2\pi vLT} + a(s_l^H \eta_{l+L} + s_{l+L} \eta_l^H) + \eta_l^H \eta_{l+L}$$
$$\approx (L - |l|)a^2 S^2 e^{-j2\pi vLT} + \sqrt{2[(L-|l|)a^2 S^2 + L\sigma_w^2]}\, \eta_l$$

where $r_l \doteq [r_l, r_{l+1}, \ldots r_{l+L-1}]^T$ is an L-length column vector of the received data and $[\cdot]^H$ denotes Hermitian transpose, $\eta_l$ is a zero mean complex Gaussian random variable (RV) with variance $\sigma_w^2$, S is the per-sample magnitude of the PRBS pilot symbol, and $P_L$ is the lth output sample of the L-length sliding window integrate-and-dump cross correlator 30, shown in FIG. 3A. This may be written in vector form. In equation 6 the first term on the right of the approximately equals sign is the signal term and the second term is the composite noise term. The Hermitian transpose of $r_L$ is used to show that the cross correlation is an element by element multiplication producing a single value cross correlation output, $P_L$. Both vectors $r_l$ and $r_{l+L}$ have length L, the length of the one sequence in the pilot symbol.

The autocorrelation for $r_l$ is similar to the cross correlation with vector $r_l$ having length L, the length of one sequence in the pilot symbol. The autocorrelation may be written as $$R_l \doteq r_l^{Hal\,rah\,l}$$

Again the Hermitian transpose of $r_l$ is used to show that the autocorrelation is an element by element multiplication producing a single value autocorrelation output, $R_l$.

In the above cross correlation and autocorrelation l=0 represents the start of the first sequence in the pilot symbol. Using this definition, cross-correlator outputs for l<0 involve at least one input sample for which the composite subscript is less than one: these samples are noise only. The correlator output at l=0 is the cross correlation of the two (identical) halves of the pilot symbol. For l>0, the correlator output involves at least one input sample for which the composite subscript is larger than 2L−1: these input samples are data rather than pilot symbol. To determine the start of the transmission it is necessary to determine where l=0 occurs in the cross-correlator.

The initial synchronisation process, shown in FIG. 3A, is the sliding window integrate-and-dump cross correlation 30. The timing metric used here is obtained by modifying the non-central correlation coefficient $$|\rho_l| \doteq \frac{|\langle r_l^H r_{l+L}\rangle|}{\sqrt{\langle r_l^H r_l\rangle\langle r_{l+L}^H r_{l+L}\rangle}} \qquad 7$$

$$= \frac{|P_l|}{\sqrt{R_l R_{l+L}}}$$

Where $$R_l \doteq r_l^H r_l \qquad 8$$

$$\approx L(a^2 S^2 + 2\sigma_w^2) + 2\sqrt{L(a^2 S^2 + \sigma_w^2)}\,\text{Re}\{\eta_l\}$$

the autocorrelation of the received data, is a real non-central Gaussian RV. This second correlator, the autocorrelator, is an L-length sliding window autocorrelator used to estimate the received signal power. The first term on the right of the approximately equals sign is the signal term and the second term is the noise term.

The event of packet detection occurs when the timing metric $|\rho_l|$ exceeds a pre-defined threshold of correlation, defined as $T_{C1}$ as shown in block 404 of FIG. 4. As division is computationally expensive in DSP, the start of packet equivalently, and more efficiently, may be evaluated as $X_l \doteq |P_l| - T_{C1}\sqrt{R_l R_{l+L}}$. When the normalised cross correlation crosses the threshold $T_{C1}$, $X_l$ becomes positive indicating the start of the data packet. Note that, due to real-world conditions such as non-linear receiver effects and interference, it was found empirically that $$X_l \doteq |P_l| - T_{C1}\max(R_l, R_{l+L}) \qquad 9$$

was more robust in practise. Further, as $R_l$ was found to be significantly correlated across l in real-world conditions, it was found empirically that either $$X_l = |P_l| - T_{C1}R_l \qquad (10)$$

Or $X_l = |P_l| - T_{C1}R_{l+L}$ typically was evaluated per packet. Thus, although it is important to implement equation (9), the fundamental AWGN-only analyses consider equation (10) to enable real world effects to be analysed subsequently. As packet detection occurs simply when $X_l$ becomes positive, a less computationally expensive (but equivalent) DSP implementation of equation (10) is $X'_l = P_l^2 - T_{C1}^2 R_l^2$.

The threshold of correlation $T_{C1}$ must be set at a level such that $X_l$ becomes positive when the start of packet occurs but it must also be low enough to always indicate the start of a packet, ie it must be low enough so that $P_l > T_{C1}\sqrt{R_l R_{l+L}}$ (or the equivalent inequality for the particular metric used) when the start of packet occurs.

Figure 3B:
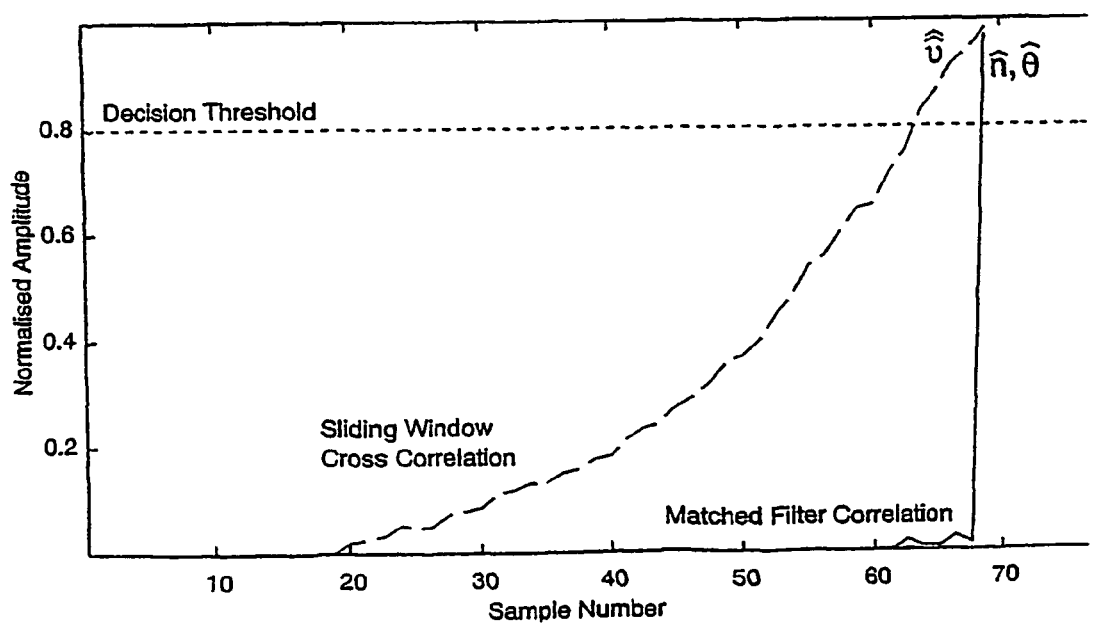
FIG. 3B shows the outputs of the correlators used for detecting a packet and detecting the start of a packet.

This cross correlation is computationally efficient: for example an Analog Devices® ADSP21060 SHARC™ implementation requires 19 instruction cycles per sample to calculate $X'_l$. Note that this calculation is independent of the length of each sequence of the pilot symbol, due to the integrate-and-dump implementation. However, the cross correlation timing metric has poor localisibility, as illustrated in FIG. 3B, and additionally suffers a 3 dB SNR penalty over a matched filter detection since the two received sequences cross-correlated each contain an AWGN component. Thus $X_l$ is not the best metric for estimating the start of packet sample.

As shown in block 405 and 406 of FIG. 4 when the metric $X_l$ becomes positive, the phase of the cross correlation $P_l$ is used to estimate the frequency offset. The frequency offset may be estimated as $$\hat{v} \doteq \frac{1}{2\pi LT}a\tan\left(\frac{\text{Im}\{P_l\}}{\text{Re}\{P_l\}}\right) \qquad 11$$

which has been shown to be the maximum likelihood estimate, and noting that atan denotes arc tangent. As $X_l$ typically first becomes positive for l<0 ie before the packet begins, $P_l$ typically will not be at its peak value, so the initial estimate of v is regarded as a forward estimate which is ideally subsequently improved upon. This initial estimate of the time-varying frequency offset is used to assist in accurately estimating that start of packet. Once the start of packet has been accurately estimated then the time varying frequency offset is updated as shown in block 407 of FIG. 4. Further details of the update procedure for the time varying frequency offset are given later.

Figure 5:
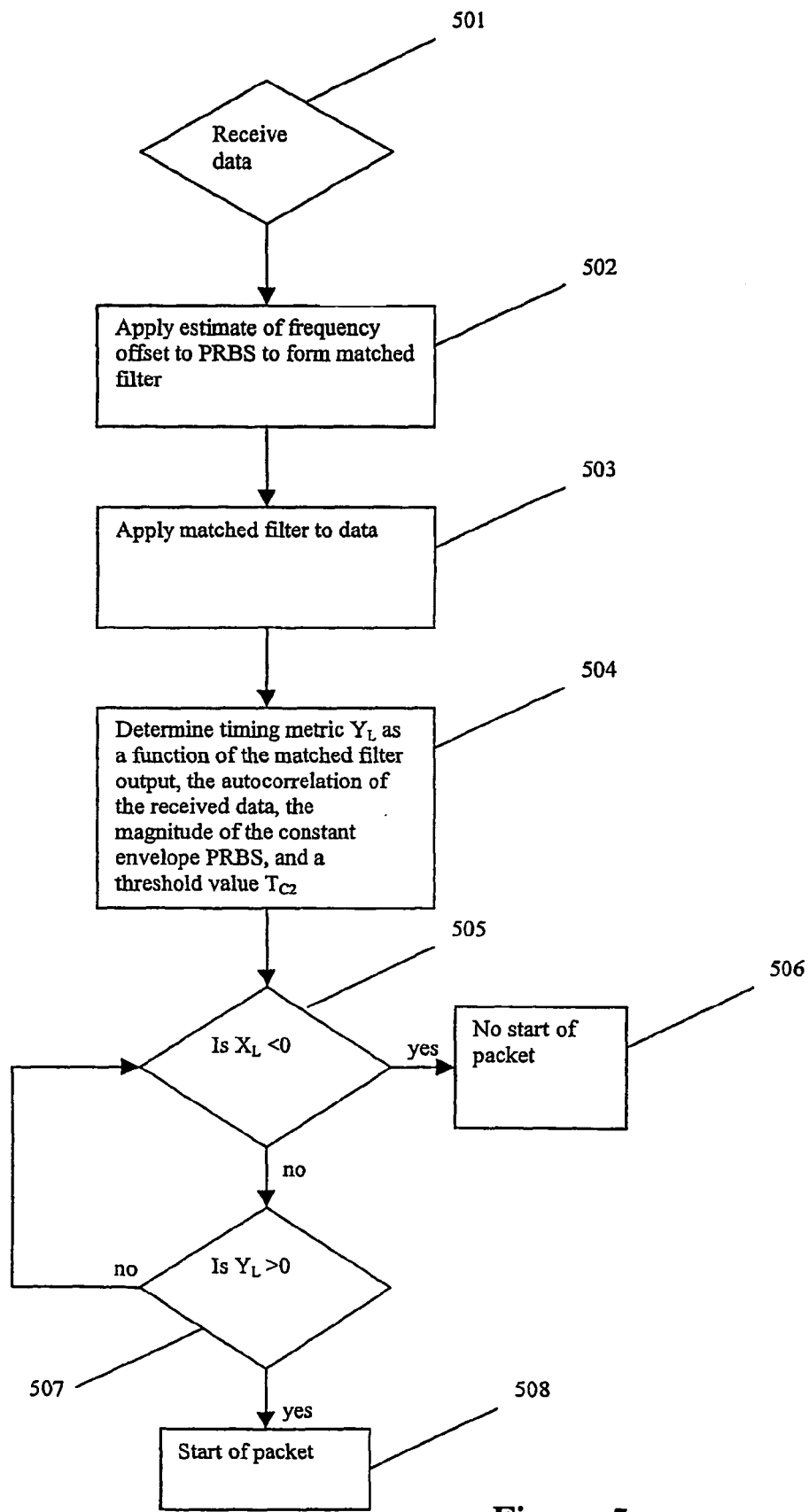
FIG. 5 is an algorithm showing the method used to determine the start of packet.

FIG. 5 shows a method used to estimate the start of a data packet. Block 501 shows the first step of receiving the data. In block 502 a correction is made to a vector of received data for the frequency offset to form a matched filter. Ideally this it the frequency offset estimated by the frequency offset estimation algorithm described with reference to FIG. 4. Alternatively another method may be used to determine the frequency offset. The matched filter is then applied to the data in block 503. In block 504 a timing metric is determined for the start of packet estimation. This timing metric is a function of the matched filter output, the autocorrelation of the received data, the magnitude of a constant envelope sequence in the pilot symbol and a threshold value. In block 505 a query is made of the timing metric formed in the frequency offset estimation algorithm. If this timing metric is positive then in block 506 the start of packet timing metric is queried. If this timing metric is also positive the start of packet is estimated.

To estimate the start of a packet the forward estimate for the time varying frequency offset v is applied to a "clean" copy of the pilot symbol to form a matched filter 31 having the same frequency offset as the received signal as shown in block 502 of FIG. 5. The L-length matched filter with lth coefficient $$n^*_l = s^*[lT]e^{j2\pi\hat{v}lT}$$

is given by $$n^H = [s[0], s[1]e^{-j2\pi\hat{v}T}, \ldots, s[L-1]e^{-j2\pi\hat{v}(L-1)T}]^H \qquad 12$$

This matched filter 31 is applied to the incoming received data, as shown in FIG. 3A, to produce the output $$Q_l \doteq n^H r_l \qquad 13$$

$$= ae^{-j[2\pi v(lT-\tau_s)+\theta]}\sum_{m=0}^{L-1} s*[mT]s[(m+l)T - \tau_s]e^{-j\frac{m}{L}\phi} + n^H\eta_L$$

-continued $$\approx LaS^2 \operatorname{sinc}\left(l - \frac{\tau_s}{T}\right) e^{-j\left[2\pi v(lT-\tau_s)+\theta+\phi\frac{L-1}{2L}\right]} + \sqrt{L} S\eta \quad 5$$

where $\operatorname{sinc}(l-\tau_s/T)$ is an approximation to the system aggregate filter impulse response, and $\phi = 2\pi(v-\hat{v})LT$ is the frequency offset estimation error. Again the first term on the right of the approximately equals sign is the signal term and the second term is the noise term. It can be shown that the maximum likelihood estimate of the start of packet sample n=0 may be obtained by finding l=0, the value of l which maximises $|Q_l|$ over the region of l for which $X_l$ is positive.

In a practical implementation, where a matched filter correlation is computationally expensive as discussed below, a practical, near optimal method for identifying l=0 is as follows. A timing metric analogous to that of equation (9) is produced, for use in finding the matched filter output peak using a sequential search, by modifying the non-central correlation coefficient $$|\rho'_l| \doteq \frac{|\langle n^H r_l \rangle|}{\sqrt{\langle n^H n \rangle \langle r_l^H r_l \rangle}} \quad 14$$

$$= \frac{|Q_l|}{\sqrt{L} S \sqrt{R_l}}$$

Figure 6A:
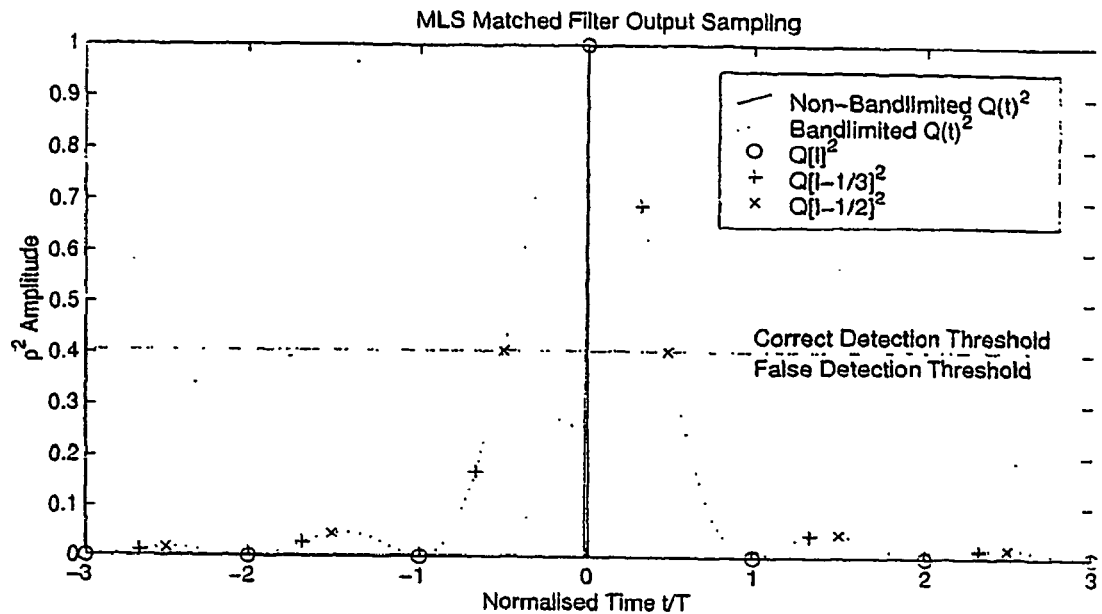
FIG. 6A shows the pseudo random binary sequence (PRBS) matched filter output sampling.
Figure 6B:
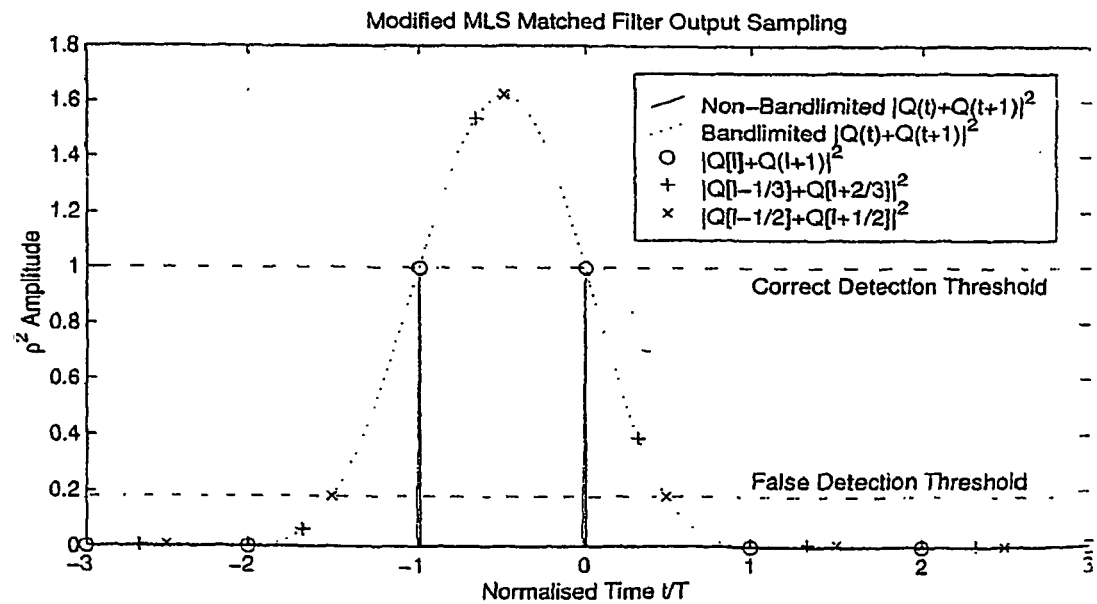
FIG. 6B shows the modified PROS matched filter output sampling.

Since the received signal, r(t), is bandlimited, the ideal matched filter output peak is dispersed according to the system aggregate filter impulse response, approximated in equation (13) as the sinc function, see FIG. 6A. Depending on the instance of the time offset $\tau_s$, the amplitude of the matched filter (MF) output peak may be attenuated and the amplitude of non-peak MF output samples may be amplified compared with the ideal, non-bandlimited case, as is illustrated in FIG. 6A. This effect is most pronounced for $\tau_s \to T/2$, at which values of $|Q_l|$ and $|Q_{l+1}|$ are most similar. This means that if the time offset is T/2 (half a sample) then the amplitude of the output of the MF for values of $|Q_l|$ and $|Q_{l+1}|$ are very similar which leads to confusion as to which sample represents the start of the packet. One method of compensating for this effect, illustrated in FIG. 6B, is to replace the value $|Q_l|$ in equation (14) with the sum $|Q_l + Q_{l+1}|$, thus $$|\rho''_l| = \frac{|Q_l + Q_{l+1}|}{\sqrt{L} S \sqrt{R_l}} \quad 15$$

which is efficiently evaluated as the difference $$Y_l = |Q_l + Q_{l+1}| - T_{C2} \sqrt{LS} \sqrt{R_l} \quad 16$$

where $T_{C2}$ is the threshold of correlation which, when exceeded, allows $Y_l$ to become positive.

The threshold of correlation $T_{C2}$ must be set at a level such that $Y_l$ becomes positive when the start of packet occurs but it must also be low enough to always indicate the start of a packet, i.e. it must be low enough so that $|Q_l+Q_{l+1}| > T_{C2} \sqrt{LS} \sqrt{R_l}$ (or the equivalent inequality for the particular metric used) when the start of packet occurs.

Upon $Y_l$ becoming positive, the most likely value for l=0 is found by comparison of the amplitudes of $|Q_l|$ and $|Q_{l+1}|$. Analysis of $|Q_l+Q_{l+1}|$ differs little from that of $|Q_l|$ due to the high (effectively 1.0) correlation between $Q_l$ and $Q_{l+1}$, thus $$|Q_l + Q_{l+1}| \approx LaS^2\left[\operatorname{sinc}\left(l - \frac{\tau_s}{T}\right) + \operatorname{sinc}\left(l + 1 - \frac{\tau_s}{T}\right)\right] + \sqrt{L} S\sqrt{2}\,|\eta| \quad 17$$

may be used directly to establish the statistics of $Y_l$.

As with packet detection, a less computationally expensive (but equivalent) DSP implementation of equation (16) is $Y'_l = |Q_l+Q_{l+1}|^2 - T_{C2}^2 LS^2 R_l$. To determine the start of the packet both the timing metric $X_l$ determined before the frequency offset is estimate and the start of packet timing metric $Y_l$ must be greater than zero. As can be seen from FIG. 3B the sliding window cross correlation $P_L$ typically reaches the decision threshold before the matched filter correlation $Q_l$. It can also be seen from this figure that the matched filter correlation is a better indicator of the start of the packet than the sliding window cross correlation. If timing metric $X_l$ is not positive then the packet has not started. In this case the timing metric $X_l$ is recalculated at the next sample and again checked. Once timing metric $X_l$ is positive then timing metric $Y_l$ is checked. If this timing metric is not positive then at the next sample timing metric $X_l$ is rechecked and if this is positive timing metric $Y_l$ is rechecked. Once timing metric $Y_l$ is positive (and timing metric $X_l$ is positive) l=0 and the start of packet is estimated from the current sample as $$\hat{n} = l + 2L - 1|_{l=0} \quad 18$$

The matched filter correlation is computationally expensive: for example a SHARC™ implementation required 285 instruction cycles per sample to calculate the correlation for L=64. At 40 MIPS and 1 MHz sample rate, this means that the correlation operated at about ⅛ of real-time. However, as this process only operated for a very small number of sample periods per packet, typically about ten, it is straight forward to buffer incoming samples, typically fewer than one hundred, over the period during which the matched filter is employed. The process has excellent localisibility, as illustrated in FIG. 3B, due to ideal PRBS autocorrelation properties. Furthermore, as the matched filter is a "clean" copy of the PRBS, there is no SNR penalty additional to that introduced by the channel and the transmitter and receiver RF sections.

After estimating the l=0 sample, the forward estimate of v is updated by repeating equation (11) as shown in blocks 406 and 407 of FIG. 4. The updated estimate for l=0 has a reduced variance compared to the forward estimate for which the value of l was not established.

Figure 7:
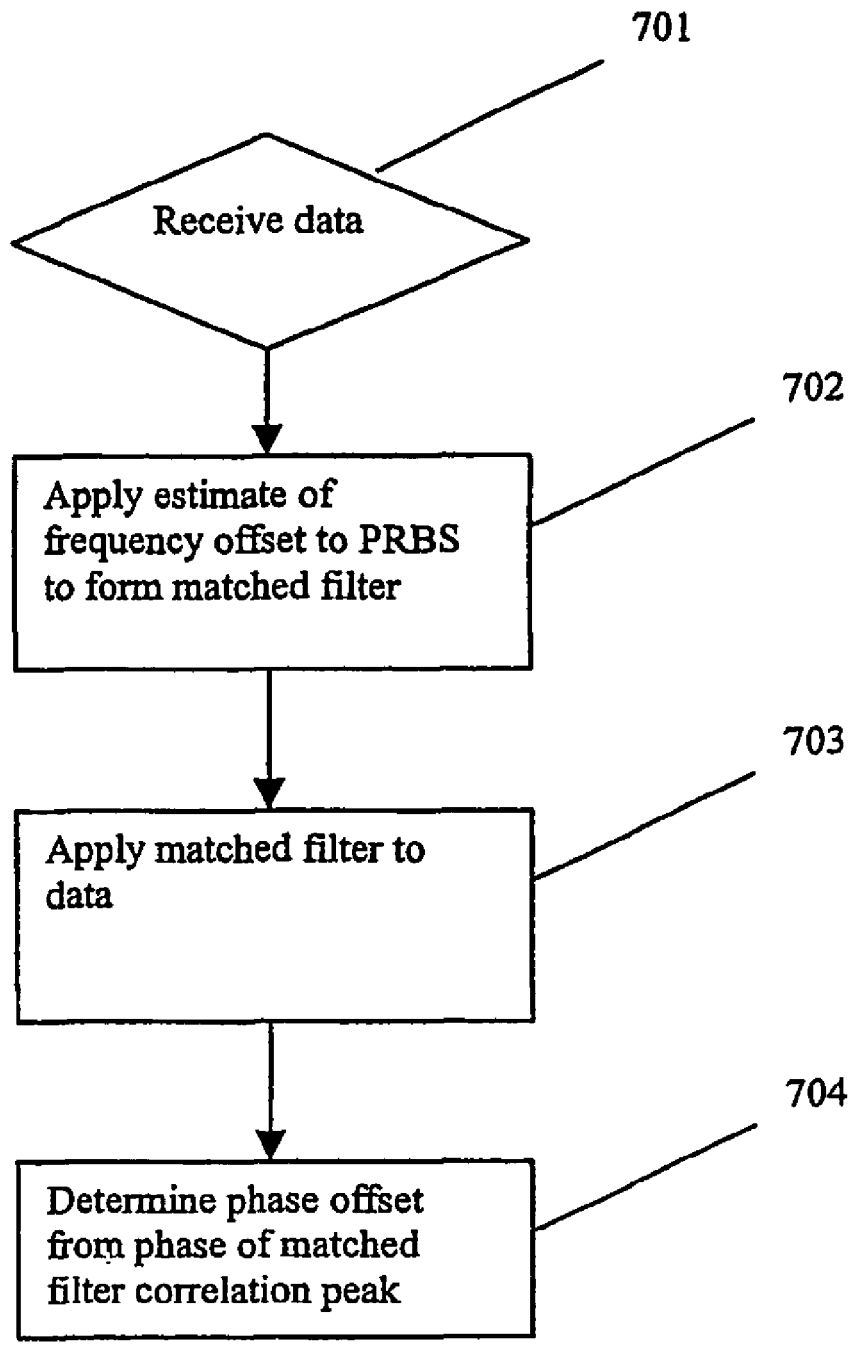
FIG. 7 is an algorithm showing the method used to determine the phase offset.

FIG. 7 shows an algorithm for estimating the phase offset. The first three steps for estimating the phase offset, blocks 701, 702 and 703, are the same as blocks 501, 502 and 503 for estimating the start of packet. In the final block, 704, the phase offset is estimated from the phase of the matched filter correlation peak.

Once the start of packet has been detected the phase of the matched filter correlation peak is used to estimate the phase offset as $$\hat{\theta} \doteq a\tan\left(\frac{\operatorname{Im}\{Q_0\}}{\operatorname{Re}\{Q_0\}}\right) \quad 19$$

which, by analogue with equation (11) is maximum likelihood.

Figure 8A:
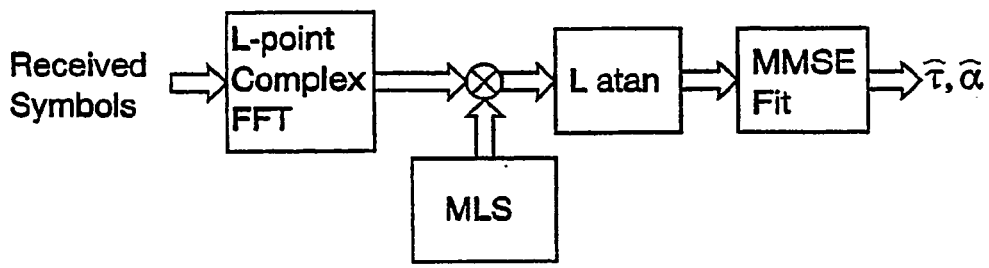
FIG. 8A is a block diagram showing the blocks used to estimate the timing and phase offset.
Figure 9:
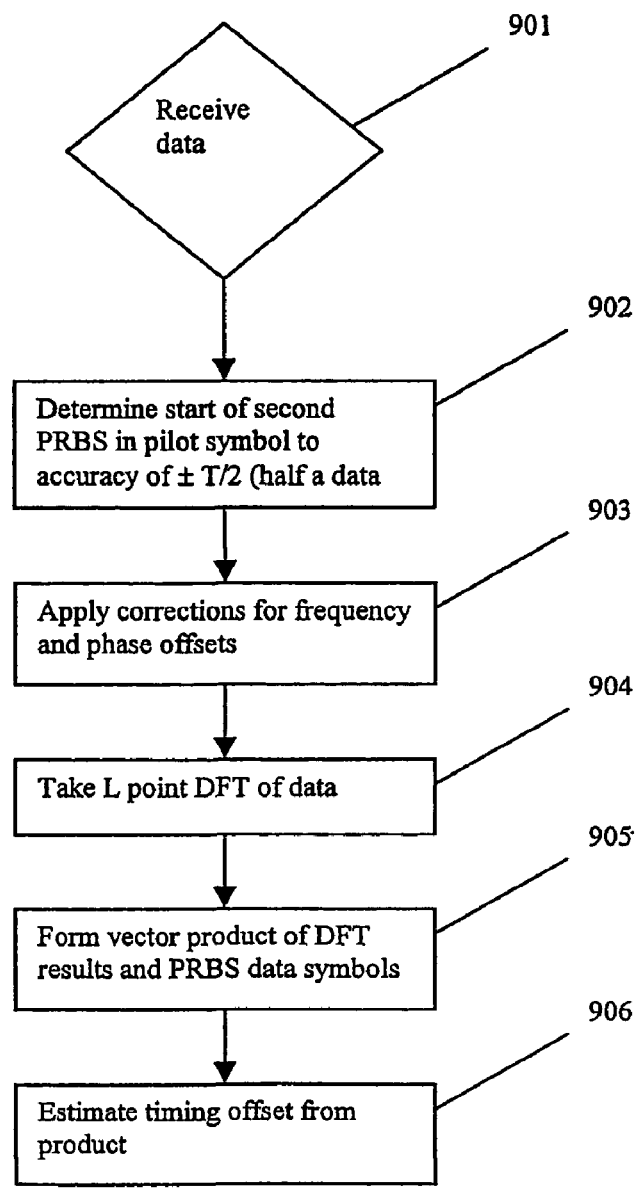
FIG. 9 is an algorithm showing the method used to determine the time offset.

Having estimated the start of packet, frequency offset and phase offset, n=0, v and θ respectively, corrections to the impairments introduced by these parameters can be applied and the resulting data used to estimate the time offset $\tau_S$ using the process illustrated in FIG. 8A and the algorithm of FIG. 9. Firstly the accuracy of the start of the second sequence of the pilot symbol is determined to within half a data sample as shown in block 902. This can be achieved using the start of packet algorithm described previously. Corrections for the phase and frequency offsets are made to the received data in block 903. The sample time of the first sample of the second PRBS, or other constant envelope sequence, in the received pilot symbol is now known to an accuracy of half a symbol ±T/2, and the L length data vector corresponding to the second PRBS has as its mth value $$r_m = as(mT - \tau_s) e^{-j[2\pi v(mT - \tau_s) + \theta]} + \eta_m \qquad 20$$

where $m \in [0 \ldots L-1]$. Applying corrections for the frequency and phase offset produces $$h_m = [as(mT - \tau_s) e^{-j[2\pi v(mT-\tau_s)+\theta]} + \eta_m] e^{-j[2\pi \hat{v} mT + \hat{\theta}]} \qquad 21$$
$$= as(mT - \tau_s) e^{-j[\phi \frac{m}{L} + \alpha - 2\pi v \tau_s]} + \eta_m$$

where $\phi$ is the frequency offset estimation error defined previously (with reference to equation (13)) and $\alpha \doteq \hat{\theta} - \theta$ is the phase offset estimation error.

Next an L point DFT is taken of the corrected data as shown in block 904. The kth of L frequency bins is $$H_k = ae^{-j[\alpha - 2\pi v \tau_s]} \sum_{m=0}^{L-1} s(mT - \tau_s) e^{-j\frac{m}{L}[2\pi k + \phi]} + \eta_k \qquad 22$$

where $\eta_k$ is additive white gaussian noise (AWGN) with variance L times that of $\eta_m$. Since $\phi$ is a zero mean estimation error, then $\phi \ll v (\ll 1/T)$ and the result of equation (7) can be applied and simplified to obtain $$H_k \approx Lae^{-j[\alpha-2\pi v\tau_s]} S_k e^{-j2\pi \frac{\tau_s k}{TL}} \mathrm{sinc} \frac{\phi}{2\pi} e^{-j\frac{L-1}{2L}\phi} + \eta_k \qquad 23$$

where $S_k$ is the kth transmitted PRBS data symbol, and the assumption that the frequency offset estimation error $\phi \to 0$ allows the inter-carrier interference term in equation (7) to be neglected. The data may be removed from H by forming the element by element vector product of the DFT result $H_k$ and the PRBS data symbols $S_k$ as described in block 905 of FIG. 9.

$$H_k S_k^* = La|S|^2 \mathrm{sinc}\frac{\phi}{\pi} e^{-j\left[2\pi \frac{\tau_s}{T}\frac{k}{L} + \alpha + \frac{\phi}{L}\left(\frac{L-1}{2}\right) - 2\pi v \tau_s\right]} + S\eta_k \qquad (24)$$

Figure 8B:
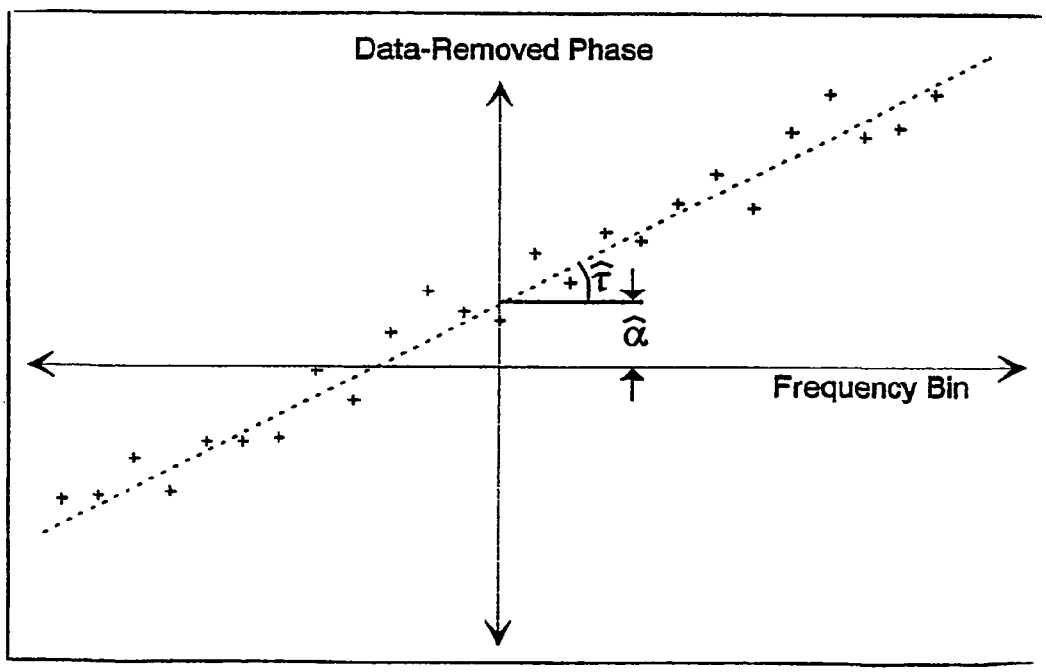
FIG. 8B shows an example of timing offset MMSE estimation.

As can be seen from equation (24), estimation of the time offset s is the classical problem of estimating the frequency of a discrete complex sinusoid. In the classical problem, the maximum likelihood (ML) estimate is the frequency corresponding to the maximum amplitude bin of the DFT of the data. However, since equation (24) was obtained using the a priori knowledge of l=0, then the constraint $-\frac{1}{2} \leq \tau_S \leq \frac{1}{2}$ may be applied to allow $\tau_S$ to be estimated as $$\hat{\tau}_s \doteq \frac{LT}{2\pi} \frac{k^T\beta - \frac{1}{L} k^T o o^T \beta}{k^T k - \frac{1}{L}(k^T o)^2} \qquad 25$$

where $\beta$ is a column vector of elements $\beta_k = \arg\{H_k S_k^*\}$, $k=[0, 1, \ldots, L-1]^T$, $o=[1, \ldots, 1]^T$. This estimate is simply the slope of a straight line and an example estimate is depicted in FIG. 8B. This estimate is both minimum mean square error (MMSE) and ML, and it may be shown that the Cramér-Rao Lower Bound (CRLB) for this estimate is identical to that of the ML estimate for the frequency of a continuous time complex sinusoid in AWGN. Note that the standard MMSE intercept estimate associated with equation (25) can be used to estimate the combined phase estimation error $$\hat{\alpha}_c \doteq \alpha + \frac{\phi}{L}\left(\frac{L-1}{2}\right) - 2\pi v \tau_s$$

Where the received signal is corrupted by frequency domain amplitude scaling and phase distortion, for example from transmit or receive filters or frequency-selective multipath fading, then the weighted MMSE estimate may be used in place of equation (25) to compensate for the distortions. Since $|S|^2$ known, $\hat{\alpha}_k = |H_k S_k|$, $\hat{\phi}_k = \arg(H_k S_k)$ may be used to estimate, respectively, the amplitude and phase of the kth frequency bin of a frequency domain equaliser. For the example system shown here the (frequency domain) phase distortion created by the system aggregate filter was corrected using the frequency domain pre-distortion equaliser, labelled EQ in FIG. 1A and where the filter coefficients were the residual phase after removal of the linear phase estimated using equation (25).

Having acquired initial estimates of n, v, θ and $\tau_S$ as described above, standard techniques may be applied to track these parameters from OFDM data throughout the remainder of the packet. In the algorithms described above the order of some steps may vary without affecting the effectiveness of the algorithm. For example in the frequency offset estimation algorithm of FIG. 5 the order in which the autocorrelation and cross correlation are determined is not important.

Figure 10A:
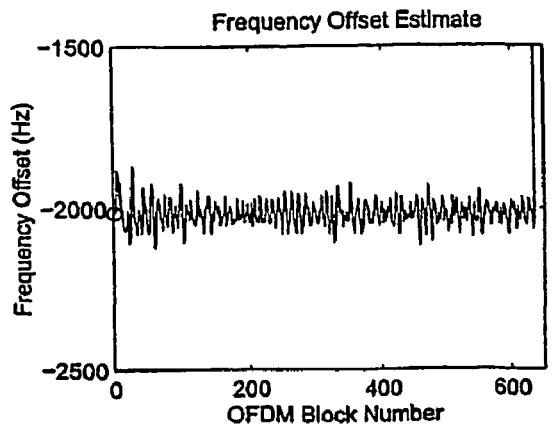
FIG. 10A shows an example of the estimated frequency offset per OFDM block in an OFDM system.
Figure 10B:
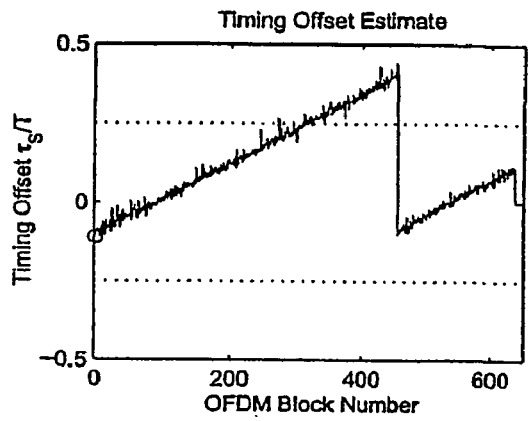
FIG. 10B shows an example of the estimated timing offset per OFDM block in an OFDM system.
Figure 10C:
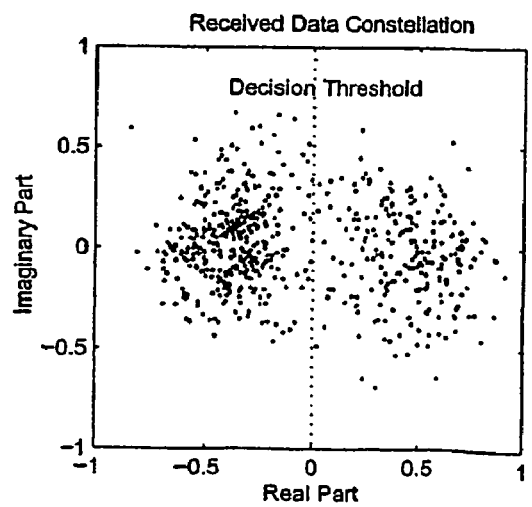
FIG. 10C shows an example of the received data constellation in an OFDM system.

An experimental example having key parameters as listed in Table 1 was used to produce the example data record showing estimation and tracking of channel parameters shown in FIG. 10. FIG. 10A shows frequency offset v per OFDM block, with the estimate for block number one being the initial estimate based on the pilot symbol and algorithms discussed here: this estimates is highlighted by the circle. FIG. 10B shows the normalised symbol timing offset $\tau_S/T$ per OFDM block, again with the initial pilot-symbol based estimate highlighted by a circle. In both cases, the initial estimates can be seen to be consistent with the subsequent estimates which appear to be symmetrically distributed about the mean values. FIG. 10C shows the data constellation for the same OFDM packet which was BPSK modulated for clarity. This illustrates, firstly, the low SNR (estimated to be 10 dB) of the data shown by the spread of the constellation points and, secondly, that the constellation is not rotated or spread noticeably by channel impairments demonstrating the robustness of the practical implementation of the algorithms.

Using the experimental system, it has been found that the reliable detection and synchronisation using these techniques requires a minimum receiver SNR of 15 dB due to practical imperfections such as analogue filter frequency and phase distortion and non-linearities.

The fundamental analyses described below concentrate on AWGN channel performance, as this forms the basis of extension to more realistic fading channel models.

For the frequency, phase and time offset algorithms and the start of packet algorithm previously described to work a minimum signal to noise ration (SNR) is required. This SNR may be determined analytically and/or may be determined by simulation of the algorithms in a communications system.

Analysis of the system may also be used to provide indications of the performance of the system. For example it is important that the algorithms for the frequency offset and start of packet do not detect a start of packet where there is only noise present.

To determine the SNR required for reliable packet detection in the frequency offset estimation algorithm the mean and variance of the timing metric $X_l$ need to be evaluated. These can be evaluated from the probability density function of the timing metric. As the timing metric is a function of the cross correlation and the autocorrelation of the received data the density functions of these variables also require evaluation. The value chosen for the threshold value $T_{C1}$ also has an impact on the timing metric $X_l$.

From equation (6), the cross correlation of the received data $P_l$ is well-approximated as being non-central complex Gaussian, so the probability density function of the dummy variable $x=|P_l|$ is $$p_{|P|}(x) = \frac{x}{\sigma_P^2}\exp\left[-\frac{1}{2}\left(\frac{x^2+\mu_P^2}{\sigma_P^2}\right)\right]I_0\left(\frac{x\mu_P}{\sigma_P^2}\right), \qquad 26$$

where $$\mu_P = (L-|l|)a^2 S^2 \qquad 27$$

is the mean and $$\sigma_P^2 = 2\sigma_w^2[(L-|l|)a^2 S^2 + L\sigma_w^2] \qquad 28$$

is the variance of the complex Gaussian $P_l$, and $I_0(\cdot)$ is the modified Bessel function of the first kind. This is a Rice distribution in x.

From equation (8), the autocorrelation of the received data $R_l$ is well-approximated as being non-central (real) Gaussian, so the probability density function of dummy variable $y=T_{C1}|R_l|$ is $$p_R(y) = \frac{1}{\sqrt{2\pi}\,\sigma_R}\left(\exp\left[-\frac{1}{2}\left(\frac{y-\mu_R}{\sigma_R}\right)^2\right] + \exp\left[-\frac{1}{2}\left(\frac{y+\mu_R}{\sigma_R}\right)^2\right]\right) \qquad 29$$

$$= \frac{1}{\sqrt{2\pi}\,\sigma_R}\exp\left[-\frac{1}{2}\left(\frac{y^2+\mu_R^2}{\sigma_R^2}\right)\right]\left(\exp\left[\frac{y\mu_R}{\sigma_R^2}\right] + \exp\left[-\frac{y\mu_R}{\sigma_R^2}\right]\right),$$

Where $$\mu_R = T_{C1}L(a^2 S^2 + 2\sigma_w^2) \qquad 30$$

is the scaled mean and $$\sigma_R^2 = T_{C1}^2 4L\sigma_w^2(a^2 S^2 + \sigma_w^2) \qquad 31$$

is the scaled variance of the Gaussian $R_l$. This is the distribution of a random variable which is the absolute value of the normal distribution. Note that both the mean and variance of the probability density function of dummy variable y depend on the threshold value $T_{C1}$.

Assuming that the cross correlation $P_l$ and autocorrelation $R_l$ are independent, the distribution of the timing metric $X_l$ from equation (10) ($X_{l=|P_l|}-T_{C1}R_l$) may be shown to be $$p_{1X}(z > 0) = \qquad 32$$

$$1 - \int_0^\infty\!\!\int_0^\infty p_{|P|}(x)p_R(x-z)dxdz = 1 - \int_0^\infty \frac{x}{2\sigma_R^2}\exp\left[-\frac{1}{2}\left[\frac{x^2+\mu_P^2}{\sigma_P^2}\right]\right]$$

$$I_0\!\left(\frac{x\mu_P}{\sigma_P^2}\right)\!\left[\mathrm{erfc}\!\left(\frac{x-\mu_R}{\sqrt{2}\,\sigma_R^2}\right) + \mathrm{erfc}\!\left(\frac{x+\mu_R}{\sqrt{2}\,\sigma_R^2}\right)\right]\!dx,$$

which may be integrated numerically.

Figure 11:
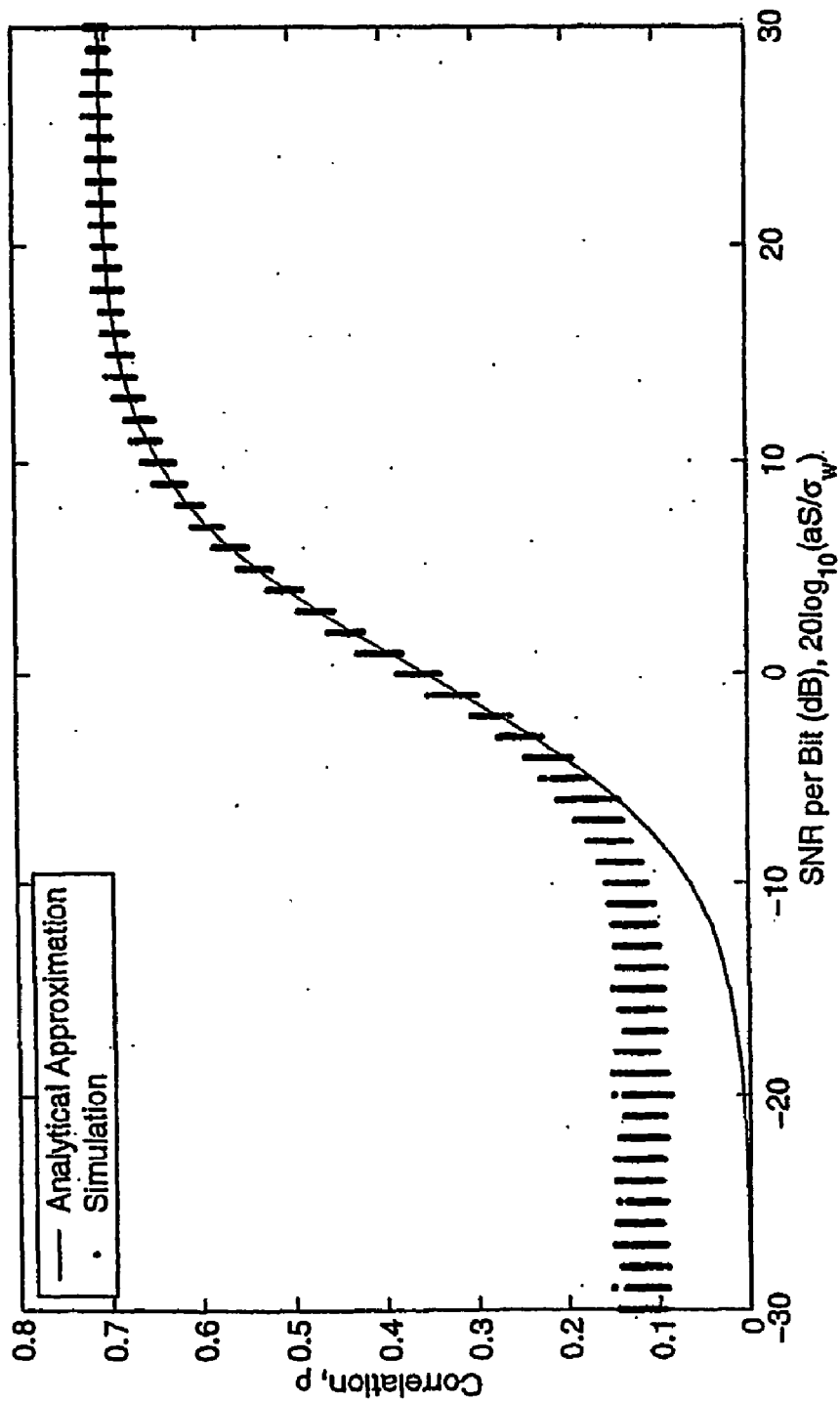
FIG. 11 shows the correlation between the covariance random variable and the mean power random variable.

However, it can be shown that at high SNRs $R_l$ and $|P_l|$ are correlated and the correlation coefficient between $|P_l|$ and $R_l$ is well approximated at high SNRs by $$\rho_{|P|R}\!\left(l, \frac{aS}{\sigma_w}\right) \approx \frac{1+\frac{l}{L}}{\sqrt{\left(2+\frac{l}{L}+\frac{2\sigma_w^2}{a^2 S^2}\right)\left(1+\frac{\sigma_w^2}{a^2 S^2}\right)}}, \qquad 33$$

which is inversely proportional to the mean signal-to-noise ratio per sample $aS/\sigma_w$ and therefore may be approximated as zero only at very low signal-to-noise ratios. FIG. 11 shows excellent agreement between Monte Carlo simulation data and equation (33) for l=0 and SNRs above 0 dB. This means that for SNRs greater than 0 dB and at the start of the packet equation (33) accurately describes the correlation coefficient between the cross correlation $|P_l|$ and the autocorrelation $R_l$.

At high signal-to-noise ratios, the cross correlation $|P_l|$ accurately may be approximated as Gaussian, and the distribution of timing metric $X_l$ from equation (10), including correlation, may be approximated by using the bivariate Gaussian density of dummy values x and y from equations (26) and (29) to obtain $$p_{|P|R}(x, y) = \frac{1}{2\pi\sigma_P\sigma_R\sqrt{1-\rho^2}}\exp\!\left(-\frac{1}{2(1-\rho^2)}\!\left[\left(\frac{x-\mu_P}{\sigma_P}\right)^2 - \right.\right. \qquad 34$$

$$\left.\left.\frac{2\rho(x-\mu_P)(y-\mu_R)}{\sigma_P\sigma_R} + \left(\frac{y-\mu_R}{\sigma_R}\right)^2\right]\right),$$

where ρ is the instance of correlation coefficient at the particular values of l and $aS/\sigma_w$ as described by equation (33), to produce $$p_{2X}(z > 0) = 1 - \int_0^\infty\!\!\int_0^\infty p_{|P|R}(x, x-z)dxdz = \qquad 35$$

$$1 - \frac{1}{2\sqrt{2\pi}\,\sigma_P}\int_0^\infty \exp\!\left[-\frac{1}{2}\!\left(\frac{x-\mu_P}{\sigma_P}\right)^2\right]$$

$$\mathrm{erfc}\!\left[\frac{1}{\sqrt{1-\rho^2}}\!\left(\frac{x-\mu_R}{\sqrt{2}\,\sigma_R} - \rho\frac{x-\mu_P}{\sqrt{2}\,\sigma_P}\right)\right]\!dx.$$

There are now two distributions for timing metric $X_l$ (as described in equation 10), one distribution assuming that the cross correlation $|P_l|$ and autocorrelation $R_l$ are independent (equation 32) and one for high SNRs including a correlation coefficient between $|P_l|$ and $R_l$.

Empirically, it was found that the direct Gaussian approximation $$p_{2X'}(z>0) = \frac{1}{2}\text{erfc}\left(-\frac{\mu_{X'}}{\sqrt{2}\,\sigma_{X'}}\right), \qquad 36$$

Where $$\begin{aligned}\mu'_X &= \langle X'_l \rangle \\ &= \langle P_l^2 \rangle - T_{Cl}^2 \langle R_l^2 \rangle \\ &= \mu_P^2 + 2\sigma_P^2 - \mu_R^2 - \sigma_R^2\end{aligned} \qquad 37$$

is the mean and $$\begin{aligned}(\sigma'_X)^2 &= \langle (X'_l)^2 \rangle - \langle X'_l \rangle^2 \\ &= \text{var}\{P_l^2\} + T_{Cl}^4 \text{var}\{R_l^2\} - 2T_{Cl}^2 \text{cov}\{P_l^2 R_l^2\} \\ &= 4\sigma_P^2(\mu_P^2 + \sigma_P^2) + 2\sigma_R^2(2\mu_R^2 + \sigma_R^2) - \\ &\quad 4\rho\sigma_P\sigma_R\sqrt{(\mu_P^2+\sigma_P^2)\left(\mu_R^2+\frac{\sigma_R^2}{2}\right)}\end{aligned} \qquad 38$$

is the variance of dummy variable $z=X'_l=P_l^2-T_{C1}^2 R_l^2$ is a better approximation of the timing metric at high SNR than $p_{2X}$ (see equation 35).

Figure 12:
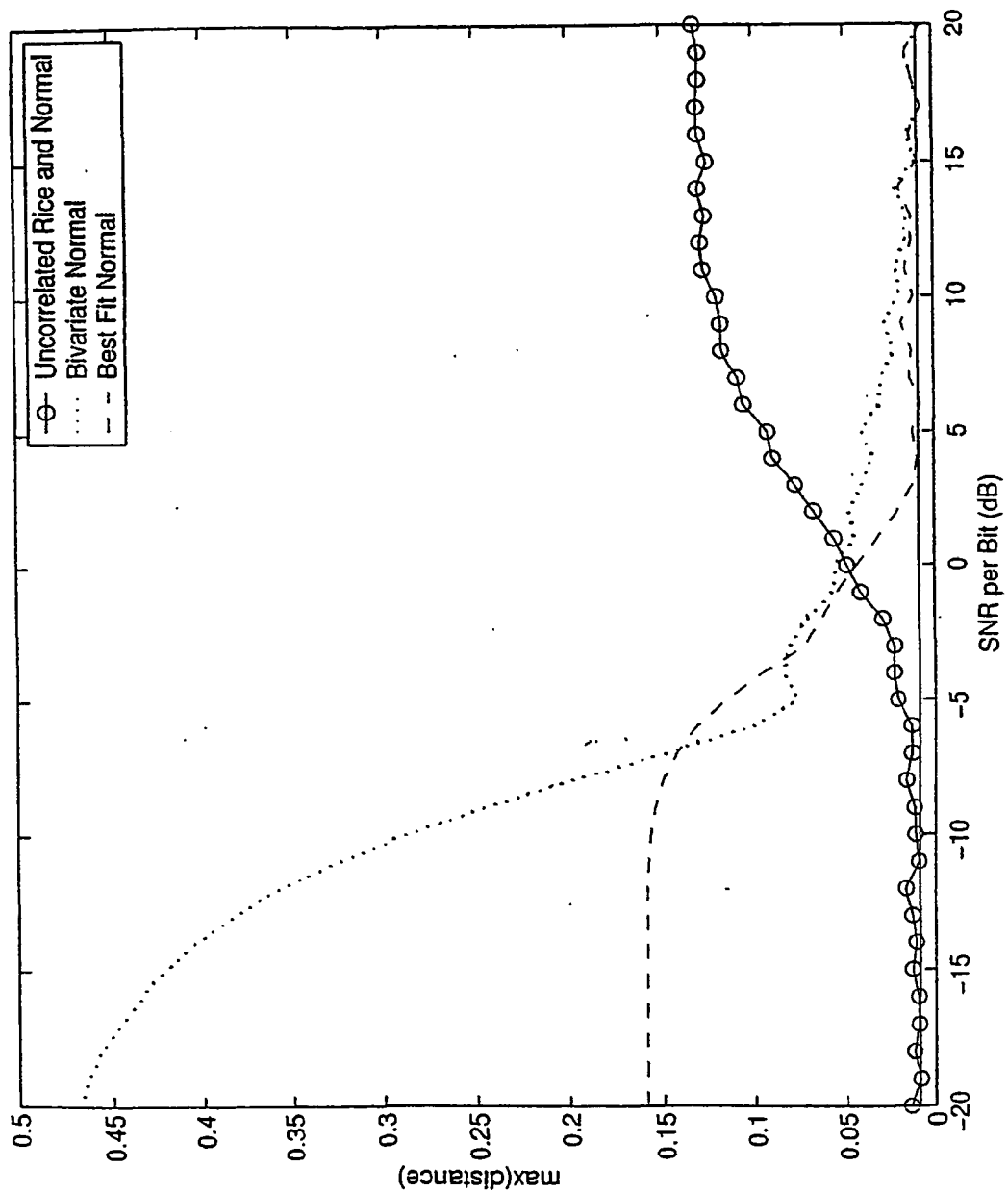
FIG. 12 shows the Kolmogorov-Smirnov distance goodness of fit measures referred to the 95% significance level.

A comparison of Kolmogorov-Smirnov (K-S) distance measures for goodness of fit of $p_{1X}$, $p_{2X}$ and $p_{2X'}$, the three approximations of the distribution of timing metric $X_l$, to Monte Carlo data is shown in FIG. 12. These results show that, by using equation (32) for SNRs below 0 dB and equation (36) for SNRs above 0 dB, a good approximation of the timing metric $X_l$ can be made over most of the SNR range. Note that this allows the correlation coefficient between the cross correlation $|P_l|$ and the autocorrelation RI to be treated as zero for SNRs below 0 dB in the region where the approximate expression of equation (33) shows poor accuracy. The approximation is worst at 0 dB, where about 500 samples of Monte Carlo data are required to cause the K-S test to fail. However for SNRs below −5 dB or above 5 dB, about 10,000 samples of Monte Carlo data are required to make the K-S test fail.

Figure 13A:
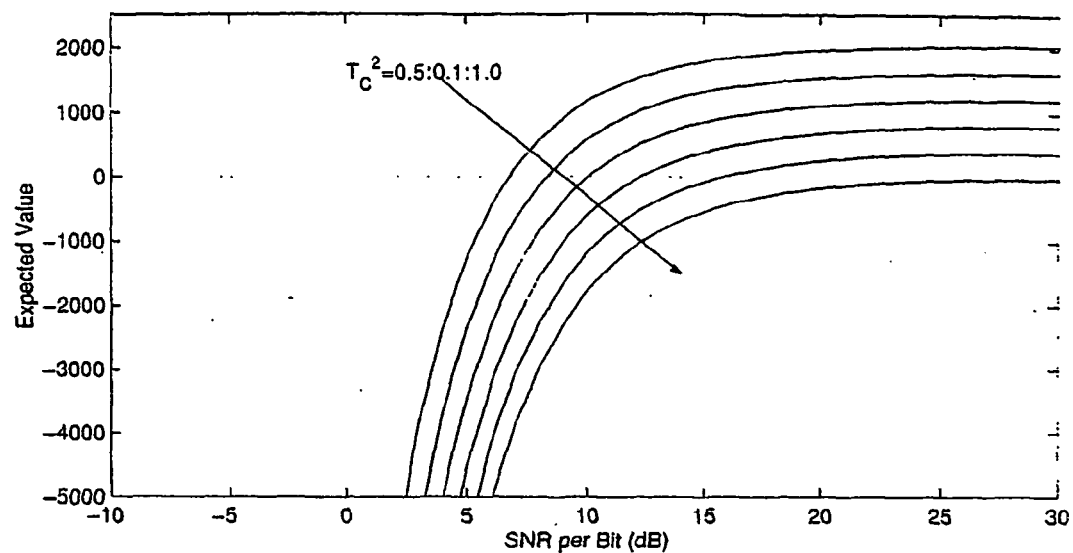
FIG. 13A shows the expected value of the packet detection metric.
Figure 13B:
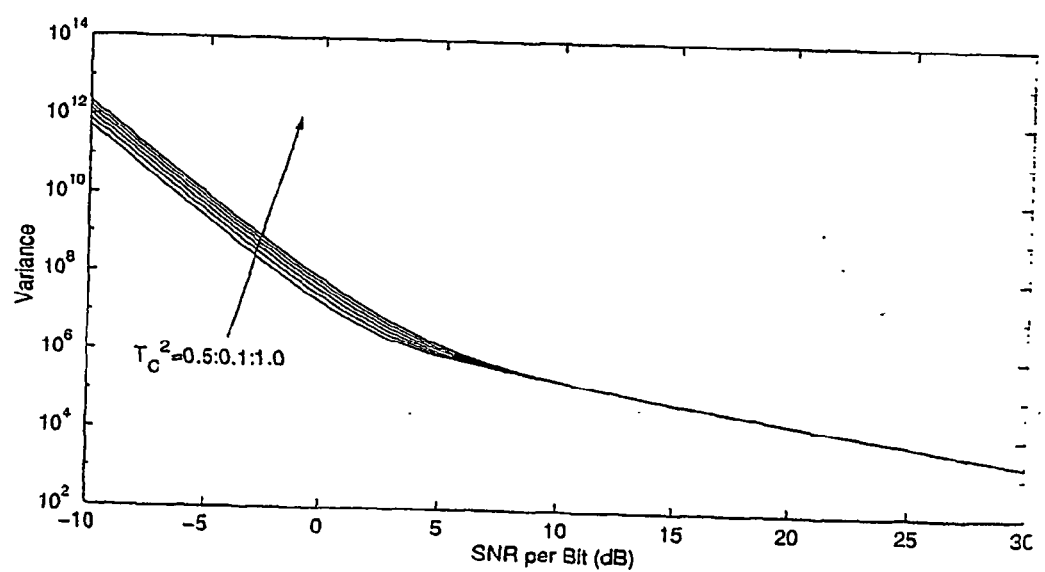
FIG. 13B shows the variance of the packet detection metric.
Figure 14A:
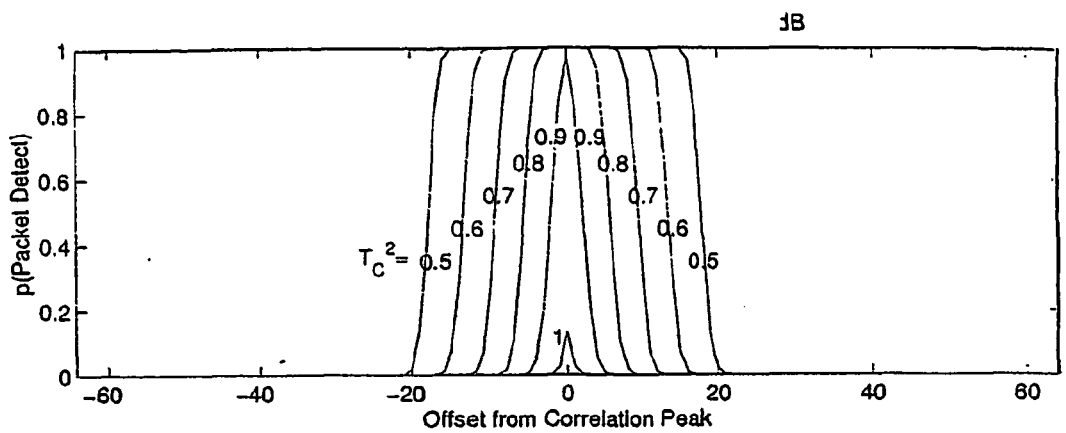
FIG. 14A shows the packet detection probability with SNR per bit of 20 dB.
Figure 14B:
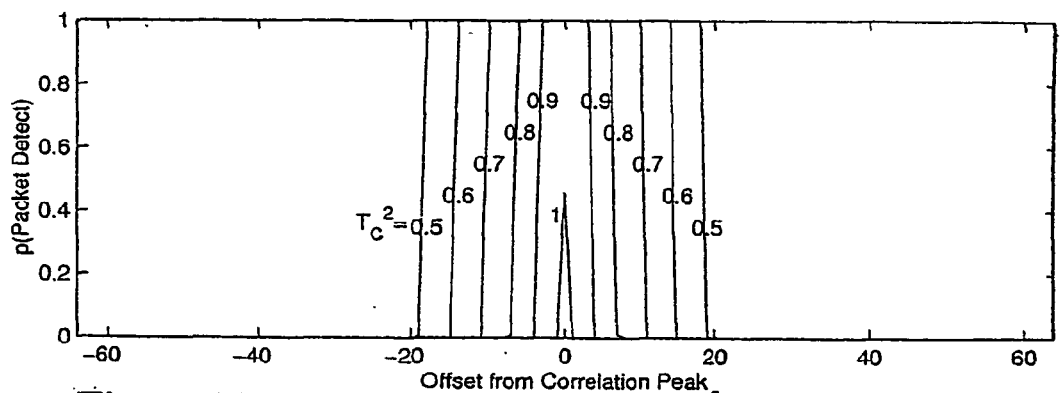
FIG. 14B shows the packet detection probability with SNR per bit of 40 dB.
Figure 14C:
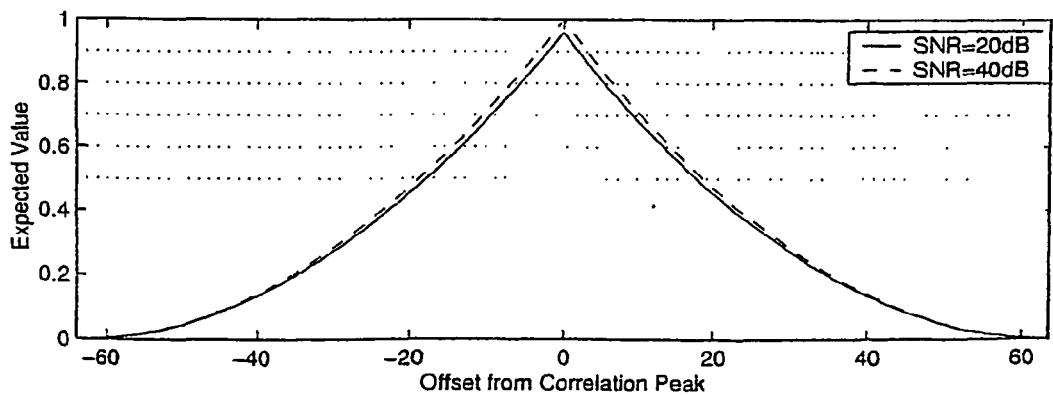
FIG. 14C shows the packet detection metric.

FIG. 13 depicts the mean (in FIG. 13A) and variance (in FIG. 13B) of timing metric $X_l$ evaluated using the above expressions for a range of threshold values, showing that a received SNR of at least 10 dB is required before reliable packet detection occurs. FIGS. 14A and 14B depict the probability of packet detection using equations (32) and (36) as described above and FIG. 14C depicts the expected value of correlation coefficient $|\rho_l|^2$ as a function of offset from correlation peak l at received SNRs of 20 dB and 40 dB, respectively. These figures illustrate the range of values of l over which robust packet detection occurs for particular values of $T_{cl}$ and the poor localisibility of the sliding-window correlation. For example FIGS. 14A and 14B shows that with the threshold value $T_{C1}$ set to 0.5 there is a high probability that packet detection will occur within 15 samples either side of the actual start of packet. As can be seen from these figures as the threshold value $T_{C1}$ increases the accuracy of the timing metric in determining the start of packet also increases. However when $T_{C1}$ is set as 1 is it unlikely that the start of packet will be detected at all. In this case the cross correlation value does not exceed the autocorrelation value and the timing metric $X_l$ does not become positive indicating the start of packet. FIGS. 14A and 14B illustrate the importance of the threshold value and choosing a threshold value that provides the most accurate indication of the start of a packet.

Figure 15A:
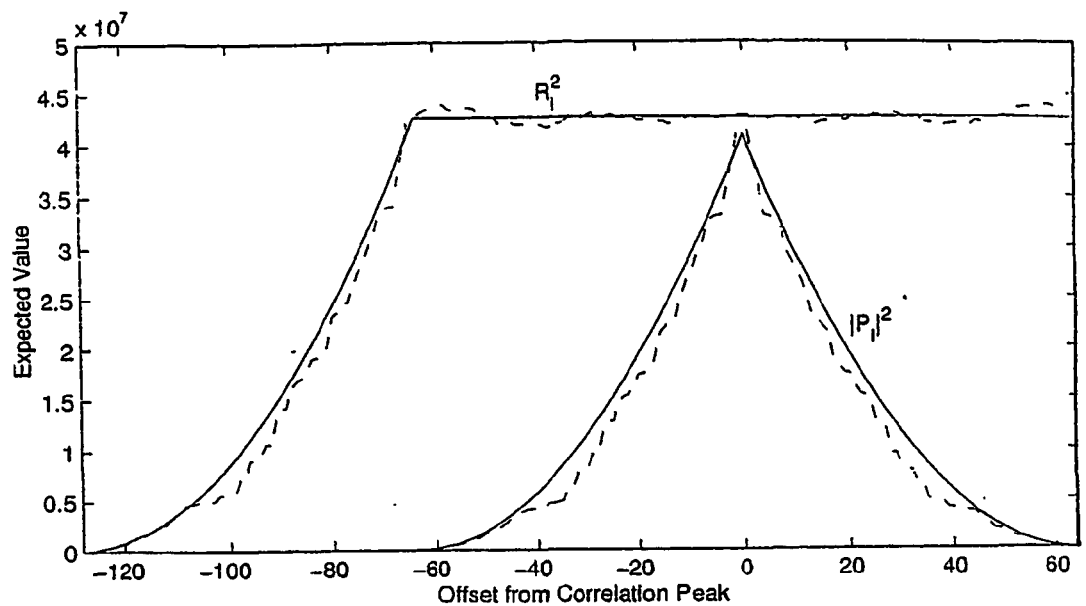
FIG. 15A is a comparison of experimental and predicted values of the correlation output from the cross correlator, the timing metric and autocorrelation of the received data for the system.
Figure 15B:
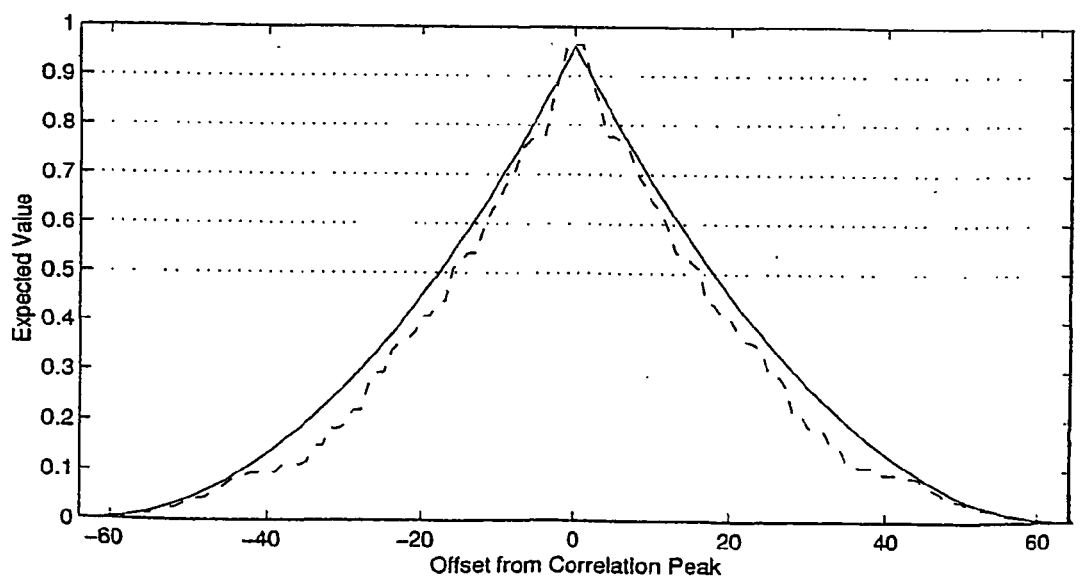
FIG. 15B is a comparison of experimental and predicted values of the packet decision metric for the system.

FIGS. 15A and 15B illustrate mean theoretical values of $|P_l|^2$, $|R_l|^2$ and $|\rho_l|^2$ in comparison with experimentally obtained results using the demonstration system for a received signal-to-noise ratio estimated to be 20 dB. The good agreement between theoretical and experimental data provides confidence, firstly, in the analysis and, secondly, in the practical implementation.

In a noise only system there is a possibility that the system will detect a start of packet where none exists. This is called the probability of false packet detection. Reducing the probability of false packet detection is important in a communications system.

In the absence of signal, i.e. in a noise only system, the approximate probability density function of the cross correlation of the received data $x=|P_l|$ collapses to $$p_{|P|}(x) = \frac{x}{\sigma_P^2}\exp\left(-\frac{1}{2}\frac{x^2}{\sigma_P^2}\right), \qquad 39$$

where $\sigma_P^2 \doteq 2L\sigma_w^4$ and equation (39) is the Rayleigh distribution in x. The exact probability density function of the autocorrelation of the received data and the threshold value $T_{C1}|R_l|$ is $$p_R(y) = \frac{1}{\sigma_R^L}\frac{y^{L-1}}{\Gamma(L)}\exp\left(-\frac{y}{\sigma_R}\right), \qquad 40$$

where $\sigma_R^2 \doteq 4T_{C1}^2\sigma_w^4$ and equation (40) is the gamma distribution with L degrees of freedom. Assuming that, in the noise only case, $|P_l|$ and $|R_l|$ are uncorrelated, the noise only distribution of the timing metric represented by dummy variable $z=X_l$ can be represented as $$p_{3X}(z>0) = \int_0^\infty \int_0^\infty p_{|P|}(x+z)p_R(x)dxdz = \qquad 41$$

$$\left(\frac{\sigma_P}{\sigma_R}\right)^L \exp\left[\left(\frac{\sigma_P}{2\sigma_R}\right)^2\right] D_{-L}\left(\frac{\sigma_P}{\sigma_R}\right) = \left(\frac{L}{2T_{C1}^2}\right)^{\frac{L}{2}} \exp\left(\frac{L}{8T_{C1}^2}\right) D_{-L}\left(\sqrt{\frac{L}{4T_{C1}^2}}\right),$$

where $D_n(\cdot)$ is the parabolic cylinder function. This indicates that the probability of false packet detection can be reduced either by increasing the length of the pilot symbol 2L or by increasing the correlation threshold $T_{C1}$.

It is important to know how changes in SNR and the accuracy of the estimate of the start of packet affect the frequency offset estimation algorithm. This can be determined from the probability density function of the frequency offset estimation error.

From equation (6) describing the cross correlation of the received data, it is relatively straight forward to show that the joint density of $r=|P_0|$ and $\phi=\arg\{P_0\}|_{\nu=0}=2\pi LT(\nu-\hat{\nu})$ is $$p_{r,\phi}(r,\phi) = \frac{r}{2\pi\sigma_P^2}\exp\left[-\frac{1}{2}\left(\frac{r^2 - 2\mu_P\cos\phi - \mu_P^2}{\sigma_P^2}\right)\right], \qquad 42$$

and thence that the probability density function of the frequency offset estimation error $\phi$ is $$p_\phi(\phi) = \frac{1}{2\pi}\exp\left(-\frac{1}{2}\frac{\mu_P^2}{\sigma_P^2}\right) + \qquad 43$$
$$\frac{1}{2\sqrt{\pi}}\frac{\mu_P\cos\phi}{\sqrt{2}\,\sigma_P}\exp\left(-\frac{\mu_P^2\sin^2\phi}{2\sigma_P^2}\right)\text{erfc}\left(-\frac{\mu_P\cos\phi}{\sqrt{2}\,\sigma_P}\right).$$

Figure 16A:
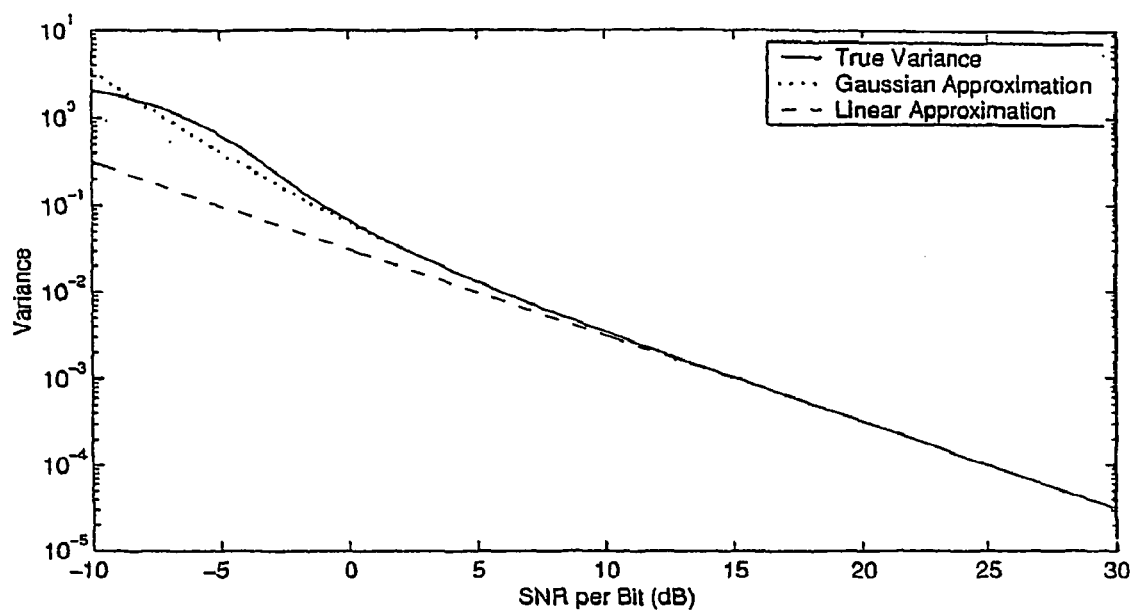
FIG. 16A is a comparison of the variance of the frequency offset estimation error and linear and Gaussian approximations to this error.
Figure 16B:
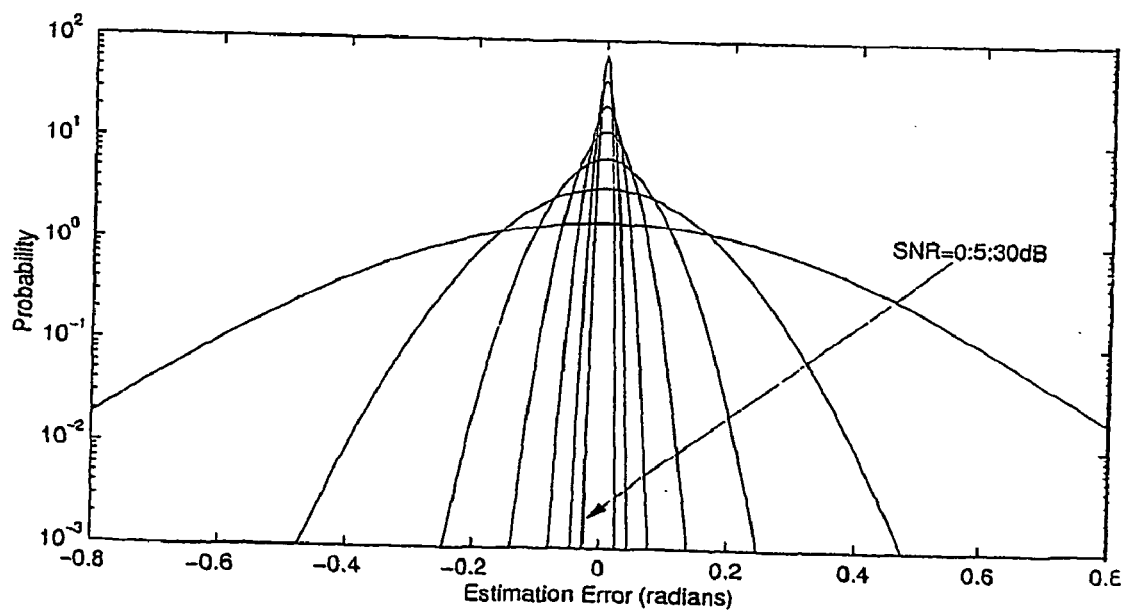
FIG. 16B shows the density of the frequency offset estimation error at several values of SNR.

FIG. 16 shows the accuracy of the frequency offset estimation error as a function of SNR per bit. FIG. 16A depicts the frequency offset estimation error variance $\langle\phi^2\rangle$, noting that $\langle\phi\rangle=0$, produced by numerical integration of equation (43) in comparison with a Gaussian approximation $p_{100}(\phi)\approx\mu_P/[(2\pi)^{1/2}\sigma_P]\exp(-\frac{1}{2}[\phi\mu_P/\sigma_P]^2)$, and the linear approximation previously known. This illustrates that the Gaussian approximation is good at high SNRs. FIG. 16B depicts the density of $\phi$ at several values of SNR, showing that the accuracy of the frequency offset estimate becomes very good for high SNRs.

Figure 17A:
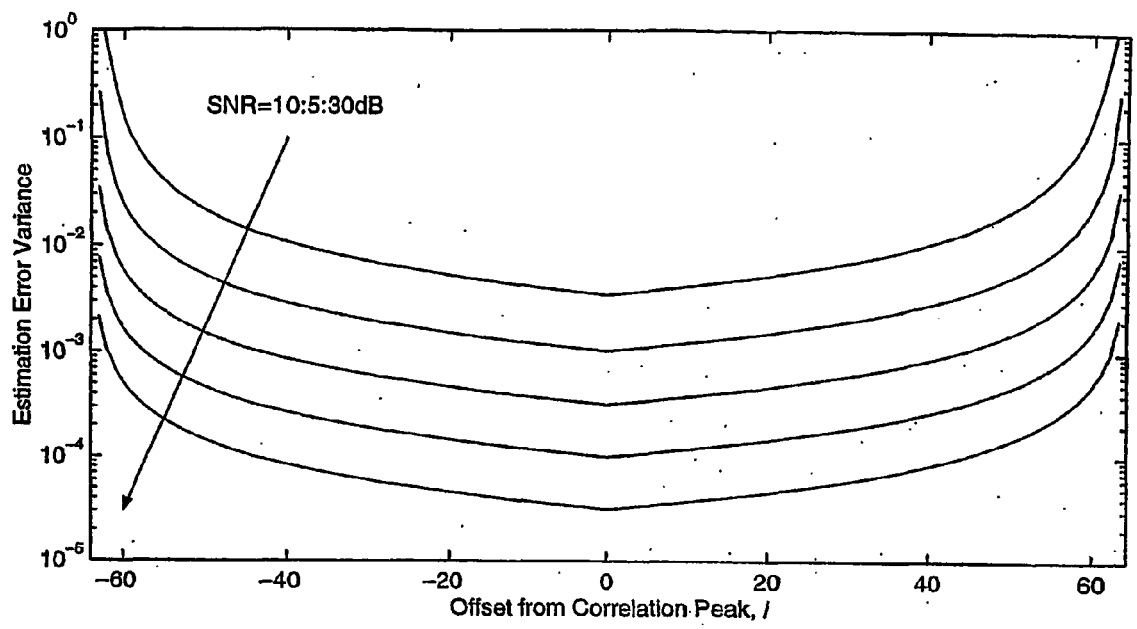
FIG. 17A shows the accuracy of the frequency offset estimation error variance offset from the correlation peak.
Figure 17B:
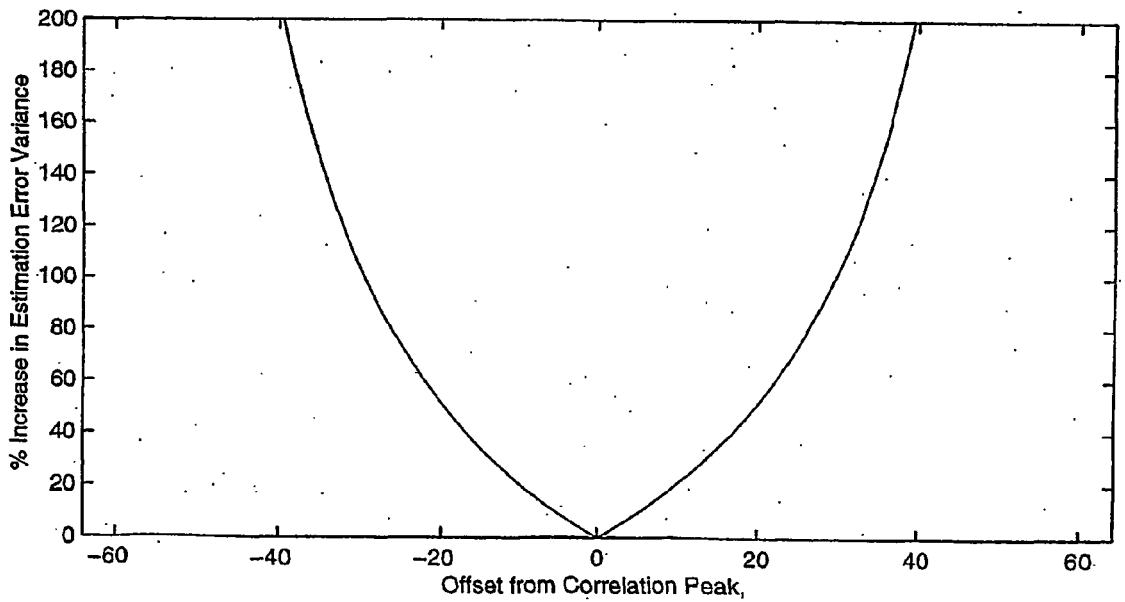
FIG. 17B shows the percentage increase in frequency offset estimation variance from zero lag at a given SNR.

FIG. 17 shows the accuracy of the frequency offset estimation error as a function of l, offset from the sliding window correlation peak. Note that since equation (43) inherits dependence on SNR $(aS/\sigma_w^2)$ and correlator offset l from the ratio $\mu_P/\sigma_P$ inspection of equations (26) and (27) indicates that the dependence of the frequency offset estimation error variance on $(aS/\sigma_w^2)$ and l is independent. FIG. 17A shows that the variance of the frequency offset estimation error is more sensitive to SNR than it is to small values of l. This means that it is more important to have a higher start of packet estimator that estimates the start of packet to within 20 data samples of the actual start of packet. For example, the increase in frequency offset estimation error variance for a 5 dB decrease in SNR is approximately equal to an offset of l=40. FIG. 17B depicts percentage increase in frequency offset estimation error variance as a function of l at a given SNR, and it can be seen that the accuracy penalty for small values of l, up to 20 say, is relatively modest. This is important, as the matched filter described by equation (12) is computationally expensive to produce, and so the complex sample value $P_l$ used to produce the forward estimate of the frequency offset $\nu$ for a given packet is the sample for which the sliding window detector (the timing metric) equation (9) first becomes positive. From FIG. 14C it can be seen that, for threshold value $T_{C1}^2=0.8$ and a SNR greater than 20 dB, the start of packet estimate will occur at approximately l=5 at which, referring to FIG. 17B, the accuracy penalty is about a 10% increase in frequency offset estimation error variance. This shows that the frequency offset estimation error increases as the SNR decreases and is more sensitive to SNR than to small error in the sample estimated as the start of packet.

To determine the SNR required for reliable packet detection in the packet detect algorithm the mean and variance of the timing metric $Y_l$ need to be evaluated. These can be evaluated from the probability density function of the timing metric. As the timing metric is a function of the output of the matched filter and the autocorrelation of the received data the density functions of these variables also require evaluation. The value chosen for the threshold value $T_{C2}$ also has an impact on the timing metric $Y_l$.

From equation (13), the matched filter output $Q_l$ is well-approximated as being non-central complex Gaussian, so the probability density function of dummy variable $x=|Q|=|Q_l+Q_{l+L}|$ is $$p_{|Q|}(x) = \frac{x}{\sigma_Q^2}\exp\left[-\frac{1}{2}\left(\frac{x^2+\mu_Q^2}{\sigma_Q^2}\right)\right]I_0\left(\frac{x\mu_Q}{\sigma_Q^2}\right), \qquad 44$$

Where $$\mu_Q = LaS^2\left[\text{sinc}\left(l-\frac{\tau_s}{T}\right) + \text{sinc}\left(l+1-\frac{\tau_s}{T}\right)\right], \qquad 45$$

is the mean and $$\sigma_Q^2 = 2S^2L\sigma_w^2, \qquad 46$$

is the variance, and $I_0(\cdot)$ is the modified Bessel function of the first kind. As with equation (26), this is a Rice distribution in x.

As described previously, the probability density function of the autocorrelation of the received data $R_l$ is well-approximated as non-central Gaussian but, referring to equation (16) as required to evaluate the timing metric $Y'_l=|Q_l+Q_{l+1}|^2-T_{C2}^2LS^2R_l$, the scaled moments of $T_{C2}^2LS^2|R_l|$ become $$\mu_R = T_{C2}^2L^2S^2(a^2S^2+2\sigma_w^2) \qquad 47$$

for the scaled mean and $$\sigma_R^2 = T_{C2}^4 4L^3S^4\sigma_w^2(a^2S^2+\sigma_w^2) \qquad 48$$

for the scaled variance. Note that both the mean and variance of the scaled moments depend on the threshold value $T_{C2}$.

Assuming that the matched filter output $|Q|^2$ and the autocorrelation of the received data $R_l$ are uncorrelated, the distribution of the dummy variable $z=Y'_l=|Q_l+Q_{l+1}|^2-T_{C2}^2LS^2R_l$ may be shown to be $$p_{1Y'}(z>0\mid\tau_s) = 1 - \int_0^\infty\int_0^\infty p_{|Q|}(x^2)p_R(x^2-z)dx^2dz \qquad 49$$
$$= 1 - \int_0^\infty\frac{1}{4\sigma_R^2}\exp\left(-\frac{1}{2}\left[\frac{x+\mu_Q^2}{\sigma_Q^2}\right]\right)I_0\left(\frac{\sqrt{x}\,\mu_Q}{\sigma_Q^2}\right)$$
$$\left[\text{erfc}\left(\frac{x-\mu_R}{\sqrt{2}\,\sigma_R^2}\right) + \text{erfc}\left(\frac{x+\mu_R}{\sqrt{2}\,\sigma_R^2}\right)\right]dx,$$

noting that this expression requires insertion of a particular value of $\tau_S$. To evaluate the distribution of $Y'_l$ over the ensemble of $\tau_S$ (the marginal distribution), equation (49) is inserted into $$p_{1Y'}(z>0) = \int_{\tau_S} p(z>0\mid\tau_s)p(\tau_s)d\tau_s \qquad 50$$

-continued $$= \frac{1}{T}\int_{-\frac{T}{2}}^{\frac{T}{2}} p(z>0 \mid \tau s) d\tau s,$$

which may be evaluated by numerical integration. As described previously, however, this expression is only valid for low values of SNR where $|Q|^2$ and $R_l$ are uncorrelated.

Figure 18:
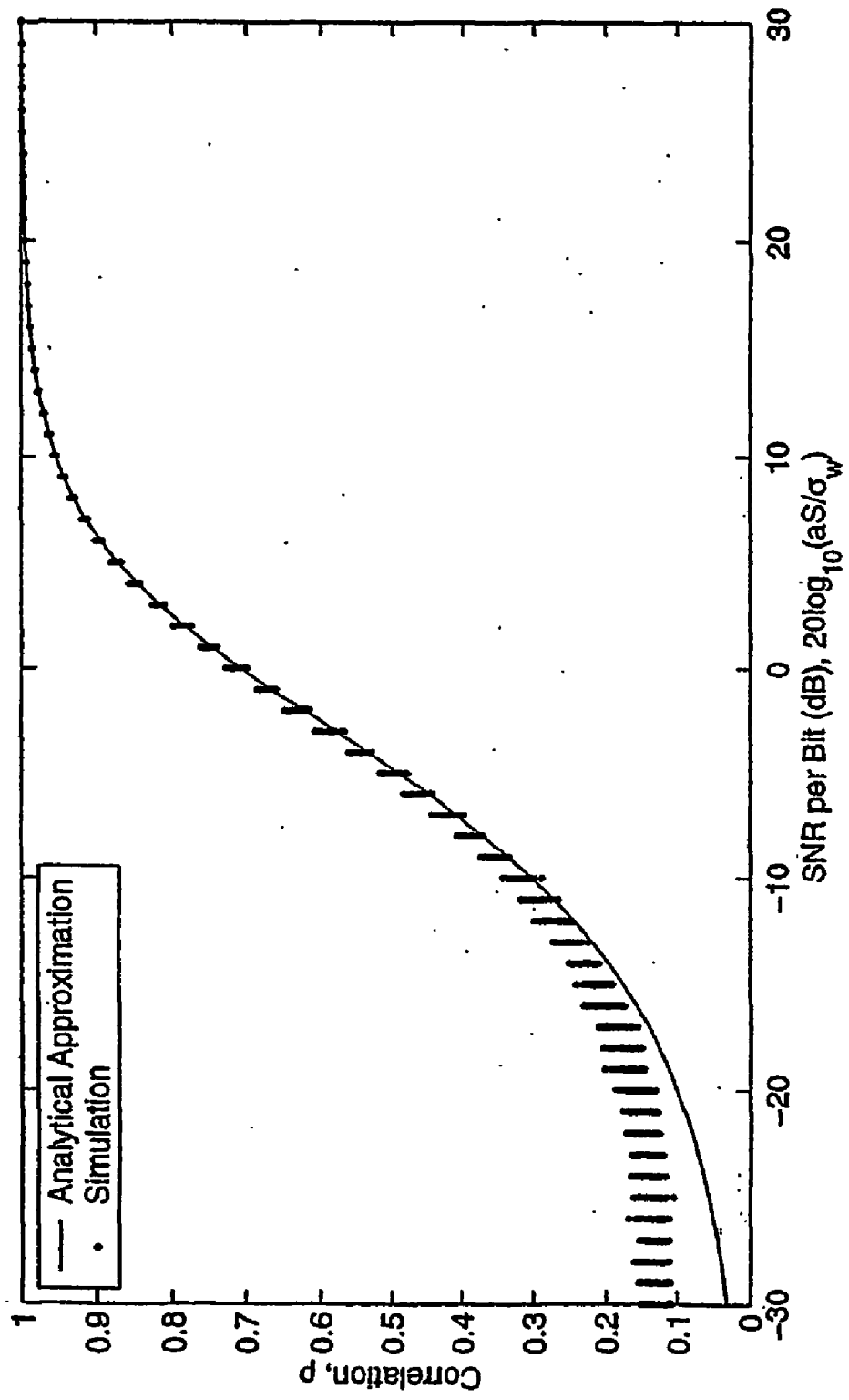
FIG. 18 shows the correlation between the covariance random variable and the mean power random variable.

It can be shown that at high SNRs the output of the matched filter $|Q|^2$ and the autocorrelation of the received data $R_l$ are correlated and the correlation coefficient between $|Q|^2$ and R is well approximated at high SNRs by $$\rho_{|Q|R}\left(\frac{aS}{\sigma_w}\right) \approx \frac{1}{\sqrt{1+\frac{\sigma_w^2}{a^2 S^2}}}, \quad 51$$

which is inversely proportional to the mean signal-to-noise ratio per sample $aS/\sigma_w$ and therefore may be approximated as zero only at very low signal-to-noise ratios. FIG. 18 shows excellent agreement between Monte Carlo simulation data and equation (51). This means that for high SNRs and at the start of the packet equation (51) accurately describes the correlation coefficient between the output of the matched filter $|Q|$ and the autocorrelation of the received data R.

For high values of SNR, the matched filter output $|Q|$ is well-approximated as non-central Gaussian, and the distribution of $z=Y'_l$ may be produced from the bivariate Gaussian density to obtain $$p_{2Y'}(z>0 \mid \tau s) = 1 - \int_0^\infty \int_0^\infty p_{|Q|R}(x^2, x^2-z) dx^2 dz \quad 52$$

$$= 1 - \frac{1}{4\sqrt{2\pi}\sigma_Q}\int_0^\infty \frac{1}{\sqrt{x}}\exp\left[-\frac{1}{2}\left(\frac{\sqrt{x}-\mu_Q}{\sigma_Q}\right)^2\right]$$

$$\mathrm{erfc}\left[\frac{1}{\sqrt{1-\rho^2}}\left(\frac{x-\mu_R}{\sqrt{2}\sigma_R}-\rho\frac{\sqrt{x}-\mu_Q}{\sqrt{2}\sigma_Q}\right)\right] dx,$$

where, as above, the marginal distribution may be evaluated using equation (50). Again, empirically, it was found that the direct Gaussian approximation $$p_{3Y'}(z>0) = \frac{1}{T}\int_{-\frac{T}{2}}^{\frac{T}{2}} \frac{1}{2}\mathrm{erfc}\left(-\frac{\mu_{Y'}}{\sqrt{2}\sigma_{Y'}}\right) d\tau s, \quad 53$$

Where $$\mu'_Y = \langle Y'_l \rangle \quad 54$$

$$= \langle Q_l^2 \rangle - T_{C2}^2 L S^2 \langle R_l \rangle$$

$$= \mu_Q^2 + 2\sigma_Q^2 - \sqrt{\frac{\pi}{2}}\sigma_R\exp\left[-\frac{1}{2}\left(\frac{\mu_R}{\sigma_R}\right)^2\right] M\left(\frac{3}{2}, 1, \frac{1}{2}\left(\frac{\mu_R}{\sigma_R}\right)^2\right)$$

where $M(\cdot)$ is Kummer's function, is the mean and $$(\sigma'_Y)^2 = \langle (Y'_l)^2 \rangle - \langle Y'_l \rangle^2 \quad 55$$

$$= \mathrm{var}\{Q_l^2\} + T_{C2}^4 L^2 S^4 \mathrm{var}\{R_l\} - 2T_{C2}^2 L S^2 \mathrm{cov}\{Q_l^2 R_l\}$$

$$= 4\sigma_Q^2(\mu_Q^2+\sigma_Q^2) + (\mu_R^2+\sigma_R^2) - (\mu'_Y)^2 -$$

$$4\rho\mu_Q\sqrt{(\mu_Q^2+\sigma_Q^2)(\mu_R^2+\sigma_R^2-(\mu'_Y)^2)}$$

is the variance of $z=Y'_l$, was a better high signal-to-noise ratio approximation than $p_{2Y'}$.

Three distributions for timing metric $Y_l$ have now been developed. One of these distributions (described by equation 49) assumes that the output of the matched filter and the autocorrelation are uncorrelated and the other two distributions (described by equations 52 and 53) include a correlation coefficient between the output of the matched filter and the autocorrelation.

Figure 19:
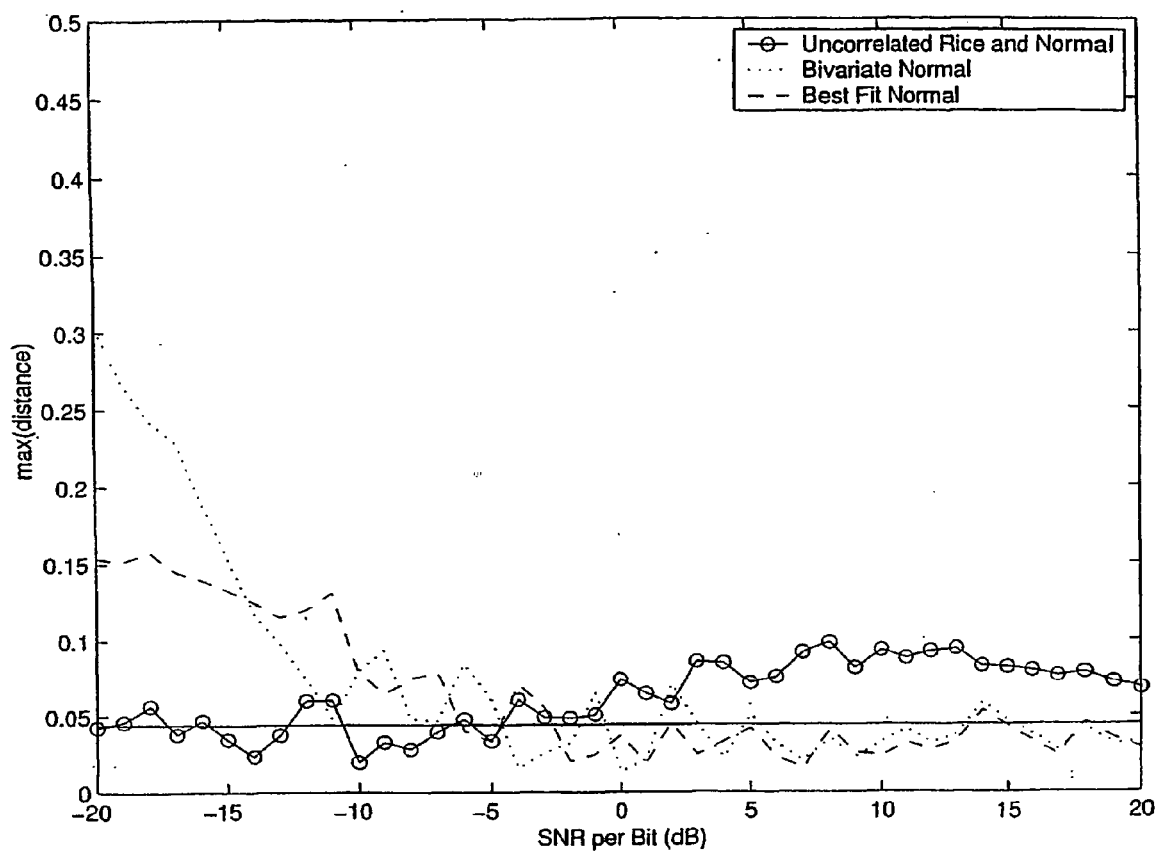
FIG. 19 shows the Kolmogorov-Smirnov distance measures for the goodness of fit referred to 95% significance level.

A comparison of Kolmogorov-Smirnov (K-S) distance measures for goodness of fit of $p_{1Y'}$, $p_{2Y'}$ and $p_{3Y'}$ to Monte Carlo data is shown in FIG. 19. These results show that, by evaluating equation (50) based on equation (49) into for SNRs below −5 dB and equation (50) based on equation (52) for SNRs above −5 dB, a good approximation can be made over most of the SNR range. Note that this result allows the correlation coefficient to be treated as zero for SNRs below −5 dB in precisely the region where the approximate expression of equation (51) showed poor accuracy. Over the entire SNR range, about 500 samples of Monte Carlo data are required to make the K-S test fail. Note that these approximations to $Y'_l$ are not as accurate as the analogous approximations to $X_l$ due to the additional numerical inaccuracies incurred in evaluating equation (50). Note also that the K-S tests are more computationally expensive to evaluate to the same level of accuracy due to the double integration and the increase in dimension of the Monte Carlo data, thus the level confidence in these results is not as high as those for $X_l$. These results show that the performance of the packet detect algorithm depends on the values set for the threshold values.

Figure 20A:
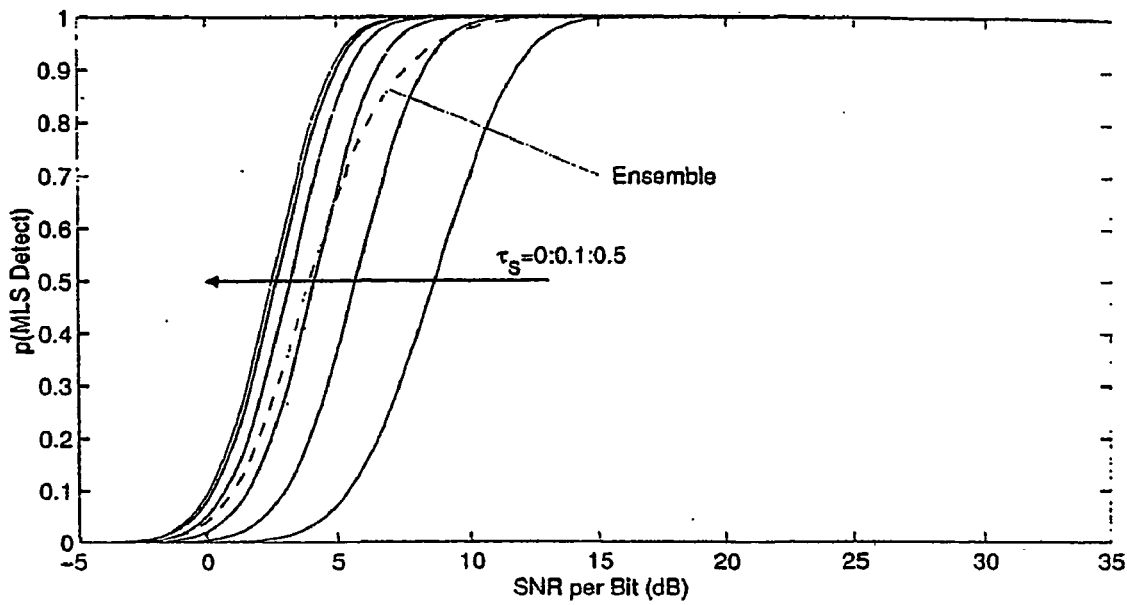
FIG. 20A shows the probability of detection based on the start of packet detection metric as a function of SNR for a fixed threshold of correlation.
Figure 20B:
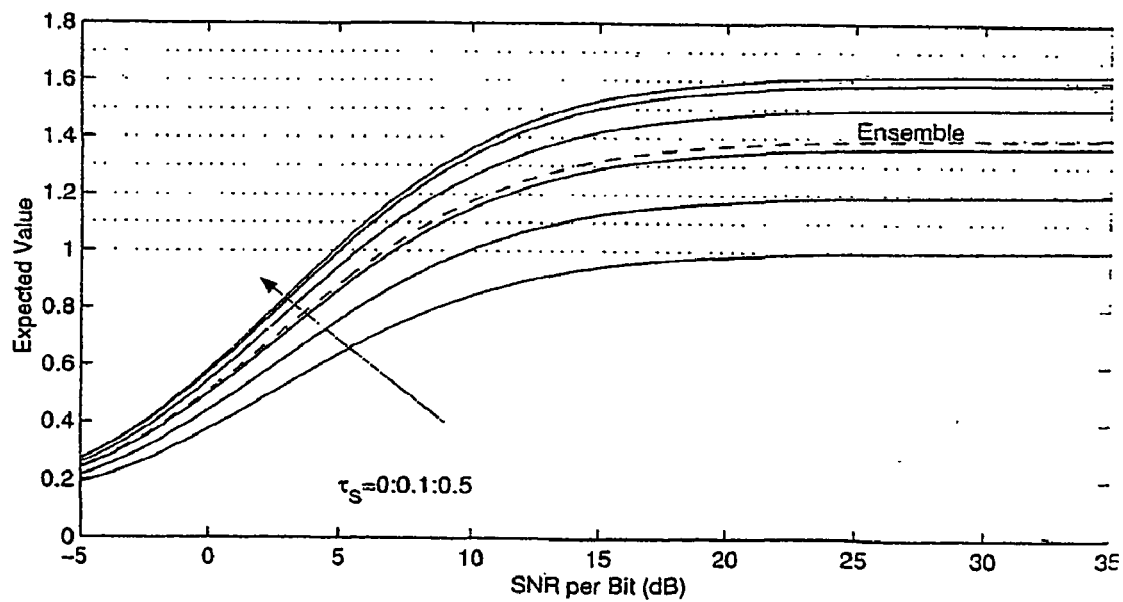
FIG. 20B shows the expected value of the start of packet detection metric for differing SNR.

FIG. 20 depicts the probability of detection based on the start of packet estimation metric, $|\rho_{T''}|^2$, as a function of SNR, for $T_{C2}^2=0.8$. FIG. 20A depicts the distribution of $Y'_l$ for six different instances of time offset $\tau_S$ and also depicts the distribution across the ensemble of $\tau_S$. This graphs shows that as the time offset increases to half a sample less SNR is required to accurately detect the start of a packet. FIG. 20B depicts the expected value of $|\rho_{T''}|^2$ for the same six instances of time offset $\tau_S$, and also the mean value across the ensemble of $\tau_S$. This shows that the time offset influences the expected value of the start of packet detection metric. It also shows that an SNR of greater than 10 dB is required to accurately detect the start of a packet.

In a noise only system there is a possibility that the system will detect a start of packet where none exists. This is called the probability of false packet detection. Reducing the probability of false packet detection (or increasing the mean time between failures) is important in a communications system.

In the absence of signal, the approximate probability density function of dummy variable $x=|Q|$ collapses to $$p_{|Q|}(x) = \frac{x}{\sigma_Q^2}\exp\left(-\frac{1}{2}\frac{x^2}{\sigma_Q^2}\right), \quad 56$$

where $\sigma_Q^2 \doteq 2^{1/2} S^2 L \sigma_w^2$ and equation (56) is a Rayleigh distribution in x. The exact probability density function of dummy variable $z = T_{C2} LS |R_l|$ is $$p_R(y) = \frac{1}{\sigma_R^L \Gamma(L)} y^{L-1} \exp\left(-\frac{y}{\sigma_R}\right), \qquad 57$$

where $\sigma_R^2 \doteq T_{C2} S^2 L \sigma_w^2$ and equation (57) describes the gamma distribution with L degrees of freedom. Assuming that, in the noise only case, the matched filter output $|Q|$ and autocorrelation $R_l$ are uncorrelated, the noise only distribution of the timing metric represented by dummy variable $z = Y'_l$ can be shown to be $$p_{3Y}(z > 0) = \int_0^\infty \int_0^\infty p_{|Q|}(x+z) p_R(x) dx dz \qquad 58$$

$$= \left(\frac{1}{1 + \frac{\sigma_R^2}{\sigma_Q^2}}\right)^L$$

$$= \left(\frac{1}{1 + T_{C2}}\right)^L.$$

Combining the results previously described, the probability of correct packet detection, that is the correct identification of start of packet, can be calculated as $$p_{FD} = p_X(z > 0 | l = 0) p_Y(z > 0 | l = 0) \prod_{l=-L}^{-1} [1 - p_X(z > 0 | l) p_Y(z > 0 | l)], \qquad 59$$

where $p_X(\cdot)$ is calculated over the ensemble of $\tau_S$. The probability of false packet detection, that is incorrect identification of start of packet, can be approximated as $$p_{FF} \approx \sum_{l=-L}^{-1} \left\{ p_X(z > 0 | l) p_Y(z > 0 | l) \prod_{m=-L}^{l-1} [1 - p_X(z > 0 | m) p_Y(z > 0 | m)] \right\} \qquad 60$$

$$\approx \sum_{l=-L}^{-1} p_X(z > 0 | l) p_Y(z > 0 | l),$$

where the second approximation very closely approaches the first at high SNR, and noting that, strictly speaking, values for positive l also can cause false packet detection, conditioned on a failure to detect at l=0. In practice, however, this probability is data dependent and since, at high SNR, the probability of packet detection at l=0 is effectively 1.0, the probability of false packet detection is effectively the summation of (60).

Figure 21A:
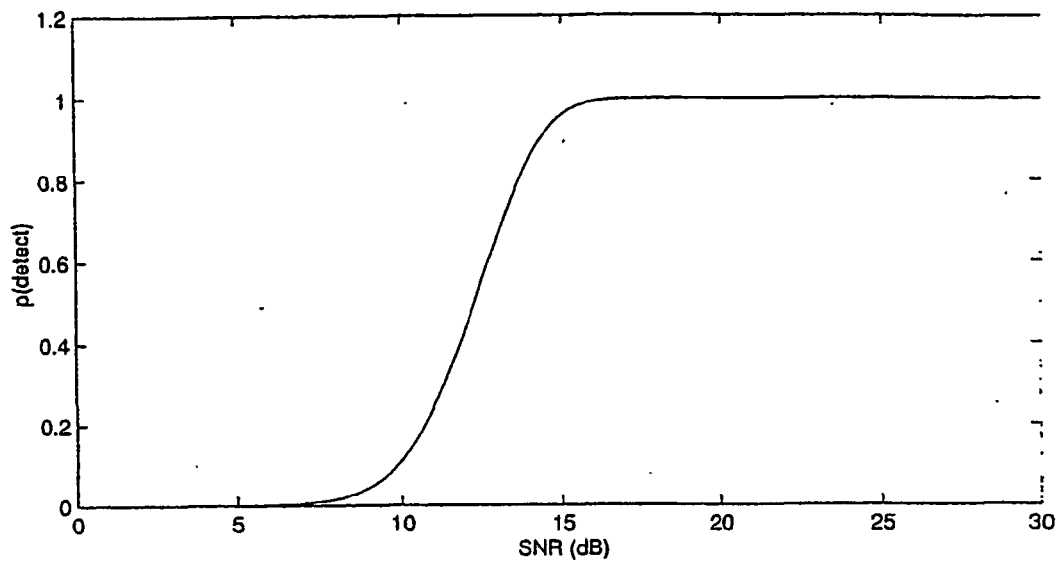
FIG. 21A shows the probability of correct packet detection.
Figure 21B:
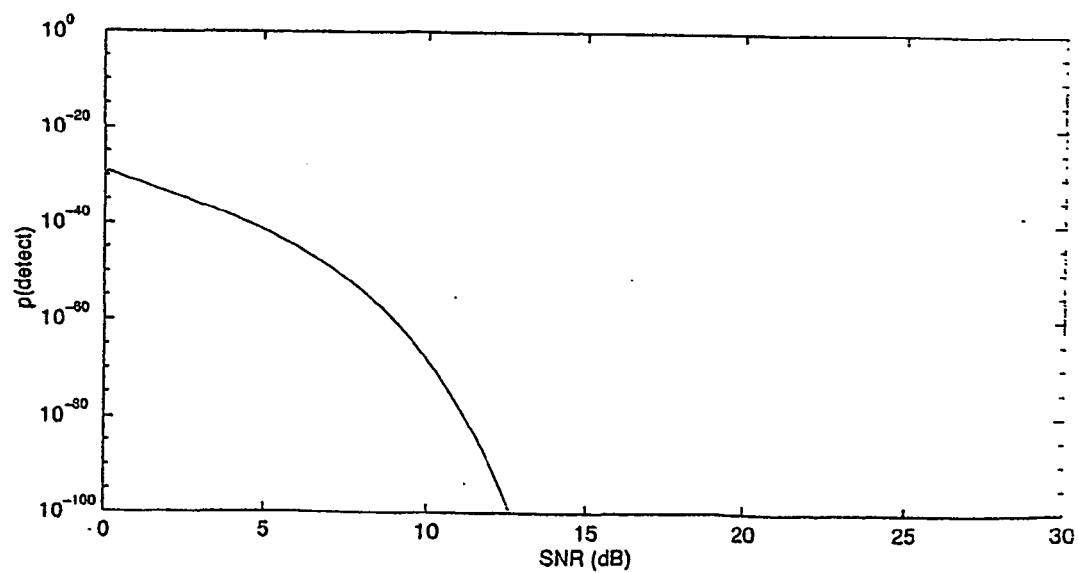
FIG. 21B shows the probability of false packet detection.

FIG. 21A shows the probability of correct packet detection as a function of SNR for $T_{C1}^2 = 0.6$, 0.8 and $T_{C2}^2 = 0.8$. In particular, this result indicates that a SNR of at least 15 dB is required to ensure reliable packet detection at $T_{C1} = T_{C2} = 0.8$. The composite performance of packet detection largely is determined by the threshold of the sliding window correlator (the crosscorrelator), since both inputs into the sliding window correlator include noise components whereas the matched filter is noise-free. A lower value of $T_{C1}$ may be used to reduce the minimum required SNR. For example $T_{C1}^2 = 0.6$ reduces the minimum required SNR to about 10 dB as shown in FIG. 21A. However, as discussed previously, real-world effects such as receiver non-linearities and interference have significant impact on performance. Even with careful design, false packet detection may cause the receiver to go into an unknown state for some time and therefore the probability of this outcome should be minimised. By contrast, a packet not received due to missed detection will be re-transmitted by normal operation of the data link layer protocol. Thus it is more important to avoid false packet detection then to miss the start of a packet.

At low SNR, the probability of false packet detection approaches the noise-only probability of false detection, given by $$p_{NO} = p_{3X}(z > 0) p_{3Y}(z > 0), \qquad 61$$

which, for $T_{C1}^2 = T_{C2}^2 = 0.8$ is $p_{NO} = 5.7 \times 10^{-28}$ per sample. Since this is non-time-varying, then the failure rate density is $p_n(n) = p_{NO} e^{-n \, p_{NO}}$, and the mean time (number of samples) between false detections MTBFD is given by $$MTBFD = \langle n \rangle = \int_0^\infty n p_n(n) \qquad 62$$

$$= \frac{1}{p_{NO}}$$

Figure 22A:
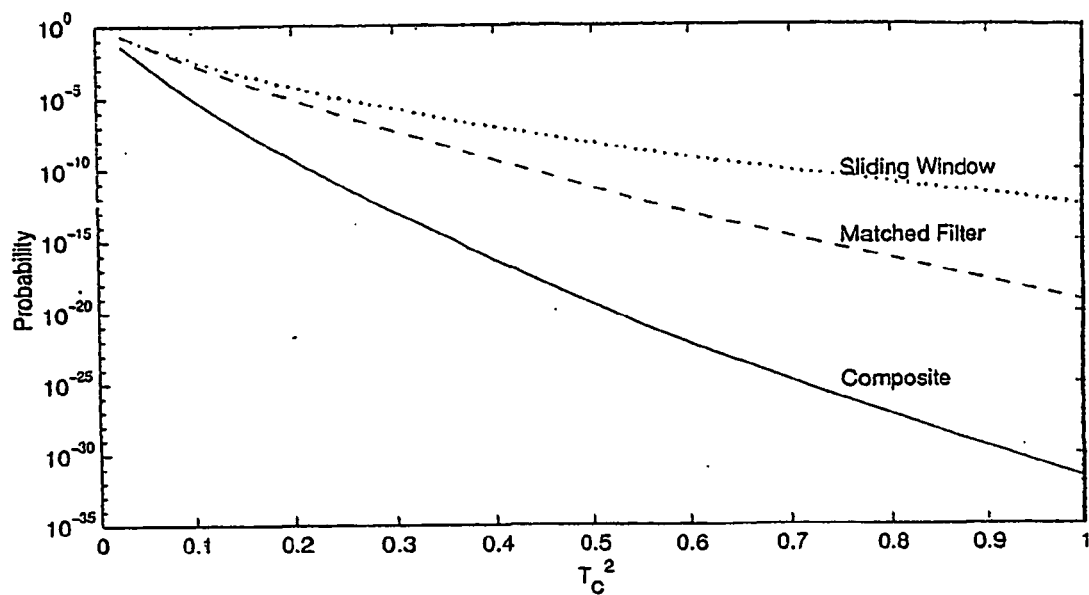
FIG. 22A shows the probability of noise-only false detection.
Figure 22B:
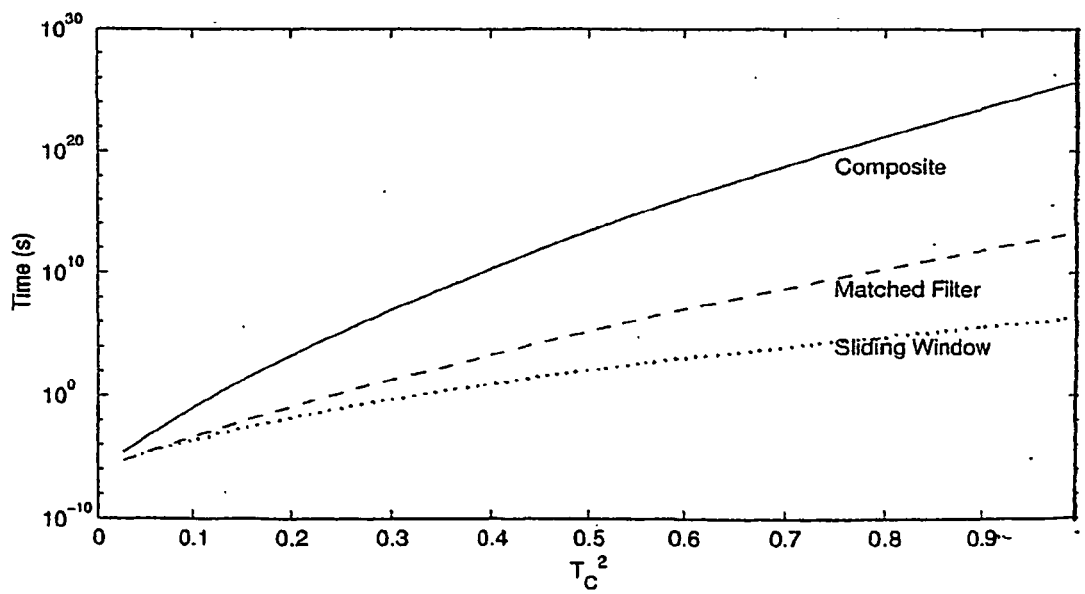
FIG. 22B shows the mean time between false detection for a set sample rate.

The probability of noise-only false detection is shown in FIG. 22A and the mean time between false detections is shown in FIG. 22B, both as a function of the combined threshold value $T_C^2 \doteq T_{C1}^2 = T_{C2}^2$. In both FIGS. 22A and 22B, the results are broken down into the result for the sliding window correlation only, the result for the matched filter correlation only, and the composite system result. These results show that the probability of noise-only false detection mostly is set by the matched filter correlation and decreases as the combined threshold value increases. For the experimental system, the false detection probability was found to be significantly greater than that shown in FIG. 22 for an AWGN-only channel, the difference due to the real-world effects discussed above. The threshold values $T_{C1}$ and $T_{C2}$ may thus be chosen to reduce the probability of false packet detection while ensuring that the vast majority of packets are detected.

It is important to know how changes in SNR and the accuracy of the estimate of the start of packet affect the phase offset estimation algorithm. This can be determined from the probability density function of the phase offset estimation error.

Figure 23A:
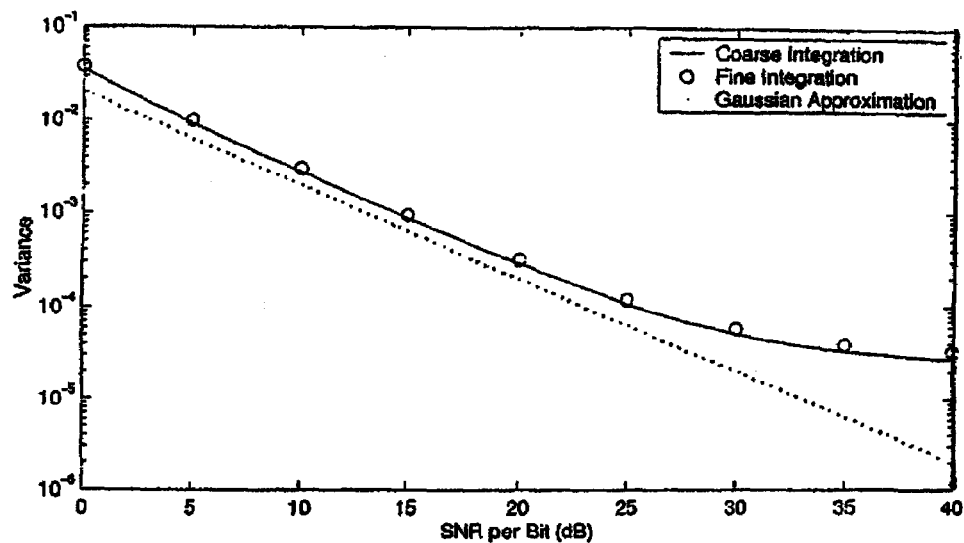
FIG. 23A shows the phase offset estimation error variance.

From equation (13), and following the method previously described for frequency offset estimation, it is relatively straightforward to show that the probability density function of the phase offset estimation error $\alpha \doteq \arg\{Q_0\}|_{\theta=0} = \hat{\theta} - \theta$ is $$p_\alpha(\alpha | \tau_s, v, \phi) = \qquad 63$$

$$\frac{1}{2\pi} \exp\left(-\frac{1}{2}\frac{\mu_Q^2}{\sigma_Q^2}\right) + \frac{1}{2\sqrt{\pi}} \frac{\mu_Q \cos\gamma}{\sqrt{2}\,\sigma_Q} \exp\left(-\frac{\mu_Q^2 \sin^2\gamma}{2\sigma_Q^2}\right) \mathrm{erfc}\left(-\frac{\mu_Q \cos\gamma}{\sqrt{2}\,\sigma_Q}\right),$$

where $$\gamma \doteq \alpha - 2\pi v \tau_S + \phi \frac{L-1}{2L}$$

for brevity and noting that $\mu_Q$ also is a function of the time offset $\tau_S$. This is the density of a conditioned on particular instances of $\tau_S, v$ and $\phi$. The marginal density, across the ensemble of the time offset $\tau_S$, frequency offset $v$ and frequency offset estimation error $\phi$, may be found as $$p_\alpha(\alpha) = \int_{\tau_S}\int_v\int_\phi p_\alpha(\alpha|\tau_S, v, \phi)p(\tau_S)p(v)p(\phi)d\phi dv d\tau_S = \frac{1}{T\sqrt{2\pi}\,\sigma_v} \quad (64)$$

$$\int_{-\frac{T}{2}}^{\frac{T}{2}}\int_{-\infty}^{\infty}\int_{-\pi}^{\pi} p_\alpha(\alpha|\tau_S v, \phi)p_\phi(\phi)d\phi \exp\left(-\frac{v^2}{2\sigma_v^2}\right)dv d\tau_S,$$

where the probability density function of the frequency offset estimation error, $p_{100}(\phi)$, is given by equation (43) and $v$, the uncorrected frequency offset, is modelled as zero mean Gaussian with variance $\sigma_{84}^2$ across the ensemble of frequency offset. This expression can be evaluated using numerical integration FIG. 23 shows the accuracy of the phase offset estimation error as a function of SNR. FIG. 23A depicts the phase offset estimation error variance $<\alpha^2>$, noting that $<\alpha>=0$, produced by numerical integration of equation (64), for frequency offset variance $\sigma_v=3$ kHz in comparison with the variance of the Gaussian approximation $$p_\alpha(\alpha) \approx \mu'_Q/[(2\pi)^{1/2}\sigma_Q]\exp\left(-\frac{1}{2}[\alpha\mu'_Q/\sigma_Q]^2\right),$$

$$\text{where } \mu'_Q = 2LaS^2\int_0^{\frac{1}{2}T}\text{sinc}(\tau_S/T)d\tau_S.$$

Figure 23B:
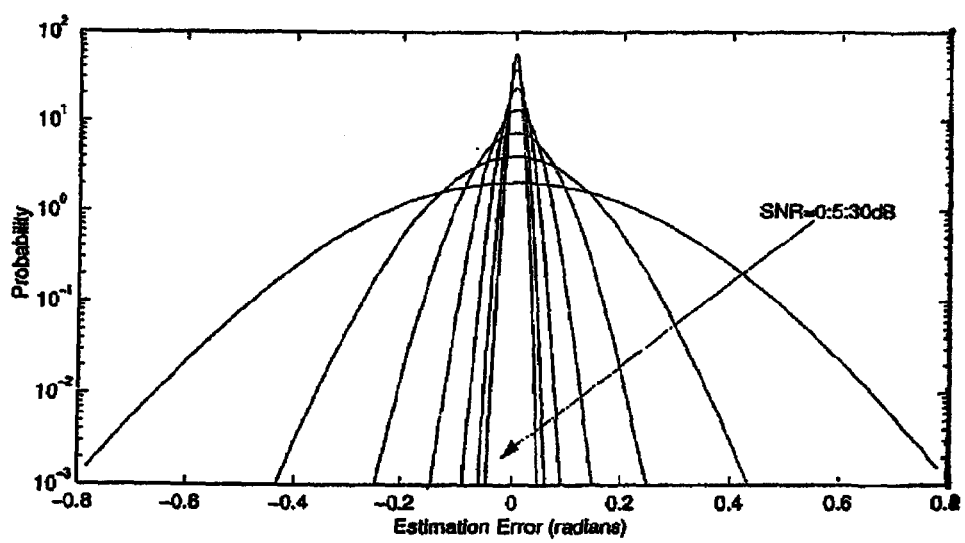
FIG. 23B shows the ensemble probability density function of the phase offset estimation error.

This illustrates that the Gaussian approximation is reasonably accurate for SNRs between about 5 dB and 25 dB, but is not accurate in the main area of interest, that is at high SNR. This is due to the asymptotic variance floor from the ensemble of time offset $\tau_S$ and frequency offset $v$. FIG. 23B depicts the marginal probability density function of the phase offset estimation error $p_\alpha(\alpha)$ for a range of SNRs. This shows that, variance floor notwithstanding; the ensemble phase error becomes very small, much less than 0.1 radians, at high SNR.

Figure 24:
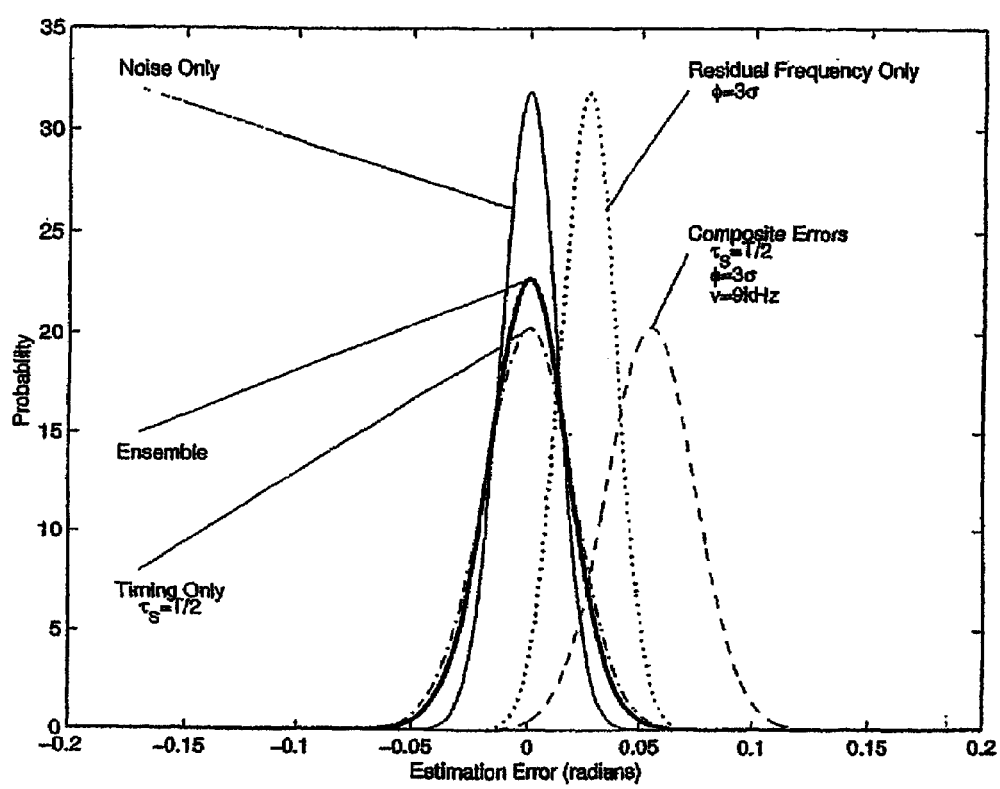
FIG. 24 shows the phase offset estimation error density at a fixed SNR.

FIG. 24 compares the marginal probability density function of the phase offset estimation error $p_\alpha(\alpha)$ with conditional densities of time offset equal to half a data sample $p_\alpha(\alpha|\tau_S=T/2)$, frequency offset estimation error equal to 3 time the variance of the crosscorrelator $p_\alpha(\alpha|\phi=3\sigma_P)$, frequency offset equal to 3 times the variance of the frequency $p_\alpha(\alpha|v=3\sigma_v)$, a worse case with the three above values $p_\alpha(\alpha|\tau_S=T/2,\phi=3\sigma_P,v=3\sigma_v)$ and a best case where all the offsets are zero $p_\alpha(\alpha|\tau_S=0,\phi=0,v=0)$, all at a SNR of 20 dB. In each of the first three cases, the conditional density is for the worst case value of the conditional parameter, and in the fourth case, the conditional density is for the worst case values of each of the three conditional parameters. The final conditional density is for the best case values of each of the three conditional parameters. It is important to recognise that, while the marginal density indicates the phase offset estimation error performance across the ensemble of parameter values, each pilot symbol is received with a particular sample value for each parameter. In a sense, each received packet has its own phase offset estimation error density, across an ensemble of AWGN, which is determined by the particular sample values of each parameter for that packet. The ensemble density to some extent indicates probability of occurrence of each set of parameter values.

The variance of the estimate of time offset $\tau_S$ given by equation (25) may be found by modifying a standard result for estimation of the frequency of an unknown complex sinusoid in complex AWGN to obtain $$\text{var}\{\hat{\tau}_S\} \geq \frac{3\sigma_w^2}{2\pi^2 a^2 S^2(L^2-1)}. \quad (65)$$

For estimation in AWGN, the estimation error is zero mean and asymptotically Gaussian for large L, following the property of ML estimators, where the variance is given by the lower bound of equation (65).

It is anticipated that the majority of WLAN usage will be in line-of-sight or near line-of-sight channels. In this case, the (frequency non-selective) fading channel amplitude is well-modelled by the Rice probability density function (PDF) which, for a sufficiently large K-factor (line-of-sight to specular component ratio) produces near AWGN conditions.

For frequency non-selective multipath fading channels the system performance may be evaluated by defining the density of any system parameter (for example, frequency offset or timing offset) $\gamma$ as $p_\gamma(\gamma)$ and defining the density (for example, Rayleigh, Rice or Suzuki) of the (frequency non-selective) fading channel amplitude a as $p_a(a)$. As a was assumed to be a constant in the preceding analysis, considering it here as a random variable implies that the marginal parameter densities $p_\gamma(\gamma)$ presented in the preceding sections now must be considered as conditional parameter densities $p_{\gamma a}(\gamma|a)$ Then, applying Bayes' rule, the marginal density of $\gamma$ for random a is $$p_\gamma(\gamma)=\int_0^\infty p_{\gamma a}(\gamma|a)p_a(a)da. \quad (66)$$

As the majority of the parameter densities given here are complicated in AWGN, equation (66) typically will require evaluation using numerical integration.

For example, the density of $\tau_s \doteq \hat{\tau}_S - \tau_S$ in a Rayleigh fading channel is $$p_{\tau_S}(\tau_\varepsilon) = \int_0^\infty \frac{a}{\sqrt{2\pi}\,\sigma_\tau}\exp\left(-\frac{1}{2}\frac{\tau_\varepsilon^2 a^2}{\sigma_\tau^2}\right)\frac{a}{\sigma_R^2}\exp\left(-\frac{1}{2}\frac{a^2}{\sigma_R^2}\right)da \quad (67)$$

$$= \frac{\sigma_\tau^2\sigma_R}{2(\tau_\varepsilon^2\sigma_R^2 + \sigma_\tau^2)^{3/2}},$$

where $\sigma_\tau^2 \doteq a^2\,\text{var}\{\hat{\tau}_S\}$ is the variance in the estimate of $\tau_S$ independent of a and $\sigma_R^2 \doteq \frac{1}{2}<a^2>$ is the Rayleigh parameter. However, as other examples, the density of $\phi$ and $\alpha$ in a Rice fading channel require numerical integration of complicated expressions.

While the examples given here relate to an OFDM wireless communication system it should be appreciated that the method for assessing channel parameters can be applied to other wireless digital communications systems using a pilot symbol of the invention.

The foregoing describes the invention including a preferred form thereof. Alterations and modifications as will be obvious to those skilled in the art are intended to be incorporated within the scope hereof as defined in the accompanying claims.

The invention claimed is:

1. A method of detecting and synchronising packets of data with a repeated sequence as a pilot symbol received by a communications system comprising the steps of receiving data at a receiver as a series of data samples, and performing the following steps in the receiver: detecting a packet within the received data, producing an estimate of the time-varying frequency offset of the received data, estimating the start of the packet of the received data, estimating the time-varying frequency offset of the received data again after the packet start has been estimated, estimating the time-varying phase offset of the received data and estimating the time-varying time offset of the received data.

2. A method of detecting and synchronising packets of data with a repeated sequence as claimed in claim 1 further comprising the step of in the receiver applying a correction to the received data based on the estimated frequency offset of the received data before the step of estimating the start of packet.

3. A method for detecting and synchronising packets of data with a repeated sequence as claimed in claim 1 further comprising the step of in the receiver applying corrections based on the frequency and phase offsets to the received data before the step of estimating the time varying time offset.

4. A method according to claim 1 wherein the step of producing an estimate of the time-varying frequency offset of the received data comprises the steps of:
receiving the data at a receiver as a series of data samples,
producing an autocorrelation of a first vector of the received data,
producing a cross correlation between the first vector of the received data and a second vector of the received data,
determining a timing metric representing the approximate start of a data packet for the current data sample as a function of the autocorrelation, the cross correlation and a threshold value,
assessing whether the timing metric is positive,
if the timing metric is not positive returning to the step of producing an autocorrelation of a first vector of the received data, and
if or when the timing metric is or becomes positive estimating the frequency offset from the phase of the cross correlation.

5. A method according to claim 4 wherein the step of producing an estimate of the time-varying frequency offset of the received data further comprises the steps of:
determining the phase of the cross correlation of the first vector and the second vector once the start of a data packet has been detected, and
estimating the frequency offset from the phase of the cross correlation.

6. A method according to claim 4 wherein the pilot symbol includes at least two sequences with constant envelope in both the frequency and time domains.

7. A method according to claim 4 wherein the length of the vectors used to determine the autocorrelation and the cross correlation of the received data are the length of a constant envelope sequence in the pilot symbol.

8. A method according to claim 4 wherein the step of determining the timing metric includes determining the result of:

$$|P_l|-T_{C1}\sqrt{R_l R_{l+L}}$$

where $P_l$ represents the cross correlation of the received data,
$T_{C1}$ represents the threshold value,
$R_l$ represents the autocorrelation of the received data beginning at sample l, and
$R_{l+L}$ represents the autocorrelation of the received data beginning at sample l+L.

9. A method according to claim 4 wherein the step of determining the timing metric includes determining the result of:

$$|P_l|-T_{C1}\max(R_l, R_{l+L})$$

where $P_l$ represents the cross correlation of the received data,
$T_{C1}$ represents the threshold value, max represents taking the maximum value of those in the brackets,
$R_l$ represents the autocorrelation of the received data beginning at sample l, and
$R_{l+L}$ represents the autocorrelation of the received data beginning at sample l+L.

10. A method according to claim 4 wherein the step of determining the timing metric includes determining the result of:

$$|P_l|-T_{C1} R_l$$

where $P_l$ represents the cross correlation of the received data,
$T_{C1}$ represents the threshold value, and
$R_l$ represents the autocorrelation of the received data beginning at sample l.

11. A method according to claim 4 wherein the step of determining the timing metric includes determining the result of:

$$|P_l|-T_{C1} R_{l+L}$$

where $P_l$ represents the cross correlation of the received data,
$T_{C1}$ represents the threshold value, and
$R_{l+L}$ represents the autocorrelation of the received data beginning at sample l+L.

12. A method according to claim 4 wherein the step of determining the timing metric includes determining the result of:

$$P_l^2 - T_{C1}^2 R_l^2$$

where $P_l$ represents the cross correlation of the received data,
$T_{C1}$ represents the threshold value, and
$R_l$ represents the autocorrelation of the received data beginning at sample l.

13. A method according to claim 4 wherein the step of determining the frequency offset includes determining the result of:

$$\frac{1}{2\pi LT}\arctan\left(\frac{\mathrm{Im}\{P_l\}}{\mathrm{Re}\{P_l\}}\right)$$

where $P_l$ represents the cross correlation of the received data,
L represent the length of a constant envelope sequence in the pilot symbol, and
T represents the period of a sample.

14. A method according to claim 1 wherein the step of estimating the start of the packet of the received data comprises the steps of:
receiving the data at a receiver as a series of data samples,
applying a correction based on an estimate of a frequency offset of the received data to a first vector of the received data to form a matched filter,
producing an autocorrelation of the first vector of the received data, applying the matched filter to the received data to produce an output, determining a timing metric for the current sample of data as a function of the output of the matched filter, the autocorrelation of the first vector of the received data, the magnitude of the constant envelope of a sequence of the pilot symbol and a first threshold value, assessing whether the first timing metric is positive, if the first timing metric is not positive returning to the step of producing an autocorrelation at the first vector of the received data, and when the first timing metric becomes positive estimating the start of packet from the current data sample.

15. A method according to claim 14 wherein the pilot symbol includes at least two sequences with constant envelope in both the frequency and time domains.

16. A method according to claim 14 wherein the length of the matched filter is equal to the length of a sequence within the pilot symbol.

17. A method according to claim 14 wherein the length of the vector used to produce the autocorrelation is equal to the length of a sequence within the pilot symbol.

18. A method according to claim 14 wherein the vector of data used to produce the autocorrelation and the vector of data used to produce the output of the matched filter are the same.

19. A method according to claim 14 wherein the step of estimating the start of the packet of the received data further comprises the step of ensuring that a second timing metric is positive before estimating the start of the data packet.

20. A method according to claim 19 wherein the second timing metric is a function of a second threshold value, the autocorrelation of the received data and a cross correlation between the first vector of data and a second vector of the received data.

21. A method according to claim 14 wherein the step of determining the first timing metric includes the step of determining the result of:

$$|Q_l + Q_{l+1}| - T_{C2}\sqrt{LS}\sqrt{R_l}$$

where $Q_l$ represents the output of the matched filter for a vector of the received data starting at sample l, $Q_{l+1}$ represents the output of the matched filter for a vector of the received data starting at sample l+1, $T_{C2}$ represents the threshold value, L represents the length of a constant envelope sequence in the pilot symbol, S represents the per-sample magnitude of a constant envelope sequence in the pilot symbol, and $R_l$ represents the autocorrelation of the first vector of the received data.

22. A method according to claim 14 wherein the step of determining the first timing metric includes the step of determining the result of:

$$|Q_l + Q_{l+1}|^2 - T_{C2}^2 LS^2 R_l$$

where $Q_l$ represents the output of the matched filter for a vector of the received data starting at sample l, $Q_{l+1}$ represents the output of the matched filter for a vector of the received data starting at sample l+1, $T_{C2}$ represents the threshold value, L represents the length of a constant envelope sequence in the pilot symbol, S represents the per-sample magnitude of a constant envelope sequence in the pilot symbol, and $R_l$ represents the autocorrelation of the first vector of the received data.

23. A method according to claim 14 wherein the step of determining the start of packet includes the step of determining the result of:

$$l + 2L - 1|_{l=0}$$

where l represents the range of samples of the received data for which both the first and second timing metrics are positive.

24. A method according to claim 1 wherein the step of estimating the time-varying phase offset of the received data comprises the steps of:

receiving the data at a receiver as a series of data samples, applying a correction based on an estimate of a frequency offset of the data to a vector of received data to form a matched filter, applying the matched filter to the received data, determining the correlation peak of the matched filter, and estimating the phase offset from the phase of the correlation peak.

25. A method according to claim 24 wherein the pilot symbol includes at least two sequences with constant envelope in both the frequency and time domains.

26. A method according to claim 24 wherein the length of the data vector used to form the matched filter is equal to the length of a sequence in the pilot symbol.

27. A method according to claim 24 wherein the step of determining the phase offset includes the step of determining the result of:

$$\arctan\left(\frac{\operatorname{Im}\{Q_0\}}{\operatorname{Re}\{Q_0\}}\right)$$

where arctan denotes the arctangent function,

Im denotes the imagery part of the number in brackets,

Re denotes the real part of the number in brackets, and $Q_0$ represents the matched filter correlation peak.

28. A method according to claim 1 wherein the step of estimating the time-varying time offset of the received data comprises the steps of:

receiving the data at a receiver as a series of data samples, determining the start of a second sequence within the pilot symbol of the received data to an accuracy of half a data sample, taking a discrete Fourier transform of a vector of the received data, forming a vector product of the output of the discrete Fourier transform and the data sample of the second sequence, and estimating the timing offset from the vector product.

29. A method according to claim 28 wherein the pilot symbol includes at least two sequences with constant envelope in both the frequency and time domains.

30. A method according to claim 28 wherein the step of estimating the time-varying time offset of the received data further comprises the step of applying a frequency offset correction to the received data before the step of taking the discrete Fourier transform of the data.

31. A method according to claim 28 wherein the step of estimating the time-varying time offset of the received data further comprises the step of applying a phase offset correction to the received data before the step of taking the discrete Fourier transform of the data.

32. A method according to claim 28 wherein the discrete Fourier transform is an L-point discrete Fourier transform where L represents the length of one constant envelope sequence in the pilot symbol.

33. A method according to claim 28 wherein the step of determining the start of a second constant envelope sequence in the pilot symbol includes the steps of:
producing an autocorrelation of a first vector of the received data,
applying a correction based on an estimate of a frequency offset of the received data to the first vector of the received data to form a matched filter,
applying the matched filter to the received data to produce an output,
determining a timing metric for the current sample of data as a function of the output of the matched filter, the autocorrelation of the first vector of the received data, the magnitude of the constant envelope of a sequence of the pilot symbol and a first threshold value,
assessing when the first timing metric becomes positive, and
estimating the start of packet from the current data sample.

34. A method according to claim 28 wherein the step of estimating the timing offset from the vector product includes the step of determining the result of:

$$\frac{LT}{2\pi} \frac{k^T\beta - \frac{1}{L}k^T oo^T \beta}{k^T k - \frac{1}{L}(k^T o)^2}$$

where L represents the length of a constant envelope sequence in the pilot symbol,
T represents the period of a sample,
k represents a vector containing numbers 0 to L−1,
β represents the argument of the vector product, and
o represents an L-length vector of ones.

35. A receiver for detecting and synchronising packets of data with a repeated sequence as a pilot symbol received by a communications system including: a front end arranged to receive data, a packet detect estimator arranged to detect a packet within the received data, a frequency offset estimator arranged to produce an estimate of the time-varying frequency offset of the received data, a start of packet estimator arranged to estimate the start of the packet of the received data, a phase offset estimator arranged to estimate the time-varying phase offset of the received data and a time offset estimator arranged to estimate the time-varying time offset of the received data, and wherein the frequency offset estimator is further arranged to estimate the time-varying frequency offset of the received data again after the packet start has been estimated.

36. A receiver for detecting and synchronising packets received by a communications system as claimed in claim 35 further including correction means arranged to apply a correction based on the estimated frequency offset to the received data before the start of packet estimation means estimates the start of packet.

37. A receiver for detecting and synchronising packets received by a communications system as claimed in claim 35 wherein the time offset estimation means is further arranged to apply corrections based on the frequency and phase offsets to the received data before estimating the time varying time offset.

38. A receiver according to claim 35 wherein the frequency offset estimator is arranged to determine the frequency offset of the received data including a pilot symbol comprising a repeated sequence, the frequency offset estimator comprising:
first correlation means arranged to produce an autocorrelation of a first vector of the received data,
second correlation means arranged to produce a cross correlation between the first vector of the received data and a second vector of the received data, and
computation means arranged to determine a timing metric as a function of the autocorrelation, the cross correlation and a threshold value, assess when the timing metric becomes positive, and when the timing metric becomes positive estimate the frequency offset from the phase of the cross correlation.

39. A receiver according to claim 38 wherein the computation means of the frequency offset estimator is further arranged to:
determine the phase of the cross correlation of the first vector and the second vector once the start of a data packet has been detected, and
estimate the frequency offset from the phase of the cross correlation.

40. A receiver according to claim 38 wherein the pilot symbol includes at least two sequences with constant envelope in both the frequency and time domains.

41. A receiver according to claim 38 wherein the length of the vectors used to determine the autocorrelation and the cross correlation of the received data are the same length as a sequence in the pilot symbol.

42. A receiver according to claim 38 wherein the computation means is arranged to assess the timing metric as:

$$|P_l| - T_{C1}\sqrt{R_l R_{l+L}}$$

where $P_l$ represents the cross correlation of the received data,
$T_{C1}$ represents the threshold value,
$R_l$ represents the autocorrelation of the received data beginning at sample l, and
$R_{l+L}$ represents the autocorrelation of the received data beginning at sample l+L.

43. A receiver according to claim 38 wherein the computation means is arranged to assess the timing metric as:

$$|P_l| - T_{C1}\max(R_l R_{l+L})$$

where $P_l$ represents the cross correlation of the received data,
$T_{C1}$ represents the threshold value,
max represents taking the maximum value of those in the brackets,
$R_l$ represents the autocorrelation of the received data beginning at sample l, and
$R_{l+L}$ represents the autocorrelation of the received data beginning at sample l+L.

44. A receiver according to claim 38 wherein the computation means is arranged to assess the timing metric as:

$$|P_l| - T_{C1} R_l$$

where $P_l$ represents the cross correlation of the received data,
$T_{C1}$ represents the threshold value, and
$R_l$ represents the autocorrelation of the received data beginning at sample l.

45. A receiver according to claim 38 wherein the computation means is arranged to assess the timing metric as:

$$|P_l| - T_{C1} R_{l+L}$$

where $P_l$ represents the cross correlation of the received data,
$T_{C1}$ represents the threshold value, and $R_{l+L}$ represents the autocorrelation of the received data beginning at sample l+L.

46. A receiver according to claim 38 wherein the computation means is arranged to assess the timing metric as:

$$P_l^2 - T_{C1}^2 R_l^2$$

where $P_l$ represents the cross correlation of the received data,
$T_{C1}$ represents the threshold value, and
$R_l$ represents the autocorrelation of the received data beginning at sample l.

47. A receiver according to claim 38 wherein the computation means is further arranged to estimate the frequency offset as:

$$\frac{1}{2\pi LT} \arctan\left(\frac{\text{Im}\{P_l\}}{\text{Re}\{P_l\}}\right)$$

where $P_l$ represents the cross correlation of the received data,
L represent the length of a constant envelope sequence in the pilot symbol, and
T represents the period of a sample.

48. A receiver according to claim 35 wherein the start of packet estimator is arranged to estimate the start of a packet of a series of samples of data including a pilot symbol comprising a repeated sequence, the start of packet estimator comprising:
   correlator means arranged to produce an autocorrelation of a first vector of the received data,
   matched filter forming means arranged to apply a correction based on an estimate of a frequency offset of the received data to the first vector of the received data to form a matched filter,
   matched filter means arranged to apply the matched filter to the received data to produce an output, and
   computation means arranged to determine a timing metric for the current sample of data as a function of the output of the matched filter, the autocorrelation of the first vector of the received data, the magnitude of the constant envelope of a sequence within the pilot symbol and a first threshold value, assess when the first timing metric becomes positive, and estimate the start of packet from the current data sample.

49. A receiver according to claim 48 wherein the length of the matched filter is equal to the length of a constant envelope sequence within the pilot symbol.

50. A receiver according to claim 48 wherein the length of the vector used to produce the autocorrelation is equal to the length of a constant envelope sequence within the pilot symbol.

51. A receiver according to claim 48 wherein the vector of data used to produce the autocorrelation and the vector of data used to produce the output of the matched filter are the same.

52. A receiver according to claim 48 wherein the computation means is further arranged to ensure that a second timing metric is positive before estimating the start of the data packet.

53. A receiver according to claim 52 wherein the second timing metric is a function of a second threshold value, the autocorrelation of the received data and a cross correlation between the first vector of data and a second vector of the received data.

54. A receiver according to claim 48 wherein the computation means is arranged to assess the timing metric as:

$$|Q_l + Q_{l+1}| - T_{C2}\sqrt{L}S\sqrt{R_l}$$

where $Q_l$ represents the output of the matched filter for a vector of the received data starting at sample l,
$Q_{l+1}$ represents the output of the matched filter for a vector of the received data starting at sample l+1,
$T_{C2}$ represents the threshold value,
L represents the length of a constant envelope sequence in the pilot symbol,
S represents the per-sample magnitude of a constant envelope sequence in the pilot symbol, and
$R_l$ represents the autocorrelation of the first vector of the received data.

55. A receiver according to claim 48 wherein the computation means is arranged to assess the timing metric as:

$$|Q_l + Q_{l+1}|^2 - T_{C2}^2 L S^2 R_l$$

where $Q_l$ represents the output of the matched filter for a vector of the received data starting at sample l,
$Q_{l+1}$ represents the output of the matched filter for a vector of the received data starting at sample l+1,
$T_{C2}$ represents the threshold value,
L represents the length of a constant envelope sequence in the pilot symbol,
S represents the per-sample magnitude of a constant envelope sequence in the pilot symbol, and
$R_l$ represents the autocorrelation of the first vector of the received data.

56. A receiver according to claim 48 wherein the computation means is arranged to assess the start of packet as:

$$l + 2L - 1|_{j=0}$$

where l represents the range of samples of the received data for which both the first and second timing metrics are positive.

57. A receiver according to claim 35 wherein the phase offset estimator is arranged to estimate the phase offset of data including a pilot symbol including a repeated sequence, the phase offset estimator comprising:
   computation means arranged to apply a correction based on an estimate of a frequency offset of the data to a vector of received data to form a matched filter,
   a matched filter arranged to filter to the received data, and
   the computation means further arranged to determine the correlation peak of the matched filter, and estimate the phase offset from the phase of the correlation peak.

58. A receiver according to claim 57 wherein the length of the data vector used to form the matched filter is equal to the length of a sequence in the pilot symbol.

59. A receiver according to claim 57 wherein the computation means is further arranged to estimate the phase offset as:

$$\arctan\left(\frac{\text{Im}\{Q_0\}}{\text{Re}\{Q_0\}}\right)$$

where arctan denotes the arctangent function,
Im denotes the imagery part of the number in brackets,
Re denotes the real part of the number in brackets, and
$Q_0$ represents the matched filter correlation peak.

60. A receiver according to claim 35 wherein the time offset estimator is arranged to estimate the timing offset of a received series of samples of data including a pilot symbol comprising a repeated sequence, the time offset estimator comprising:

computation means arranged to determine the start of a second sequence within the pilot symbol of the received data to an accuracy of half a data sample, Fourier transform means arranged to perform a discrete Fourier transform on a vector of the received data, and the computation means further arranged to form a vector product of the output of the discrete Fourier transform and the data sample of the second constant envelope sequence, and estimate the timing offset from the vector product.

61. A receiver according to claim 60 wherein the computation means is further arranged to apply a frequency offset correction to the received data before the Fourier transform means takes the discrete Fourier transform of the data.

62. A receiver according to claim 60 wherein the computation means is further arranged to apply a phase offset correction to the received data before the Fourier transform means takes the discrete Fourier transform of the data.

63. A receiver according to claim 60 wherein the discrete Fourier transform is an L-point discrete Fourier transform where L represents the length of a sequence in the pilot symbol.

64. A receiver according to claim 60 wherein the computation means is further arranged to determine the start of a second sequence in the pilot symbol by:

producing an autocorrelation of a first vector of the received data, applying a correction based on an estimate of a frequency offset of the received data to the first vector of the received data to form a matched filter, applying the matched filter to the received data to produce an output, determining a timing metric for the current sample of data as a function of the output of the matched filter, the autocorrelation of the first vector of the received data, the magnitude of the constant envelope of a sequence of the pilot symbol and a first threshold value, assessing when the first timing metric becomes positive, and when the first timing metric becomes positive estimating the start of packet from the current data sample.

65. A receiver according to claim 60 wherein the computation means is further arranged to estimate the timing offset from the vector product by determining the result of:

$$\frac{LT}{2\pi} \frac{k^T\beta - \frac{1}{L}k^T oo^T \beta}{k^T k - \frac{1}{L}(k^T o)^2}$$

where L represents the length of a constant envelope sequence in the pilot symbol, T represents the period of a sample, k represents a vector containing numbers 0 to L−1, β represents the argument of the vector product, and o represents an L-length vector of ones.

* * * * *